United States Patent
Watanabe et al.

(10) Patent No.: US 11,284,976 B2
(45) Date of Patent: Mar. 29, 2022

(54) ARTIFICIAL TEETH SET INCLUDING MANDIBULAR COUPLED ARTIFICIAL TEETH HAVING AN ARCH SHAPE AND MAXILLARY COUPLED ARTIFICIAL TEETH HAVING AN ARCH SHAPE

(71) Applicant: KABUSHIKI KAISHA SHOFU, Kyoto (JP)

(72) Inventors: Nobutaka Watanabe, Yokohama (JP); Katsushi Tamaki, Kanagawa (JP); Kunihiro Fujii, Kyoto (JP); Hirokazu Satoh, Kyoto (JP); Toshiyuki Nakatsuka, Kyoto (JP)

(73) Assignee: KABUSHIKI KAISHA SHOFU, Kyoto (JP)

( * ) Notice: Subject to any disclaimer, the term of this patent is extended or adjusted under 35 U.S.C. 154(b) by 358 days.

(21) Appl. No.: 16/405,166

(22) Filed: May 7, 2019

(65) Prior Publication Data
US 2019/0343607 A1    Nov. 14, 2019

(30) Foreign Application Priority Data

May 10, 2018 (JP) .............................. JP2018-091121
Mar. 15, 2019 (JP) .............................. JP2019-048170

(51) Int. Cl.
*A61C 13/097*    (2006.01)
*A61C 13/10*     (2006.01)

(52) U.S. Cl.
CPC ........ *A61C 13/097* (2013.01); *A61C 13/1013* (2013.01)

(58) Field of Classification Search
CPC ..... A61C 13/097; A61C 13/08; A61C 13/001; A61C 13/1013; A61C 13/34
See application file for complete search history.

(56) References Cited

U.S. PATENT DOCUMENTS

| 2009/0233255 A1* | 9/2009 | De Souza Fonseca Silva ............ A61C 13/0001 433/71 |
| 2010/0040997 A1* | 2/2010 | Kadobayashi ......... A61C 13/10 433/191 |

(Continued)

FOREIGN PATENT DOCUMENTS

| EP | 0 130 540 | 1/1985 |
| JP | 60-222051 | 11/1985 |
| JP | 2013-135863 | 7/2013 |

OTHER PUBLICATIONS

Extended European Search Report dated Oct. 10, 2019 in corresponding European Patent Application No. 19171425.2.

*Primary Examiner* — Heidi M Eide
(74) *Attorney, Agent, or Firm* — Wenderoth, Lind & Ponack, L.L.P.

(57) ABSTRACT

To provide a pair of maxillary and mandibular coupled artificial tooth sets applicable to alveolar ridge shapes of an unspecified large number of edentulous patients and having all the parts of 14 teeth coupled into an ideal arch shape and in an ideal maxillomandibular occlusal contact relationship. The present invention provides a pair of maxillary and mandibular coupled artificial tooth sets clearly defining an arrangement region of all parts at the time of arrangement in virtual three-dimensional coordinates, a contact relationship between maxillary and mandibular artificial teeth, and a harmonizing contact/gliding relationship at the time of movement on a mean-value articulator. This enables provision of a high-quality complete denture in which an occlusal relationship required for a complete denture can be established in a short time regardless of a skill of a technician and a difference in shape of an alveolar ridge of an edentulous patient.

2 Claims, 19 Drawing Sheets

(56) References Cited

U.S. PATENT DOCUMENTS

2010/0151424 A1 6/2010 Kadobayashi et al.
2010/0266988 A1* 10/2010 Satoh .................. A61C 13/097
　　　　　　　　　　　　　　　　　　　　433/197

* cited by examiner

LATERAL MOVEMENT ON WORKING SIDE

LATERAL MOVEMENT ON BALANCING SIDE

ARTIFICIAL TEETH SET INCLUDING MANDIBULAR COUPLED ARTIFICIAL TEETH HAVING AN ARCH SHAPE AND MAXILLARY COUPLED ARTIFICIAL TEETH HAVING AN ARCH SHAPE

BACKGROUND OF THE INVENTION

1. Field of the Invention

The present invention relates to a denture and, more particularly, to prefabricated artificial teeth used for producing a complete denture.

2. Description of the Related Art

Artificial teeth are used as members for producing a denture for treating a patient with tooth loss in the field of dental prosthodontic treatment.

When a denture is produced, artificial teeth are positioned to restore oral functions such as eating, pronunciation, and swallowing possessed by a patient before having tooth loss. For example, artificial teeth are positioned such that the artificial teeth of respective parts form an arch shape (referred to as a dental arch) on a trial plate made of wax in consideration of a positional relationship of occlusion (referred to as occlusal relationship) and aesthetics (natural appearance) depending on an individual patient (this operation is referred to as arrangement).

Dentures are roughly divided into complete dentures and partial dentures, and the complete dentures are fabricated for the jaws lacking all the teeth, while the partial dentures are manufactured for the jaws partially lacking teeth.

Most of the conventional artificial teeth are provided in a state in which the artificial teeth are independent of each other so as to enable fabrication of not only a complete denture but also a partial denture. In the case of a partial denture, when the number of missing teeth is small, the artificial teeth can be arranged with reference to positions of surrounding remaining teeth and opposing teeth. Although no particular problem is caused in use, as the number of losses increases, it becomes difficult to identify optimal arrangement positions of artificial teeth.

In the case of a complete denture, not only the absence of reference remaining teeth but also absorption of alveolar bone often result in a shape of a flat jaw (called alveolar ridge). Therefore, advanced knowledge and experience are required for identifying the optimal arrangement positions of artificial teeth.

As in the case of the partial dentures, even in the process of manufacturing the complete dentures, the arrangement positions of artificial teeth are desirably determined with reference to a shape of a patient's alveolar ridge in consideration of positions thought as original tooth eruption positions. This is because the artificial tooth harmonizes with surrounding tissues in the oral cavity, such as the tongue and buccal mucosa of each patient when the denture is worn.

Additionally, it is required to establish an appropriate occlusal relationship to achieve mechanical stability so that the denture itself does not detach from the oral cavity when the patient performs jaw movement such as chewing or pronunciation. Therefore, it is required to consider a contact relationship between maxillary and mandibular artificial teeth when the patient performs a jaw movement.

However, advanced knowledge and technology as well as extremely complicated operation are required for arranging the conventional artificial teeth independent of each other in a positional relationship satisfying the requirements described above.

After the artificial tooth arrangement, an operation is performed for replacing wax with resin such as acrylic resin in a denture plate portion of a wax denture and polymerizing the resin. In this operation, the denture itself is distorted or deformed due to the polymerization shrinkage of the denture plate material to some extent, resulting in a deviation of arrangement positions of individual artificial teeth, and therefore, the artificial teeth are finally ground (this is referred to as occlusal adjustment) to establish an optimal occlusal relationship; however, this is extremely complicated operation and takes time at present.

Under these circumstances, several attempts have been made in the past to reduce a level of technical difficulty and a time for arrangement operation.

Patent Document 1 describes so-called full arch type plastic artificial teeth. The artificial teeth described in Patent Document 1 enables manufacturing of artificial teeth shaped to imitate human natural teeth as much as possible by disposing a support in a space of a U-shaped structure and defining a slope of a crown axial surface to facilitate division of a mold.

However, Japanese Laid-Open Patent Publication No. 60-222051 does not specifically disclose the shape of the dental arch of coupled artificial teeth. Moreover, an occlusal contact relationship between a maxillary artificial tooth and a mandibular artificial tooth is unclear, and a proper occlusal relationship cannot be ensured as a set of the maxillary artificial teeth and the mandibular artificial teeth, so that more complicated operations are required as compared to normal artificial teeth.

As a result, currently, it cannot necessarily be said that a denture functioning in the patient's oral cavity is provided.

PRIOR ART DOCUMENT

Patent Document

Patent Document 1: Japanese Laid-Open Patent Publication No. 60-222051

SUMMARY OF THE INVENTION

A problem to be solved by the present invention is to enable production of a complete denture harmonizing regardless of a skill of a technician and a difference in shape of the alveolar ridge of an edentulous patient and allowing the technician to easily establish an ideal occlusal contact relationship in a short time.

To solve the problem, a maxillomandibular fitting type coupled artificial tooth set according to an aspect of the present invention is a maxillomandibular fitting type coupled artificial tooth set including mandibular coupled artificial teeth (5) and maxillary coupled artificial teeth (6) having an arch shape, wherein the mandibular coupled artificial teeth (5) have an artificial tooth for mandibular central incisor (T8), an artificial tooth for mandibular lateral incisor (T9), an artificial tooth for mandibular canine (T10), an artificial tooth for mandibular first premolar (T11), an artificial tooth for mandibular second premolar (T12), an artificial tooth for mandibular first molar (T13), and an artificial tooth for mandibular second molar (T14) arranged on each of the left and right sides, wherein at the center of the mandibular coupled artificial teeth (5), the left and right artificial teeth for mandibular central incisor (T8) are coupled to each other, wherein at the respective parts on both the left and right sides of the mandibular coupled artificial teeth (5), the artificial tooth for mandibular central incisor (T8), the artificial tooth for mandibular lateral incisor (T9), the artificial tooth for mandibular canine (T10), the artificial tooth for mandibular first premolar (T11), the artificial tooth for mandibular second premolar (T12), the artificial tooth for mandibular first molar (T13), and the artificial tooth for mandibular second molar (T14) are coupled in this order, wherein when the mandibular coupled artificial teeth (5) are represented in a virtual XYZ orthogonal coordinate system, a mandibular incisal point (10) is a middle point between mesial incisal edge corners of the left and right artificial teeth for mandibular central incisor (T8) and coincides with an origin (1) of the virtual XYZ orthogonal coordinate system having an X coordinate value of 0 mm, a Y coordinate value of 0 mm, and a Z coordinate value of 0 mm, wherein distobuccal cusp apexes (C15) of the left and right artificial teeth for mandibular first molar (T13) are arranged at positions having the Z coordinate value of 0 mm, wherein the left parts of the mandibular coupled artificial teeth (5) are arranged on the positive (+) X coordinate value side while the right parts of the mandibular coupled artificial teeth (5) are arranged on the negative (−) X coordinate value side, wherein the absolute values of the X, Y, and Z coordinate values of positions of the incisal edges of the incisors and the canine and the cusp apexes of the molars of the left parts of the mandibular coupled artificial teeth (5) are respectively equal to the absolute values of the X, Y, and Z coordinate values of positions of the incisal edges of the incisors and the canine and the cusp apexes of the molars of the right parts of the mandibular coupled artificial teeth (5), wherein the crown forms of the artificial teeth for mandibular central incisor (T8), the artificial teeth for mandibular lateral incisor (T9), the artificial teeth for mandibular canine (T10), the artificial teeth for mandibular first premolar (T11), the artificial teeth for mandibular second premolar (T12), the artificial teeth for mandibular first molar (T13), and the artificial teeth for mandibular second molar (T14) on both the left and right sides of the mandibular coupled artificial teeth (5) are arranged between a first virtual curve (18) expressed by a quadratic function Y mm=$\{(X \text{ mm} \times X \text{ mm})/\alpha1 \text{ mm}\}-\beta1$ mm and a second virtual curve (19) expressed by Y mm=$\{(X \text{ mm} \times X \text{ mm})/\alpha2 \text{ mm}\}+\beta2$ mm in an XY plane of the virtual XYZ orthogonal coordinate system, where $\alpha1$ mm, $\beta1$ mm, $\alpha2$ mm, and $\beta2$ mm are determined in a range of 30 to 32 mm, in a range of 3 to 5 mm, in a range of 8 to 16 mm, and in a range of 2 to 5 mm, respectively, wherein a total width (L1) in a mesiodistal direction from the left artificial tooth for mandibular second molar (T14) to the right artificial tooth for mandibular second molar (T14) is between 80.0 mm and β0.0 mm, wherein in the mandibular coupled artificial teeth (5), the incisal edges of all the incisors and canines and the cusp apexes of all the molars are arranged at the Z coordinate values between −10.0 mm and +5.0 mm, wherein the maxillary coupled artificial teeth (6) have an artificial tooth for maxillary central incisor (T1), an artificial tooth for maxillary lateral incisor (T2), an artificial tooth for maxillary canine (T3), an artificial tooth for maxillary first premolar (T4), an artificial tooth for maxillary second premolar (T5), an artificial tooth for maxillary first molar (T6), and an artificial tooth for maxillary second molar (T7) arranged on each of the left and right sides, wherein at the center of the maxillary coupled artificial teeth (6), the left and right artificial teeth for maxillary central incisor (T1) are coupled to each other, wherein at the respective parts on both the left and right sides of the maxillary coupled artificial teeth (6), the artificial tooth for maxillary central incisor (T1), the artificial tooth for maxillary lateral incisor (T2), the artificial tooth for maxillary canine (T3), the artificial tooth for maxillary first premolar (T4), the artificial tooth for maxillary second premolar (T5), the artificial tooth for maxillary first molar (T6), and the artificial tooth for maxillary second molar (T7) are coupled in this order, wherein when the maxillary coupled artificial teeth (6) are represented in a virtual XYZ orthogonal coordinate system, a maxillary incisal point (20) is a middle point between mesial incisal edge corners of the left and right artificial teeth for maxillary central incisor (T1) and is arranged to have an X coordinate value of 0 mm, a Y coordinate value of −10.0 mm to 0 mm, and a Z coordinate value of −10.0 mm to 0 mm relative to the origin (1) of the virtual XYZ orthogonal coordinate system, wherein the left parts of the maxillary coupled artificial teeth (6) are arranged on the positive (+) X coordinate value side while the right parts of the maxillary coupled artificial teeth (6) are arranged on the negative (−) X coordinate value side, wherein the absolute values of the X, Y, and Z coordinate values of positions of the incisal edges of the incisors and the canine and the cusp apexes of the molars of the left parts of the maxillary coupled artificial teeth (6) are respectively equal to the absolute values of the X, Y, and Z coordinate values of positions of the incisal edges of the incisors and the canine and the cusp apexes of the molars of the right parts of the maxillary coupled artificial teeth (6), wherein a central fossa (S6) of the artificial tooth for maxillary first molar (T6) has X and Y coordinate values within a radius of 5.0 mm around the distobuccal cusp apex (C15) of the artificial tooth for mandibular first molar (T13) and a Z coordinate value between 0 mm and +5.0 mm, wherein the crown forms of the artificial teeth for maxillary central incisor (T1), the artificial teeth for maxillary lateral incisor (T2), the artificial teeth for maxillary canine (T3), the artificial teeth for maxillary first premolar (T4), the artificial teeth for maxillary second premolar (T5), the artificial teeth for maxillary first molar (T6), and the artificial teeth for maxillary second molar (T7) on both the left and right sides of the maxillary coupled artificial teeth (6) are arranged between a third virtual curve (28) expressed by a quadratic function Y mm=$\{(X \text{ mm} \times X \text{ mm})/\alpha3 \text{ mm}\}-\beta3$ mm and a fourth virtual curve (29) expressed by Y mm=$\{(X \text{ mm} \times X \text{ mm})/\alpha4 \text{ mm}\}-\beta4$ mm in an XY plane of the virtual XYZ orthogonal coordinate system, where $\alpha3$ mm, $\beta3$ mm, $\alpha4$ mm, and $\beta4$ mm are determined in a range of 32 to 36 mm, in a range of 8 to 12 mm, in a range of 8 to 16 mm, and in a range of 1 to 5 mm, respectively, wherein a total width (L2) in a mesiodistal direction from the left artificial tooth for maxillary second molar (T7) to the right artificial tooth for maxillary second molar (T7) is between 90.0 mm and 140.0 mm, wherein in the maxillary coupled artificial teeth (6), the incisal edges of all the incisors and canines and the cusp apexes of all the molars are arranged at the Z coordinate values between −5.0 mm and +10.0 mm, wherein when the mandibular coupled artificial teeth (5) and the maxillary coupled artificial teeth (6) are in an intercuspal state, at each of the left and right parts, at least one of the artificial tooth for mandibular first premolar (T11) and the artificial tooth for mandibular second premolar (T12) makes contact at one or more positions with at least one of the artificial tooth for maxillary first premolar (T4) and the artificial tooth for maxillary second premolar (T5), wherein at least one of the artificial tooth for mandibular first molar (T13) and the artificial tooth for mandibular second molar (T14) makes contact at one or more positions with at least one of the artificial tooth for maxillary first molar (T6) and the artificial tooth for maxillary second molar (T7), wherein a sum of contact positions at both the left and right parts of the mandibular coupled artificial teeth (5) and the maxillary coupled artificial teeth (6) is four or more, and wherein the molars at both the left and right parts of the mandibular coupled artificial teeth (5) and the maxillary coupled artificial teeth (6) are brought into contact and fit in a one-to-one or one-to-two tooth relationship of parts with the same name.

Provision of the maxillomandibular fitting type coupled artificial tooth set of the present invention enables production of a complete denture harmonizing regardless of a skill of a technician and a difference in shape of the alveolar ridge of an edentulous patient and allowing the technician to easily establish an ideal occlusal contact relationship in a short time.

Figure 1:
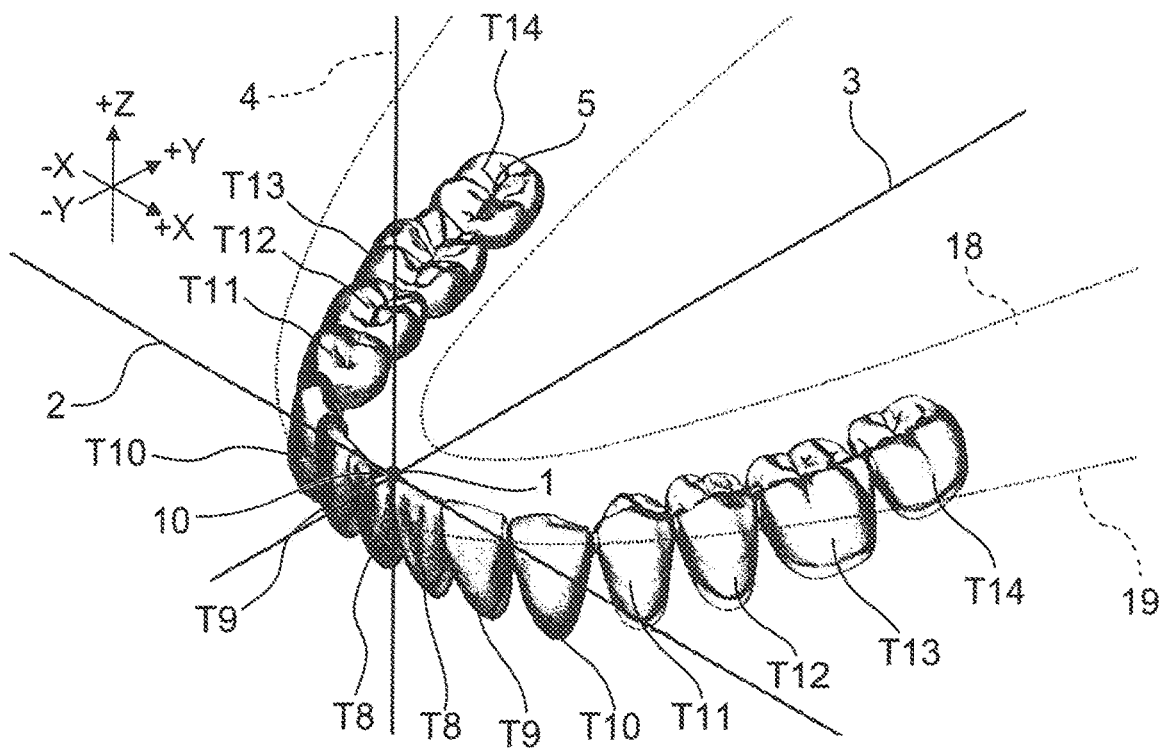
FIG. 1 is a perspective view of a mandibular coupled artificial teeth.

DESCRIPTION OF THE PREFERRED EMBODIMENTS (Findings Forming Basis of this Disclosure)

To solve the problem, the present inventors conducted studies on a pair of maxillary and mandibular coupled artificial tooth sets applicable to alveolar ridge shapes of an unspecified large number of edentulous patients and having all the parts of 14 teeth of central incisors, lateral incisors, canines, first premolars, second premolars, first molars, and second molars on both left and right sides coupled into an ideal arch shape and in an ideal maxillomandibular occlusal contact relationship.

More specifically, at the stage of providing coupled artificial teeth, the shape of the dental arch of the coupled artificial teeth, i.e., the proper arrangement position of artificial teeth of all the parts, is three-dimensionally clearly defined, and minimum contact positions to be ensured are clearly defined between maxillary coupled artificial teeth and mandibular coupled artificial teeth. To easily establish a bilateral balanced occlusion with a small amount of grinding adjustment when a complete denture is manufactured by using a mean-value articulator, setting is properly made in terms of an angle formed relative to an occlusal plane by each occlusal facet of an artificial tooth for maxillary central incisor, an artificial tooth for maxillary lateral incisor, an artificial tooth for maxillary canine, an artificial tooth for maxillary first premolar, an artificial tooth for maxillary second premolar, an artificial tooth for maxillary first molar, and an artificial tooth for maxillary second molar in the maxillary coupled artificial teeth, and an artificial tooth for mandibular central incisor, an artificial tooth for mandibular lateral incisor, an artificial tooth for mandibular canine, an artificial tooth for mandibular first premolar, an artificial tooth for mandibular second premolar, an artificial tooth for mandibular first molar, and an artificial tooth for mandibular second molar in the mandibular coupled artificial teeth. Setting is also properly made in terms of a contact position relationship of the occlusal facets in the intercuspal position and a gliding relationship of the occlusal facets on the working side and the balancing side of the lateral movement in the eccentric position and during forward movement between the maxillary coupled artificial teeth and the mandibular coupled artificial teeth.

The present inventors conducted the following investigation so as to obtain an ideal dental arch shape harmonizing regardless of a difference in alveolar ridge shape of an edentulous patient in the problem described above.

As described in the background art, it is thought that the arrangement positions of artificial teeth are desirably determined with reference to a shape of a patient's alveolar ridge in consideration of positions thought as original tooth eruption positions. However, in fact, even in the case of a complete denture manufactured based on this idea, position determination depends on knowledge and experience of a skilled technician, and it is not verified that the arrangement positions of the artificial teeth are actually coincide with the positions at which teeth were erupted.

Therefore, the present inventors measured erupted positions of natural teeth at respective parts, i.e., dental arch shapes, of models replicating mandibles of an unspecified large number of toothed persons without defect and conducted a statistical analysis of distribution in the case of arrangement in the XYZ orthogonal coordinate system under certain conditions.

The measurement was performed by using a three-dimensional shape measuring device. The mandibular natural tooth models are arranged in the XYZ orthogonal coordinate system such that the origin of the XYZ orthogonal coordinate system is made coincident with the mandibular incisal point of the measured natural tooth row at an X coordinate value of 0 mm, a Y coordinate value of 0 mm, and a Z coordinate value of 0 mm. The mandibular natural tooth models are arranged such that the distobuccal cusp apexes of the artificial teeth for mandibular first molar respectively arranged on both the left and right sides have a Z coordinate value of 0 mm. The left parts of the mandibular natural tooth models are arranged on the positive (+) X coordinate side, and the right parts of the mandibular natural tooth models are arranged on the negative (−) X coordinate side. The mandibular natural tooth models are arranged such that the absolute values of the X, Y, and Z coordinate values of positions of the incisal edges of the incisors and the canine and the cusp apexes of the molars of the parts on the left side of the mandibular natural tooth models become equal to the absolute values of the X, Y, and Z coordinate values of positions of the incisal edges of the incisors and the canine and the cusp apexes of the molars of the parts on the right side of the mandibular natural tooth models.

As a result of the analysis, it was found that the distribution of the erupted positions of the toothed persons without defect have less deviation due to individual differences.

The present inventors then measured arrangement positions of artificial teeth planted in complete dentures used by an unspecified large number of edentulous patients and conducted a statistical analysis. The complete dentures had the artificial teeth arranged based on the idea that the artificial teeth are arranged at positions thought as original tooth eruption positions and were those satisfactory for the patients.

As a result of the analysis, it was also found that the arrangement positions of the artificial teeth have less deviation due to individual differences of the patients.

As a result of analysis of the distribution of the erupted positions of the natural teeth and the distribution of the arrangement positions of the artificial teeth planted in the complete dentures, it became clear that both were basically coincident with each other. Therefore, it is verified that in the complete dentures fabricated with a technique of arranging artificial teeth at positions thought as original tooth eruption positions, the artificial teeth can be arranged at the tooth eruption positions with high probability, which suggests that a complete denture satisfactory for a patient can be fabricated.

Therefore, the present invention was conceived based on the idea that, by providing a coupled artificial tooth set having the artificial teeth for the parts arranged based on the distribution of these dental arches within a range defined by constant quadratic function curves in virtual three-dimensional coordinates and having the maxillary coupled artificial teeth and the mandibular coupled artificial teeth in a state ensuring static stability, a functional full denture can be fabricated in a short time regardless of a skill of a technician and is applicable to an unspecified large number of edentulous patients at high rates.

The present invention solving the problems is as described below.

A maxillomandibular fitting type coupled artificial tooth set according to a first aspect of the present invention is a maxillomandibular fitting type coupled artificial tooth set including mandibular coupled artificial teeth (5) and maxillary coupled artificial teeth (6) having an arch shape, wherein the mandibular coupled artificial teeth (5) have an artificial tooth for mandibular central incisor (T8), an artificial tooth for mandibular lateral incisor (T9), an artificial tooth for mandibular canine (T10), an artificial tooth for mandibular first premolar (T11), an artificial tooth for mandibular second premolar (T12), an artificial tooth for mandibular first molar (T13), and an artificial tooth for mandibular second molar (T14) arranged on each of the left and right sides, wherein at the center of the mandibular coupled artificial teeth (5), the left and right artificial teeth for mandibular central incisor (T8) are coupled to each other, wherein at the respective parts on both the left and right sides of the mandibular coupled artificial teeth (5), the artificial tooth for mandibular central incisor (T8), the artificial tooth for mandibular lateral incisor (T9), the artificial tooth for mandibular canine (T10), the artificial tooth for mandibular first premolar (T11), the artificial tooth for mandibular second premolar (T12), the artificial tooth for mandibular first molar (T13), and the artificial tooth for mandibular second molar (T14) are coupled in this order, wherein when the mandibular coupled artificial teeth (5) are represented in a virtual XYZ orthogonal coordinate system, a mandibular incisal point (10) is a middle point between mesial incisal edge corners of the left and right artificial teeth for mandibular central incisor (T8) and coincides with an origin (1) of the virtual XYZ orthogonal coordinate system having an X coordinate value of 0 mm, a Y coordinate value of 0 mm, and a Z coordinate value of 0 mm, wherein distobuccal cusp apexes (C15) of the left and right artificial teeth for mandibular first molar (T13) are arranged at positions having the Z coordinate value of 0 mm, wherein the left parts of the mandibular coupled artificial teeth (5) are arranged on the positive (+) X coordinate value side while the right parts of the mandibular coupled artificial teeth (5) are arranged on the negative (−) X coordinate value side, wherein the absolute values of the X, Y, and Z coordinate values of positions of the incisal edges of the incisors and the canine and the cusp apexes of the molars of the left parts of the mandibular coupled artificial teeth (5) are respectively equal to the absolute values of the X, Y, and Z coordinate values of positions of the incisal edges of the incisors and the canine and the cusp apexes of the molars of the right parts of the mandibular coupled artificial teeth (5), wherein the crown forms of the artificial teeth for mandibular central incisor (T8), the artificial teeth for mandibular lateral incisor (T9), the artificial teeth for mandibular canine (T10), the artificial teeth for mandibular first premolar (T11), the artificial teeth for mandibular second premolar (T12), the artificial teeth for mandibular first molar (T13), and the artificial teeth for mandibular second molar (T14) on both the left and right sides of the mandibular coupled artificial teeth (5) are arranged between a first virtual curve (18) expressed by a quadratic function Y mm={(X mm×X mm)/α1 mm}−β1 mm and a second virtual curve (19) expressed by Y mm={(X mm×X mm)/α2 mm}+β2 mm in an XY plane of the virtual XYZ orthogonal coordinate system, where α1 mm, β1 mm, α2 mm, and β2 mm are determined in a range of 30 to 32 mm, in a range of 3 to 5 mm, in a range of 8 to 16 mm, and in a range of 2 to 5 mm, respectively, wherein a total width (L1) in a mesiodistal direction from the left artificial tooth for mandibular second molar (T14) to the right artificial tooth for mandibular second molar (T14) is between 80.0 mm and 130.0 mm, wherein in the mandibular coupled artificial teeth (5), the incisal edges of all the incisors and canines and the cusp apexes of all the molars are arranged at the Z coordinate values between −10.0 mm and +5.0 mm, wherein the maxillary coupled artificial teeth (6) have an artificial tooth for maxillary central incisor (T1), an artificial tooth for maxillary lateral incisor (T2), an artificial tooth for maxillary canine (T3), an artificial tooth for maxillary first premolar (T4), an artificial tooth for maxillary second premolar (T5), an artificial tooth for maxillary first molar (T6), and an artificial tooth for maxillary second molar (T7) arranged on each of the left and right sides, wherein at the center of the maxillary coupled artificial teeth (6), the left and right artificial teeth for maxillary central incisor (T1) are coupled to each other, wherein at the respective parts on both the left and right sides of the maxillary coupled artificial teeth (6), the artificial tooth for maxillary central incisor (T1), the artificial tooth for maxillary lateral incisor (T2), the artificial tooth for maxillary canine (T3), the artificial tooth for maxillary first premolar (T4), the artificial tooth for maxillary second premolar (T5), the artificial tooth for maxillary first molar (T6), and the artificial tooth for maxillary second molar (T7) are coupled in this order, wherein when the maxillary coupled artificial teeth (6) are represented in a virtual XYZ orthogonal coordinate system, a maxillary incisal point (20) is a middle point between mesial incisal edge corners of the left and right artificial teeth for maxillary central incisor (T1) and is arranged to have an X coordinate value of 0 mm, a Y coordinate value of −10.0 mm to 0 mm, and a Z coordinate value of −10.0 mm to 0 mm relative to the origin (1) of the virtual XYZ orthogonal coordinate system, wherein the left parts of the maxillary coupled artificial teeth (6) are arranged on the positive (+) X coordinate value side while the right parts of the maxillary coupled artificial teeth (6) are arranged on the negative (−) X coordinate value side, wherein the absolute values of the X, Y, and Z coordinate values of positions of the incisal edges of the incisors and the canine and the cusp apexes of the molars of the left parts of the maxillary coupled artificial teeth (6) are respectively equal to the absolute values of the X, Y, and Z coordinate values of positions of the incisal edges of the incisors and the canine and the cusp apexes of the molars of the right parts of the maxillary coupled artificial teeth (6), wherein a central fossa (S6) of the artificial tooth for maxillary first molar (T6) has X and Y coordinate values within a radius of 5.0 mm around the distobuccal cusp apex (C15) of the artificial tooth for mandibular first molar (T13) and a Z coordinate value between 0 mm and +5.0 mm, wherein the crown forms of the artificial teeth for maxillary central incisor (T1), the artificial teeth for maxillary lateral incisor (T2), the artificial teeth for maxillary canine (T3), the artificial teeth for maxillary first premolar (T4), the artificial teeth for maxillary second premolar (T5), the artificial teeth for maxillary first molar (T6), and the artificial teeth for maxillary second molar (T7) on both the left and right sides of the maxillary coupled artificial teeth (6) are arranged between a third virtual curve (28) expressed by a quadratic function Y mm={(X mm×X mm)/α3 mm}−β3 mm and a fourth virtual curve (29) expressed by Y mm={(X mm×X mm)/α4 mm}−β4 in an XY plane of the virtual XYZ orthogonal coordinate system, where α3 mm, β3 mm, α4 mm, and β4 mm are determined in a range of 32 to 36 mm, in a range of 8 to 12 mm, in a range of 8 to 16 mm, and in a range of 1 to 5 mm, respectively, wherein a total width (L2) in a mesiodistal direction from the left artificial tooth for maxillary second molar (T7) to the right artificial tooth for maxillary second molar (T7) is between 90.0 mm and 140.0 mm, wherein in the maxillary coupled artificial teeth (6), the incisal edges of all the incisors and canines and the cusp apexes of all the molars are arranged at the Z coordinate values between −5.0 mm and +10.0 mm, wherein when the mandibular coupled artificial teeth (5) and the maxillary coupled artificial teeth (6) are in an intercuspal state, at each of the left and right parts, at least one of the artificial tooth for mandibular first premolar (T11) and the artificial tooth for mandibular second premolar (T12) makes contact at one or more positions with at least one of the artificial tooth for maxillary first premolar (T4) and the artificial tooth for maxillary second premolar (T5), wherein at least one of the artificial tooth for mandibular first molar (T13) and the artificial tooth for mandibular second molar (T14) makes contact at one or more positions with at least one of the artificial tooth for maxillary first molar (T6) and the artificial tooth for maxillary second molar (T7), wherein a sum of contact positions at both the left and right parts of the mandibular coupled artificial teeth (5) and the maxillary coupled artificial teeth (6) is four or more, and wherein the molars at both the left and right parts of the mandibular coupled artificial teeth (5) and the maxillary coupled artificial teeth (6) are brought into contact and fit in a one-to-one or one-to-two tooth relationship of parts with the same name.

In the maxillomandibular fitting type coupled artificial tooth set according to a second aspect of the present invention, on an articulator including an occlusal plane table and an incisor guidance target and having an intercondylar distance of 105 mm, a sagittal condyle path angle of 25.0° relative to a horizontal plane, an angle of 15.0° formed by an occlusal triangle and occlusal plane, a sagittal incisal path angle of 10.0°, and a lateral incisal path angle of 10.0°, in the case that a tip of the incisor guidance target is made coincident with the origin (1) of the virtual XYZ orthogonal coordinate system, that an occlusal plane (P1) of the occlusal plane table is defined as the XY plane of the virtual XYZ coordinate system, that a sagittal plane (P2) is defined as a YZ plane of the virtual XYZ coordinate system, that a frontal plane (P3) is defined as a ZX plane of the virtual XYZ coordinate system, that the left parts of the mandibular coupled artificial teeth (5) and the maxillary coupled artificial teeth (6) are arranged on the positive (+) X coordinate value side, and that the right parts of the mandibular coupled artificial teeth (5) and the maxillary coupled artificial teeth (6) are arranged on the negative (−) X coordinate value side, the artificial tooth for maxillary central incisor (T1) may have two facets which include a protrusive facet (f1) and a protrusive facet (f2), at an incisal edge (i1);

angles formed by the protrusive facet (f1) relative to the occlusal plane (P1) may include an angle in a cross section on the sagittal plane (P2) of 22.0° to 25.5° and an angle in across section on the frontal plane (P3) of 1.5° to 6.5°;

angles formed by the protrusive facet (f2) relative to the occlusal plane (P1) may include an angle in a cross section on the sagittal plane (P2) of 20.5° to 23.0° and an angle in across section on the frontal plane (P3) of 1.5° to 6.5°;

the artificial tooth for maxillary lateral incisor (T2) may have two facets which include a protrusive facet (f3) and a protrusive facet (f4), at an incisal edge (i2);

angles formed by the protrusive facet (f3) relative to the occlusal plane (P1) may include an angle in a cross section on the sagittal plane (P2) of 23.0° to 28.0° and an angle in a cross section on the frontal plane (P3) of 15.0° to 17.0°;

angles formed by the protrusive facet (f4) relative to the occlusal plane (P1) may include an angle in a cross section on the sagittal plane (P2) of 16.0° to 22.0° and an angle in a cross section on the frontal plane (P3) of 9.5° to 10.5°;

the artificial tooth for maxillary canine (T3) may have two facets which include a protrusive facet (f5) and a retrusive facet (f6), at an incisal edge (i3);

angles formed by the protrusive facet (f5) relative to the occlusal plane (P1) may include an angle in a cross section on the sagittal plane (P2) of 25.0° to 31.0° and an angle in a cross section on the frontal plane (P3) of 1.5° to 5.0° wherein angles formed by the retrusive facet (f6) relative to the occlusal plane (P1) may include an angle in a cross section on the sagittal plane (P2) of 8.5° to 22.5° and an angle in a cross section on the frontal plane (P3) of 18.0° to 25.0°;

the artificial tooth for maxillary first premolar (T4) may have two facets which include a protrusive facet (f7) and a retrusive facet (f8), around a buccal cusp apex (C1) and may have one facet which includes a balancing facet (f9), around a lingual cusp apex (C2);

angles formed by the protrusive facet (f7) near the buccal cusp apex (C1) relative to the occlusal plane (P1) may include an angle in a cross section on the sagittal plane (P2) of 24.5° to 27.5° and an angle in a cross section on the frontal plane (P3) of 8.5° to 16.4°;

angles formed by the retrusive facet (f8) near the buccal cusp apex (C1) relative to the occlusal plane (P1) may include an angle in a cross section on the sagittal plane (P2) of 18.5° to 27.0° and an angle in a cross section on the frontal plane P3 of 10.0° to 18.0°;

angles formed by the balancing facet (f9) near the lingual cusp apex (C2) relative to the occlusal plane (P1) may include an angle in a cross section on the sagittal plane (P2) of 1.5° to 4.5° and an angle in a cross section on the frontal plane (P3) of 29.5° to 35.5°;

the artificial tooth for maxillary second premolar (T5) may have two facets which include a protrusive facet (f10) and a retrusive facet (f11), around a buccal cusp apex (C3) and may have one facet which includes a balancing facet (f12), around a lingual cusp apex (C4);

angles formed by the protrusive facet (f10) near the buccal cusp apex (C3) relative to the occlusal plane (P1) may include an angle in a cross section on the sagittal plane (P2) of 23.0° to 28.0° and an angle in a cross section on the frontal plane (P3) of 10.0° to 19.0°;

angles formed by the retrusive facet (f11) near the buccal cusp apex (C3) relative to the occlusal plane (P1) may include an angle in a cross section on the sagittal plane (P2) of 16.5° to 19.0° and an angle in a cross section on the frontal plane (P3) of 13.0° to 17.5°;

angles formed by the balancing facet (f12) near the lingual cusp apex (C4) relative to the occlusal plane (P1) may include an angle in a cross section on the sagittal plane (P2) of 6.0° to 10.0° and an angle in a cross section on the frontal plane (P3) of 25.5° to 29.0°;

the artificial tooth for maxillary first molar (T6) may have two facets which include a protrusive facet (f13) and a retrusive facet (f14), around a mesiobuccal cusp apex (C5), may have two facets which include a protrusive facet (f15) and a retrusive facet (f16), around a distobuccal cusp apex (C6), may have two facets which include a protrusive facet (f18) and a balancing facet (f17), around a mesiobuccal cusp apex (C7), and may have two facets which include a retrusive facet (f19) and a protrusive facet (f20), around a distolingual cusp apex (C8);

angles formed by the protrusive facet (f13) near the mesiobuccal cusp apex (C5) relative to the occlusal plane (P1) may include an angle in a cross section on the sagittal plane (P2) of 18.5° to 21.0° and an angle in a cross section on the frontal plane (P3) of 5.0° to 11.0°;

angles formed by the retrusive facet (f14) near the mesiobuccal cusp apex (C5) relative to the occlusal plane (P1) may include an angle in a cross section on the sagittal plane (P2) of 7.0° to 12.0° and an angle in a cross section on the frontal plane (P3) of 9.0° to 13.0°;

angles formed by the protrusive facet (f15) near the distobuccal cusp apex (C6) relative to the occlusal plane (P1) may include an angle in a cross section on the sagittal plane (P2) of 15.5° to 19.5° and an angle in a cross section on the frontal plane (P3) of 8.0° to 9.0°;

angles formed by the retrusive facet (f16) near the distobuccal cusp apex (C6) relative to the occlusal plane (P1) may include an angle in a cross section on the sagittal plane (P2) of 18.5° to 23.0° and an angle in a cross section on the frontal plane (P3) of 11.0° to 13.5°;

angles formed by the balancing facet (f17) near the mesiobuccal cusp apex (C7) relative to the occlusal plane (P1) may include an angle in a cross section on the sagittal plane (P2) of 14.5° to 16.5° and an angle in a cross section on the frontal plane (P3) of 40.0° to 42.0°;

angles formed by the protrusive facet (f18) near the mesiobuccal cusp apex (C7) relative to the occlusal plane (P1) may include an angle in a cross section on the sagittal plane (P2) of 18.5° to 19.5° and an angle in a cross section on the frontal plane (P3) of 4.5° to 6.5°;

angles formed by the retrusive facet (f19) near the distolingual cusp apex (C8) relative to the occlusal plane (P1) may include an angle in a cross section on the sagittal plane (P2) of 6.5° to 7.5° and an angle in a cross section on the frontal plane (P3) of 15.5° to 18.0°;

angles formed by the balancing facet (f20) near the distolingual cusp apex (C8) relative to the occlusal plane (P1) may include an angle in a cross section on the sagittal plane (P2) of 3.0° to 12.0° and an angle in a cross section on the frontal plane (P3) of 32.0° to 38.5°;

the artificial tooth for maxillary second molar (T7) may have two facets which include a protrusive facet (f21) and a retrusive facet (f22), around a mesiobuccal cusp apex (C9), may have one facet which includes a retrusive facet (f23), around a distobuccal cusp apex (C10), and may have two facets which include a protrusive facet (f25) and a balancing facet (f24), around a mesiobuccal cusp apex (C11);

angles formed by the protrusive facet (f21) near the mesiobuccal cusp apex (C9) relative to the occlusal plane (P1) may include an angle in a cross section on the sagittal plane (P2) of 22.5° to 25.5° and an angle in a cross section on the frontal plane (P3) of 1.0° to 2.5°;

angles formed by the retrusive facet (f22) near the mesiobuccal cusp apex (C9) relative to the occlusal plane (P1) may include an angle in a cross section on the sagittal plane (P2) of 9.5° to 17.5° and an angle in a cross section on the frontal plane (P3) of 13.0° to 16.5°;

angles formed by the retrusive facet (f23) near the distobuccal cusp apex (C10) relative to the occlusal plane (P1) may include an angle in a cross section on the sagittal plane (P2) of 6.5° to 12.0° and an angle in a cross section on the frontal plane (P3) of 4.5° to 7.0°;

angles formed by the balancing facet (f24) near the mesiobuccal cusp apex (C11) relative to the occlusal plane (P1) may include an angle in a cross section on the sagittal plane (P2) of 0.5° to 10.0° and an angle in a cross section on the frontal plane (P3) of 38.5° to 47.0°;

angles formed by the protrusive facet (f25) near the mesiobuccal cusp apex (C11) relative to the occlusal plane (P1) may include an angle in a cross section on the sagittal plane (P2) of 20.5° to 22.5° and an angle in a cross section on the frontal plane (P3) of 1.5° to 6.0°;

the artificial tooth for mandibular central incisor (T8) may have a protrusive facet (f26) at an incisal edge (i4);

angles formed by the protrusive facet (f26) relative to the occlusal plane (P1) may include an angle in a cross section on the sagittal plane (P2) of 27.0° to 35.0° and an angle in a cross section on the frontal plane (P3) of 3.5° to 12.5°;

the artificial tooth for mandibular lateral incisor (T9) may have a protrusive facet (f27) and a protrusive facet (f28) at an incisal edge (i5);

angles formed by the protrusive facet (f27) relative to the occlusal plane (P1) may include an angle in a cross section on the sagittal plane (P2) of 31.0° to 35.0° and an angle in a cross section on the frontal plane (P3) of 0.0° to 1.5°;

angles formed by the protrusive facet (f28) relative to the occlusal plane (P1) may include an angle in a cross section on the sagittal plane (P2) of 22.0° to 35.0° and an angle in a cross section on the frontal plane (P3) of 17.5° to 26.5°;

the artificial tooth for mandibular canine (T10) may have a protrusive facet (f29) and a retrusive facet (f30) at an incisal edge (i6);

angles formed by the protrusive facet (f29) relative to the occlusal plane (P1) may include an angle in a cross section on the sagittal plane (P2) of 23.0° to 28.0° and an angle in a cross section on the frontal plane (P3) of 0.5° to 10.0°;

angles formed by the retrusive facet (f30) relative to the occlusal plane (P1) may include an angle in a cross section on the sagittal plane (P2) of 14.5° to 18.0° and an angle in a cross section on the frontal plane (P3) of 16.0° to 21.0°;

the artificial tooth for mandibular first premolar (T11) may have two facets which include a protrusive facet (f31) and a retrusive facet (f32), around a buccal cusp apex (C12), may have one facet which includes a balancing facet (f33), on the distal marginal ridge, and may have one facet which includes a protrusive facet (f34), around the lingual cusp apex;

angles formed by the protrusive facet (f31) near the buccal cusp apex (C12) relative to the occlusal plane (P1) may include an angle in a cross section on the sagittal plane (P2) of 38.0° to 41.0° and an angle in a cross section on the frontal plane (P3) of 5.0° to 8.5°;

angles formed by the retrusive facet (f32) near the buccal cusp apex (C12) relative to the occlusal plane (P1) may include an angle in a cross section on the sagittal plane (P2) of 7.0° to 17.5° and an angle in a cross section on the frontal plane (P3) of 9.0° to 15.5°;

angles formed by the balancing facet (f33) near the distal fossete relative to the occlusal plane (P1) may include an angle in a cross section on the sagittal plane (P2) of 15.0° to 24.0° and an angle in a cross section on the frontal plane (P3) of 29.0° to 32.0°;

angles formed by the protrusive facet (f34) near the distal fossete relative to the occlusal plane (P1) may include an angle in a cross section on the sagittal plane (P2) of 3.5° to 10.0° and an angle in a cross section on the frontal plane (P3) of 1.0° to 5.0°;

the artificial tooth for mandibular second premolar (T12) may have two facets which include a protrusive facet (f35) and a retrusive facet (f36), around a buccal cusp apex (C13), may have one facet which includes a balancing facet (f37), on the distal marginal ridge, and may have one facet which includes a protrusive facet (f38), around the linguistic cusp apex;

angles formed by the protrusive facet (f35) near the buccal cusp apex (C13) relative to the occlusal plane (P1) may include an angle in a cross section on the sagittal plane (P2) of 27.5° to 30.0° and an angle in a cross section on the frontal plane (P3) of 16.0° to 19.0°;

angles formed by the retrusive facet (f36) near the buccal cusp apex (C13) relative to the occlusal plane (P1) may include an angle in a cross section on the sagittal plane (P2) of 13.0° to 15.0° and an angle in a cross section on the frontal plane (P3) of 17.0° to 24.0°;

angles formed by the balancing facet (f37) near the distal fossete relative to the occlusal plane (P1) may include an angle in a cross section on the sagittal plane (P2) of 1.5° to 17.0° and an angle in a cross section on the frontal plane (P3) of 10.0° to 16.5°;

angles formed by the protrusive facet (f38) near the distal fossete relative to the occlusal plane (P1) may include an angle in a cross section on the sagittal plane (P2) of 2.0° to 5.0° and an angle in a cross section on the frontal plane (P3) of 12.0° to 14.5°;

the artificial tooth for mandibular first molar (T13) may have three facets which include a protrusive facet (f39), a retrusive facet (f40), and a balancing facet (f41), around a mesiobuccal cusp apex (C14), may have three facets which include a protrusive facet (f42), a retrusive facet (f43), and a balancing facet (f44), around a distobuccal cusp apex (C15), may have two facets which include a protrusive facet (f45) and a balancing facet (f46), around a distobuccal cusp apex (C16), and may have one facet which includes a protrusive facet (f47), near a central fossa (S3);

angles formed by the protrusive facet (f39) near the mesiobuccal cusp apex (C14) relative to the occlusal plane (P1) may include an angle in a cross section on the sagittal plane (P2) of 23.5° to 32.0° and an angle in a cross section on the frontal plane (P3) of 7.0° to 15.0°;

angles formed by the retrusive facet (f40) near the mesiobuccal cusp apex (C14) relative to the occlusal plane (P1) may include an angle in a cross section on the sagittal plane (P2) of 7.5° to 12.0° and an angle in a cross section on the frontal plane (P3) of 14.0° to 16.0°;

angles formed by the balancing facet (f41) near the mesiobuccal cusp apex (C14) relative to the occlusal plane (P1) may include an angle in a cross section on the sagittal plane (P2) of 2.0° to 5.5° and an angle in a cross section on the frontal plane (P3) of 30.0° to 32.0°;

angles formed by the protrusive facet (f42) near the distobuccal cusp apex (C15) relative to the occlusal plane (P1) may include an angle in a cross section on the sagittal plane (P2) of 15.5° to 21.0° and an angle in a cross section on the frontal plane (P3) of 8.0° to 11.0°;

angles formed by the retrusive facet (f43) near the distobuccal cusp apex (C15) relative to the occlusal plane (P1) may include an angle in a cross section on the sagittal plane (P2) of 25.0° to 27.0° and an angle in a cross section on the frontal plane (P3) of 24.0° to 25.0°;

angles formed by the balancing facet (f44) near the distobuccal cusp apex (C15) relative to the occlusal plane (P1) may include an angle in a cross section on the sagittal plane (P2) of 12.0° to 20.0° and an angle in a cross section on the frontal plane (P3) of 30.0° to 37.0°;

angles formed by the protrusive facet (f45) near the distobuccal cusp apex (C16) relative to the occlusal plane (P1) may include an angle in a cross section on the sagittal plane (P2) of 7.5° to 13.0° and an angle in a cross section on the frontal plane (P3) of 10.0° to 13.0°;

angles formed by the balancing facet (f46) near the distobuccal cusp apex (C16) relative to the occlusal plane (P1) may include an angle in a cross section on the sagittal plane (P2) of 2.5° to 4.5° and an angle in a cross section on the frontal plane (P3) of 27.0° to 33.0°;

angles formed by the protrusive facet (f47) near the central fossa (S3) relative to the occlusal plane (P1) may include an angle in a cross section on the sagittal plane (P2) of 10.5° to 18.5° and an angle in a cross section on the frontal plane (P3) of 1.0° to 8.0°;

the artificial tooth for mandibular second molar (T14) may have three facets which include a protrusive facet (f48), a retrusive facet (f49), and a balancing facet (f50), around a mesiobuccal cusp apex (C17), may have three facets which include a protrusive facet (f51), a retrusive facet (f52), and a balancing facet (f53), around a distobuccal cusp apex (C18), and may have one facet which includes a protrusive facet (f54), near a central fossa (S4);

angles formed by the protrusive facet (f48) near the mesiobuccal cusp apex (C17) relative to the occlusal plane (P1) may include an angle in a cross section on the sagittal plane (P2) of 26.0° to 30.0° and an angle in a cross section on the frontal plane (P3) of 10.0° to 13.0°;

angles formed by the retrusive facet (f49) near the mesiobuccal cusp apex (C17) relative to the occlusal plane (P1) may include an angle in a cross section on the sagittal plane (P2) of 14.0° to 16.0° and an angle in a cross section on the frontal plane (P3) of 15.0° to 17.5°;

angles formed by the balancing facet (f50) near the mesiobuccal cusp apex (C17) relative to the occlusal plane (P1) may include an angle in a cross section on the sagittal plane (P2) of 2.5° to 3.5° and an angle in a cross section on the frontal plane (P3) of 34.0° to 38.0°;

angles formed by the protrusive facet (f51) near the distobuccal cusp apex (C18) relative to the occlusal plane (P1) may include an angle in a cross section on the sagittal plane (P2) of 17.0° to 21.0° and an angle in a cross section on the frontal plane (P3) of 4.5° to 6.5°;

angles formed by the retrusive facet (f52) near the distobuccal cusp apex (C18) relative to the occlusal plane (P1) may include an angle in a cross section on the sagittal plane (P2) of 19.0° to 22.0° and an angle in a cross section on the frontal plane (P3) of 13.0° to 14.5°;

angles formed by the balancing facet (f53) near the distobuccal cusp apex (C18) relative to the occlusal plane (P1) may include an angle in a cross section on the sagittal plane (P2) of 1.0° to 3.0° and an angle in a cross section on the frontal plane (P3) of 34.0° to 38.0°;

angles formed by the protrusive facet (f54) near the central fossa (S4) relative to the occlusal plane (P1) may include an angle in a cross section on the sagittal plane (P2) of 15.5° to 23.0° and an angle in a cross section on the frontal plane (P3) of 5.5° to 12.0°;

in the intercuspal position, the protrusive facet (f1) of the artificial tooth for maxillary central incisor (T1) may make partial contact with the protrusive facet (f27) of the artificial tooth for mandibular lateral incisor (T9);

the protrusive facet (f2) of the artificial tooth for maxillary central incisor (T1) may make partial contact with the protrusive facet (f26) of the artificial tooth for mandibular central incisor (T8);

the protrusive facet (f3) of the artificial tooth for maxillary lateral incisor (T2) may make partial contact with the protrusive facet (f29) of the artificial tooth for mandibular canine (T10);

the protrusive facet (f4) of the artificial tooth for maxillary lateral incisor (T2) may make partial contact with the protrusive facet (f28) of the artificial tooth for mandibular lateral incisor (T9);

the protrusive facet (f5) of the artificial tooth for maxillary canine (T3) may make partial contact with the protrusive facet (f31) of the artificial tooth for mandibular first premolar (T11);

the retrusive facet (f6) of the artificial tooth for maxillary canine (T3) may make partial contact with the retrusive facet (f30) of the artificial tooth for mandibular canine (T10);

the protrusive facet (f7) of the artificial tooth for maxillary first premolar (T4) may make partial contact with the protrusive facet (f35) of the artificial tooth for mandibular second premolar (T12);

the retrusive facet (f8) of the artificial tooth for maxillary first premolar (T4) may make partial contact with the retrusive facet (f32) of the artificial tooth for mandibular first premolar (T11);

the balancing facet (f9) of the artificial tooth for the maxillary first premolar (T4) may make partial contact with the balancing facet (f33) of the artificial tooth for mandibular first premolar (T11);

the protrusive facet (f10) of the artificial tooth for maxillary second premolar (T5) may make partial contact with the protrusive facet (f39) of the artificial tooth for mandibular first molar (T13);

the retrusive facet (f11) of the artificial tooth for maxillary second premolar (T5) may make partial contact with the retrusive facet (f36) of the artificial tooth for mandibular second premolar (T12);

the balancing facet (f12) of the artificial tooth for maxillary second premolar (T5) may make partial contact with the balancing facet (f37) of the artificial tooth for mandibular second premolar (T12);

the protrusive facet (f13) of the artificial tooth for maxillary first molar (T6) may make partial contact with the protrusive facet (f42) of the artificial tooth for mandibular first molar (T13);

the retrusive facet (f14) of the artificial tooth for maxillary first molar (T6) may make partial contact with the retrusive facet (f40) of the artificial tooth for mandibular first molar (T13);

the protrusive facet (f15) of the artificial tooth for maxillary first molar (T6) may make partial contact with the protrusive facet (f45) of the artificial tooth for mandibular first molar (T13);

the retrusive facet (f16) of the artificial tooth for maxillary first molar (T6) may make partial contact with the retrusive facet (f43) of the artificial tooth for mandibular first molar (T13);

the balancing facet (f17) of the artificial tooth for maxillary first molar (T6) may make partial contact with the balancing facet (f44) of the artificial tooth for mandibular first molar (T13);

the protrusive facet (f18) of the artificial tooth for maxillary first molar (T6) may make partial contact with the protrusive facet (f47) of the artificial tooth for mandibular first molar (T13);

the protrusive facet (f21) of the artificial tooth for the maxillary second molar (T7) may make partial contact with the protrusive facet (f51) of the artificial tooth for mandibular second molar (T14);

the retrusive facet (f22) of the artificial tooth for maxillary second molar (T7) may make partial contact with the retrusive facet (f49) of the artificial tooth for mandibular second molar (T14);

the retrusive facet (f23) of the artificial tooth for maxillary second molar (T7) may make partial contact with the retrusive facet (f52) of the artificial tooth for mandibular second molar (T14);

the balancing facet (f24) of the artificial tooth for maxillary second molar (T7) may make partial contact with the balancing facet (f53) of the artificial tooth for mandibular second molar (T14);

the protrusive facet (f25) of the artificial tooth for maxillary second molar (T7) may make partial contact with the protrusive facet (f54) of the artificial tooth for mandibular second molar (T14);

during lateral movement, on the working side, the protrusive facet (f4) of the artificial tooth for maxillary lateral incisor (T2) may partially glide on the protrusive facet (f28) of the artificial tooth for mandibular lateral incisor (T9);

the retrusive facet (f6) of the artificial tooth for maxillary canine (T3) may partially glide on the retrusive facet (f30) of the artificial tooth for mandibular canine (T10);

the retrusive facet (f8) of the artificial tooth for maxillary first premolar (T4) may partially glide on the retrusive facet (f32) of the artificial tooth for mandibular first premolar (T11);

the retrusive facet (f11) of the artificial tooth for maxillary second premolar (T5) may partially glide on the retrusive facet (f36) of the artificial tooth for mandibular second premolar (T12);

the retrusive facet (f14) of the artificial tooth for maxillary first molar (T6) may partially glide on the retrusive facet (f40) of the artificial tooth for mandibular first molar (T13);

the retrusive facet (f16) of the artificial tooth for maxillary first molar (T6) may partially glide on the retrusive facet (f43) of the artificial tooth for mandibular first molar (T13);

the protrusive facet (f18) of the artificial tooth for maxillary first molar (T6) may partially glide on the protrusive facet (f47) of the artificial tooth for mandibular first molar (T13);

the retrusive facet (f22) of the artificial tooth for maxillary second molar (T7) may partially glide on the retrusive facet (f49) of the artificial tooth for mandibular second molar (T14);

the retrusive facet (f23) of the artificial tooth for maxillary second molar (T7) may partially glide on the retrusive facet (f52) of the artificial tooth for mandibular second molar (T14);

the protrusive facet (f25) of the artificial tooth for maxillary second molar (T7) may partially glide on the protrusive facet (f54) of the artificial tooth for mandibular second molar (T14);

at the same time, on the balancing side, the balancing facet (f9) of the artificial tooth for the maxillary first premolar (T4) may partially glide on the balancing facet (f33) of the artificial tooth for mandibular first premolar (T11);

the balancing facet (f12) of the artificial tooth for maxillary second premolar (T5) may partially glide on the balancing facet (f37) of the artificial tooth for mandibular second premolar (T12) and the balancing facet (f41) of the artificial tooth for mandibular first molar (T13);

the balancing facet (f17) of the artificial tooth for maxillary first molar (T6) may partially glide on the balancing facet (f44) of the artificial tooth for mandibular first molar (T13);

the balancing facet (f20) of the artificial tooth for maxillary first molar (T6) may partially glide on the balancing facet (f46) of the artificial tooth for mandibular first molar (T13) and the balancing facet (f50) of the artificial tooth for mandibular second molar (T14);

the balancing facet (f24) of the artificial tooth for maxillary second molar (T7) may partially glide on the balancing facet (f53) of the artificial tooth for mandibular second molar (T14);

during forward movement, the protrusive facet (f1) of the artificial tooth for maxillary central incisor (T1) may partially glide on the protrusive facet (f27) of the artificial tooth for mandibular lateral incisor (T9);

the protrusive facet (f2) of the artificial tooth for maxillary central incisor (T1) may partially glide on the protrusive facet (f26) of the artificial tooth for mandibular central incisor (T8);

the protrusive facet (f3) of the artificial tooth for maxillary lateral incisor (T2) may partially glide on the protrusive facet (f29) of the artificial tooth for mandibular canine (T10);

the protrusive facet (f5) of the artificial tooth for maxillary canine (T3) may partially glide on the protrusive facet (f31) of the artificial tooth for mandibular first premolar (T11);

the protrusive facet (f7) of the artificial tooth for maxillary first premolar (T4) may partially glide on the protrusive facet (f35) of the artificial tooth for mandibular second premolar (T12);

the protrusive facet (f10) of the artificial tooth for maxillary second premolar (T5) may partially glide on the protrusive facet (f39) of the artificial tooth for mandibular first molar (T13);

the protrusive facet (f13) of the artificial tooth for maxillary first molar (T6) may partially glide on the protrusive facet (f42) of the artificial tooth for mandibular first molar (T13);

the protrusive facet (f15) of the artificial tooth for maxillary first molar (T6) may partially glide on the protrusive facet (f45) of the artificial tooth for mandibular first molar (T13) and the protrusive facet (f48) of the artificial tooth for mandibular second molar (T14);

the protrusive facet (f18) of the artificial tooth for maxillary first molar (T6) may partially glide on the protrusive facet (f47) of the artificial tooth for mandibular first molar (T13);

the protrusive facet (f21) of the artificial tooth for the maxillary second molar (T7) may partially glide on the protrusive facet (f51) of the artificial tooth for mandibular second molar (T14), and wherein the protrusive facet (f25) of the artificial tooth for maxillary second molar (T7) may partially glide on the protrusive facet (f54) of the artificial tooth for mandibular second molar (T14).

First Embodiment

Embodiments of the present invention will now be described in detail with reference to the drawings. In the figures, elements are shown in an exaggerated manner for facilitating description.

(Description of Reference Plane)

Names of reference planes used in description of a first embodiment will be described.

An occlusal plane is anatomically a virtual plane including the incisal points in the maxillary or mandibular tooth row and the cusp apexes of the left and right last molars, and when the present invention is actually implemented, the occlusal plane can be indicated by an occlusal plane table in an articulator.

A sagittal plane is a plane dividing a human body into left and right and is a plane orthogonal to the intercondylar axis.

A frontal plane is a plane perpendicular to the sagittal plane and a horizontal plane.

The horizontal plane is a plane parallel to the ground.

(Conditions of Articulator)

An articulator using the maxillomandibular fitting type coupled artificial tooth set according to the first embodiment of the present invention is a mean-value articulator. Although various mean-value articulators exist, to exactly implement the present invention, the mean-value articulator to be used has an intercondylar distance (a distance between rotation centers of left and right mandibular heads) of 105 mm, a sagittal condyle path angle (a path acquired by projecting a mandible movement path onto the sagittal plane when the mandible moves forward) of 25.0° relative to the horizontal plane, an angle of 15.0° formed by Bonwill triangle (a plane composed of a triangle connecting the rotation centers of the left and right mandibular heads and the incisal point on the occlusal plane table) and the occlusal plane, a sagittal incisal path angle (an angle formed by the line connecting an incisal point when the mandible is in the intercuspal position and an incisal point when the upper and lower front teeth are moved forward and occluded between incisal edges, relative to the horizontal reference plane) of 10.0°, and a lateral incisal path angle (an angle formed by the line connecting an incisal point when the mandible is in the intercuspal position and an incisal point when the upper and lower front teeth are moved laterally and occluded between incisal edges, relative to the horizontal reference plane) of 10.0°. The occlusal plane table to be used is parallel to the horizontal plane. An adjustable articulator may be adjusted to the conditions described above before use.

FIG. 1 is a perspective view of mandibular coupled artificial teeth 5 as viewed from the left front upper side. As shown in FIG. 1, the mandibular coupled artificial teeth 5 have an arch shape. The mandibular coupled artificial teeth 5 have an artificial tooth for mandibular central incisor T8, an artificial tooth for mandibular lateral incisor T9, an artificial tooth for mandibular canine T10, an artificial tooth for mandibular first premolar T11, an artificial tooth for mandibular second premolar T12, an artificial tooth for mandibular first molar T13, and an artificial tooth for mandibular second molar T14 arranged on each of the left and right sides. At the center of the mandibular coupled artificial teeth 5, the left and right artificial teeth for mandibular central incisor T8 are coupled to each other. At the respective parts on both the left and right sides of the mandibular coupled artificial teeth 5, the artificial tooth for mandibular central incisor T8, the artificial tooth for mandibular lateral incisor T9, the artificial tooth for mandibular canine T10, the artificial tooth for mandibular first premolar T11, the artificial tooth for mandibular second premolar T12, the artificial tooth for mandibular first molar T13, and the artificial tooth for mandibular second molar T14 are coupled in this order.

As described above, the mandibular coupled artificial teeth 5 include 14 forms of the artificial teeth for mandibular central incisor T8, the artificial teeth for mandibular lateral incisor T9, the artificial teeth for mandibular canine T10, the artificial teeth for mandibular first premolar T11, the artificial teeth for mandibular second premolar T12, the artificial teeth for mandibular first molar T13, and the artificial teeth for mandibular second molar T14 respectively arranged on both the left and right sides. These elements are adjacent in accordance with anatomical rules and coupled to each other. The mandibular coupled artificial teeth 5 have an arch shape formed by coupling the 14 forms of the artificial teeth for mandibular central incisor T8, the artificial teeth for mandibular lateral incisor T9, the artificial teeth for mandibular canine T10, the artificial teeth for mandibular first premolar T11, the artificial teeth for mandibular second premolar T12, the artificial teeth for mandibular first molar T13, and the artificial teeth for mandibular second molar T14. In other words, the mandibular coupled artificial teeth 5 have a circular arc shape formed by coupling the 14 forms of the artificial teeth for mandibular central incisor T8, the artificial teeth for mandibular lateral incisor T9, the artificial teeth for mandibular canine T10, the artificial teeth for mandibular first premolar T11, the artificial teeth for mandibular second premolar T12, the artificial teeth for mandibular first molar T13, and the artificial teeth for mandibular second molar T14.

Figure 2:
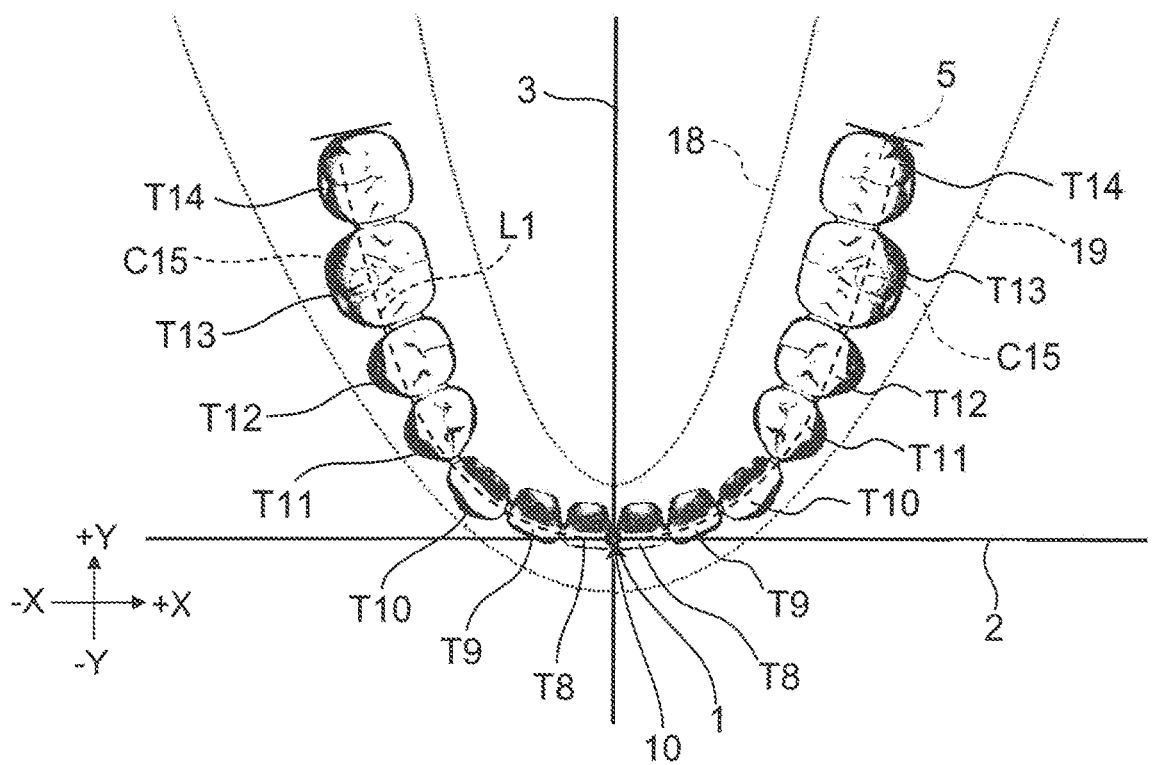
FIG. 2 is an occlusal view of the mandibular coupled artificial teeth.

FIG. 2 shows a view of the mandibular coupled artificial teeth 5 as viewed from the occlusal plane. As shown in FIG. 2, the mandibular coupled artificial teeth 5 are arranged in a virtual XYZ orthogonal coordinate system, and the origin of the virtual XYZ orthogonal coordinate system is made coincident with a mandibular incisal point 10 at an X coordinate value of 0 mm, a Y coordinate value of 0 mm, and a Z coordinate value of 0 mm. Therefore, the mandibular incisal point 10 coincides with an origin 1 of the virtual XYZ orthogonal coordinate system having the X coordinate value of 0 mm, the Y coordinate value of 0 mm, and the Z coordinate value of 0 mm.

The incisal point refers to a middle point connecting between the mesial incisal edge corners of the left and right central incisors. The mandibular incisal point 10 is a middle point between the mesial incisal edge corners of the left and right artificial teeth for mandibular central incisor T8.

A line segment running in a left-right direction orthogonally to the origin 1 of the virtual XYZ coordinate system in the figure indicates an X axis 2 of the virtual XYZ coordinate system, and a line segment running in an up-down direction indicates a Y axis 3 of the virtual XYZ coordinate system.

The mandibular coupled artificial teeth 5 are arranged such that distobuccal cusp apexes C15 of the artificial teeth for mandibular first molar T13 arranged on both the left and right sides have the Z coordinate value of 0 mm, that a part on the left side has a positive (+) X coordinate value while a part on the right side has a negative (−) X coordinate value, and that the incisal edges of the incisors and canines and the cusp apexes of the molars of the parts have equal absolute values on the left and right sides. Therefore, the distobuccal cusp apexes C15 of the left and right artificial teeth for mandibular first molar T13 of the mandibular coupled artificial teeth 5 are arranged at positions having the Z coordinate value of 0 mm. The left parts of the mandibular coupled artificial teeth 5 are arranged on the positive (+) X coordinate value side, and the right parts of the mandibular coupled artificial teeth 5 are arranged on the negative (−) X coordinate value side. The absolute values of the X, Y, and Z coordinate values of positions of the incisal edges of the incisors and the canine and the cusp apexes of the molars of the left parts of the mandibular coupled artificial teeth 5 are respectively equal to the absolute values of the X, Y, and Z coordinate values of positions of the incisal edges of the incisors and the canine and the cusp apexes of the molars of the right parts of the mandibular coupled artificial teeth 5.

In the mandibular coupled artificial teeth 5, the incisors refer to the artificial tooth for mandibular central incisor T8 and the artificial tooth for mandibular lateral incisor T9. The canine refers to the artificial tooth for mandibular canine T10. The molars refer to the artificial tooth for mandibular first premolar T11, the artificial tooth for mandibular second premolar T12, the artificial tooth for mandibular first molar T13, and the artificial tooth for mandibular second molar T14.

In this case, crown forms of all the parts are arranged between a first virtual curve 18 expressed by a quadratic function Y mm={(X mm×X mm)/32 mm}−5 mm and a second virtual curve 19 expressed by Y mm={(X mm×X mm)/8 mm}+5 mm. Therefore, if the mandibular coupled artificial teeth 5 are represented by the virtual XYZ orthogonal coordinate system, the crown forms of the artificial teeth for mandibular central incisor T8, the artificial teeth for mandibular lateral incisor T9, the artificial teeth for mandibular canine T10, the artificial teeth for mandibular first premolar T11, the artificial teeth for mandibular second premolar T12, the artificial teeth for mandibular first molar T13, and the artificial teeth for mandibular second molar T14 on both the left and right sides of the mandibular coupled artificial teeth 5 are arranged between the first virtual curve 18 expressed by the quadratic function Y mm={(X mm×X mm)/32 mm}−5 mm and the second virtual curve 19 expressed by Y mm={(X mm×X mm)/8 mm}+5 mm in the XY plane of the virtual XYZ orthogonal coordinate system. X mm and Y mm mean an X coordinate value and a Y coordinate value, respectively. The (X mm×X mm) of the quadratic function represents that Xmm is multiplied by Xmm. Additionally, "mm" of the quadratic function means a unit of length.

To further exert the effects of the invention, preferably, the first virtual curve 18 is expressed by Y mm={(X mm×X mm)/30 mm}−3 mm, and the second virtual curve 19 is expressed by Y mm={(X mm×X mm)/10 mm}+3 mm. Therefore, preferably, the crown forms of the artificial teeth for mandibular central incisor T8, the artificial teeth for mandibular lateral incisor T9, the artificial teeth for mandibular canine T10, the artificial teeth for mandibular first premolar T11, the artificial teeth for mandibular second premolar T12, the artificial teeth for mandibular first molar T13, and the artificial teeth for mandibular second molar T14 on both the left and right sides of the mandibular coupled artificial teeth 5 are arranged between the first virtual curve 18 expressed by the quadratic function Y mm={(X mm×X mm)/30 mm}−3 mm and the second virtual curve 19 expressed by Y mm={(X mm×X mm)/10 mm}+3 mm in the XY plane of the virtual XYZ orthogonal coordinate system.

A total width L1 in the mesiodistal direction from the left artificial tooth for mandibular second molar T14 to the right artificial tooth for mandibular second molar T14 is between 80.0 mm and 130.0 mm. To further exert the effects of the invention, preferably, the total width L1 in the mesiodistal direction from the left artificial tooth for mandibular second molar T14 to the right artificial tooth for mandibular second molar T14 is between 90.0 mm to 120.0 mm.

As shown in FIG. 2, the total width L1 in the mesiodistal direction from the left artificial tooth for mandibular second molar T14 to the right artificial tooth for mandibular second molar T14 is a sum of respective widths in the mesiodistal direction of the 14 teeth of the artificial teeth for mandibular central incisor T8, the artificial teeth for mandibular lateral incisor T9, the artificial teeth for mandibular canine T10, the artificial teeth for mandibular first premolar T11, the artificial teeth for mandibular second premolar T12, the artificial teeth for mandibular first molar T13, and the artificial teeth for mandibular second molar T14 respectively arranged on both the left and right sides.

Figure 3:
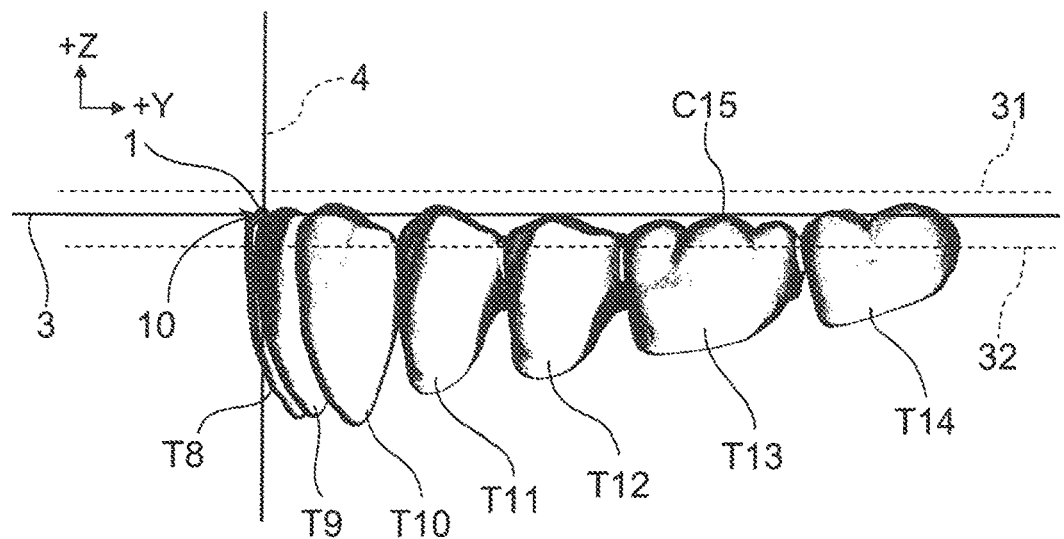
FIG. 3 is a left side view of the mandibular coupled artificial teeth.

FIG. 3 shows a state of the mandibular coupled artificial teeth 5 according to claim 1 as viewed from the sagittal plane. FIG. 3 shows a first virtual straight line 31 indicative of an upper limit of a vertical arrangement region of the incisal edges of the incisors and the canines and the cusp apexes of the molars of the mandibular coupled artificial teeth 5 and a second virtual straight line 32 indicative of a lower limit of the vertical arrangement region of the incisal edges of the incisors and the canines and the cusp apexes of the molars of the mandibular coupled artificial teeth 5. The first virtual straight line 31 is a virtual straight line expressed by the Z coordinate value of +5.0 mm. The second virtual straight line 32 is a virtual straight line expressed by the Z coordinate value of −10.0 mm. In the mandibular coupled artificial teeth 5, the incisal edges of all the incisors and canines and the cusp apexes of all the molars are arranged between the first virtual straight line 31 and the second virtual straight line 32. In other words, in the mandibular coupled artificial teeth 5, the incisal edges of all the incisors and canines and the cusp apexes of all the molars are arranged at the Z coordinate values between −10.0 mm and +5.0 mm. To further exert the effects of the invention, preferably, in the mandibular coupled artificial teeth 5, the incisal edges of all the incisors and canines and the cusp apexes of all the molars are arranged between −5.0 mm and +2.0 mm.

Figure 4:
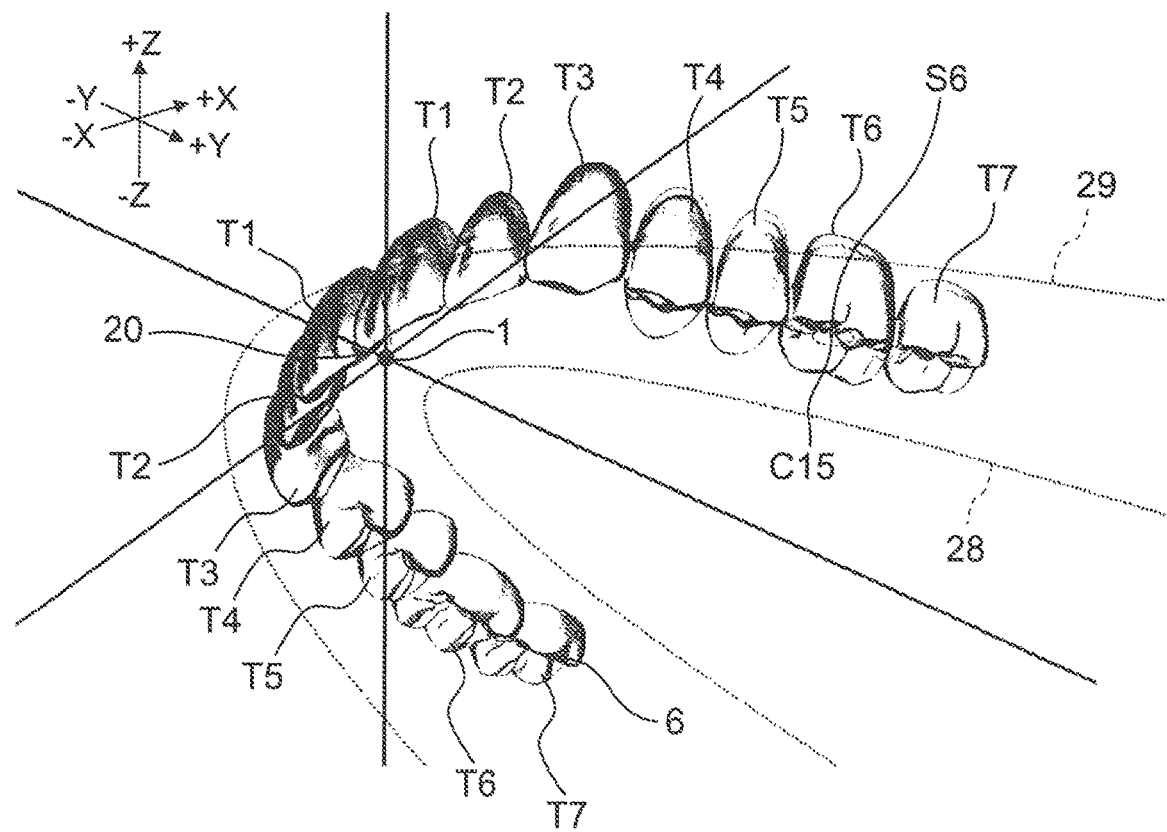
FIG. 4 is a perspective view of a maxillary coupled artificial teeth.

FIG. 4 is a perspective view of maxillary coupled artificial teeth 6 according to claim 1 as viewed from the left front lower side. As shown in FIG. 4, the maxillary coupled artificial teeth 6 have an artificial tooth for maxillary central incisor T1, an artificial tooth for maxillary lateral incisor T2, an artificial tooth for maxillary canine T3, an artificial tooth for maxillary first premolar T4, an artificial tooth for maxillary second premolar T5, an artificial tooth for maxillary first molar T6, and an artificial tooth for maxillary second molar T7 arranged on each of the left and right sides. At the center of the maxillary coupled artificial teeth 6, the left and right artificial teeth for maxillary central incisor T1 are coupled to each other. At the respective parts on both the left and right sides of the maxillary coupled artificial teeth 6, the artificial tooth for maxillary central incisor T1, the artificial tooth for maxillary lateral incisor T2, the artificial tooth for maxillary canine T3, the artificial tooth for maxillary first premolar T4, the artificial tooth for maxillary second premolar T5, the artificial tooth for maxillary first molar T6, and the artificial tooth for maxillary second molar T7 are coupled in this order.

As described above, the maxillary coupled artificial teeth 6 include 14 forms of the artificial teeth for maxillary central incisor T1, the artificial teeth for maxillary lateral incisor T2, the artificial teeth for maxillary canine 13, the artificial teeth for maxillary first premolar T4, the artificial teeth for maxillary second premolar T5, the artificial teeth for maxillary first molar T6, and the artificial teeth for maxillary second molar T7 respectively arranged on both the left and right sides. These elements are adjacent in accordance with anatomical rules and coupled to each other. The maxillary coupled artificial teeth 6 have an arch shape formed by coupling the 14 forms of the artificial teeth for maxillary central incisor T1, the artificial teeth for maxillary lateral incisor T2, the artificial teeth for maxillary canine T3, the artificial teeth for maxillary first premolar T4, the artificial teeth for maxillary second premolar T5, the artificial teeth for maxillary first molar T6, and the artificial teeth for maxillary second molar T7. In other words, the maxillary coupled artificial teeth 6 have a circular arc shape formed by coupling the 14 forms of the artificial teeth for maxillary central incisor T1, the artificial teeth for maxillary lateral incisor T2, the artificial teeth for maxillary canine T3, the artificial teeth for maxillary first premolar T4, the artificial teeth for maxillary second premolar T5, the artificial teeth for maxillary first molar T6, and the artificial teeth for maxillary second molar T7.

Figure 5:
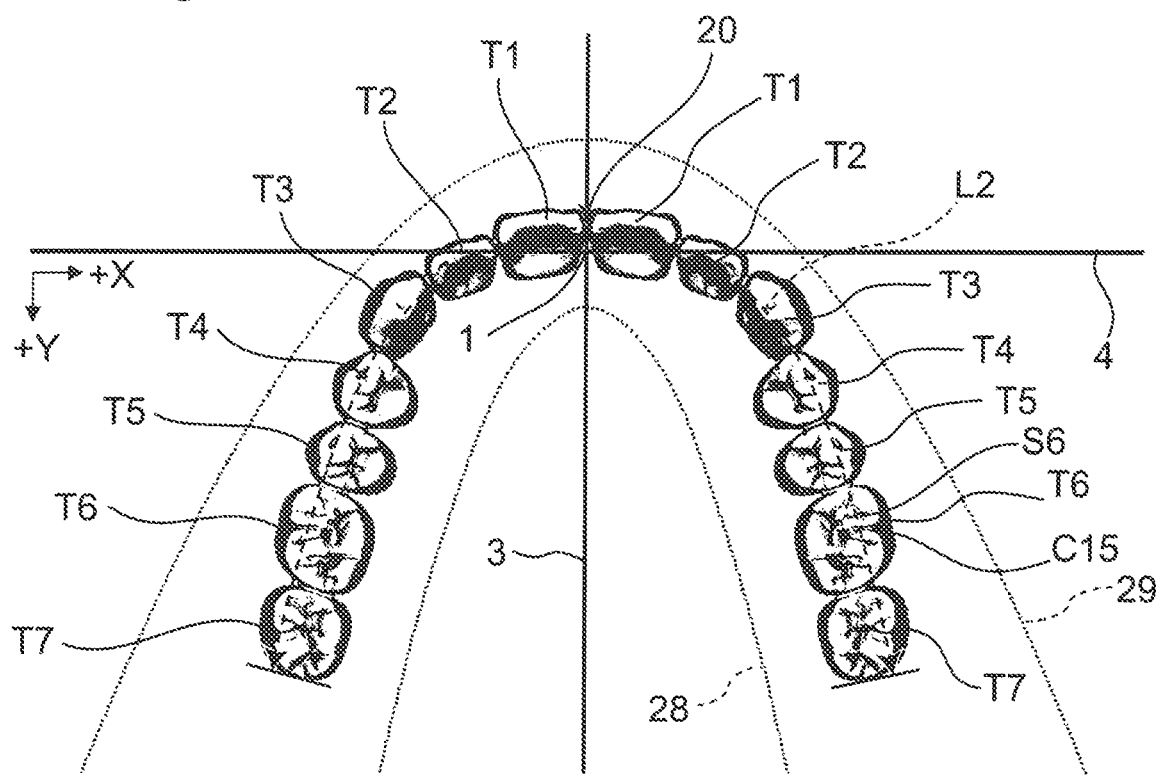
FIG. 5 is an occlusal view of the maxillary coupled artificial teeth.

FIG. 5 shows a view of the maxillary coupled artificial teeth 6 as viewed from the occlusal plane. As shown in FIG. 5, the maxillary coupled artificial teeth 6 are arranged such that a maxillary incisal point 20 has an X coordinate value of 0 mm, a Y coordinate value of −10.0 mm to 0 mm, and a Z coordinate value of −10.0 min to 0 mm relative to the origin 1 of the virtual XYZ orthogonal coordinate system. A part on the left side of the maxillary coupled artificial teeth 6 has a positive (+) X coordinate value, and a part on the right side of the maxillary coupled artificial teeth 6 has a negative (−) X coordinate value. The maxillary coupled artificial teeth 6 are arranged such that the incisal edges of the incisors and canines and the cusp apexes of the molars of the parts have equal absolute values on the left and right sides. The maxillary coupled artificial teeth 6 are arranged such that a central fossa S6 of the artificial tooth for maxillary first molar T6 has X and Y coordinate values within a radius of 5.0 mm around the distobuccal cusp apex C15 of the artificial tooth for mandibular first molar T13 and a Z coordinate value between 0 mm and +5.0 mm.

In other words, in the maxillary coupled artificial teeth 6, the maxillary incisal point 20 is the middle point between the mesial incisal edge corners of the left and right artificial teeth for maxillary central incisor T1 and is arranged to have an X coordinate value of 0 mm, a Y coordinate value of −10.0 mm to 0 mm, and a Z coordinate value of −10.0 mm to 0 min relative to the origin 1 of the virtual XYZ orthogonal coordinate system. The left parts of the maxillary coupled artificial teeth 6 are arranged on the positive (+) X coordinate value side, and the right parts of the maxillary coupled artificial teeth 6 are arranged on the negative (−) X coordinate value side. The absolute values of the X, Y, and Z coordinate values of positions of the incisal edges of the incisors and the canine and the cusp apexes of the molars of the left parts of the maxillary coupled artificial teeth 6 are respectively equal to the absolute values of the X, Y, and Z coordinate values of positions of the incisal edges of the incisors and the canine and the cusp apexes of the molars of the right parts of the maxillary coupled artificial teeth 5. The central fossa S6 of the artificial tooth for maxillary first molar T6 may have X and Y coordinate values within a radius of 5.0 mm around the distobuccal cusp apex C15 of the artificial tooth for mandibular first molar T13 and a Z coordinate value between 0 mm and +5.0 mm.

The maxillary incisal point 20 is a middle point between the mesial incisal edge corners of the left and right artificial teeth for maxillary central incisor T1.

In this case, crown forms of all the parts are arranged between a third virtual curve 28 expressed by a quadratic function Y mm={(X mm×X mm)/36 mm}−12 mm and a fourth virtual curve 29 expressed by Y mm={(X mm×X mm)/8 mm}+5 mm. Therefore, when the maxillary coupled artificial teeth 6 are represented by the virtual XYZ orthogonal coordinate system, the crown forms of the artificial teeth for maxillary central incisor T1, the artificial teeth for maxillary lateral incisor T2, the artificial teeth for maxillary canine T3, the artificial teeth for maxillary first premolar T4, the artificial teeth for maxillary second premolar T5, the artificial teeth for maxillary first molar T6, and the artificial teeth for maxillary second molar T7 on both the left and right sides of the maxillary coupled artificial teeth 6 are arranged between the third virtual curve 28 expressed by the quadratic function Y mm={(X mm×X mm)/36 mm}−12 mm and the fourth virtual curve 29 expressed by Y mm={(X mm×X mm)/8 mm}+5 mm in the XY plane of the virtual XYZ orthogonal coordinate system.

To further exert the effects of the invention, preferably, the third virtual curve 28 is expressed as Y mm={(X mm×X mm)/32 mm}−8 mm, and the fourth virtual curve 29 is expressed by Y mm={(X mm×X mm)/10 mm}+3 mm. Therefore, preferably, the crown forms of the artificial teeth for maxillary central incisor T1, the artificial teeth for maxillary lateral incisor T2, the artificial teeth for maxillary canine T3, the artificial teeth for maxillary first premolar T4, the artificial teeth for maxillary second premolar T5, the artificial teeth for maxillary first molar T6, and the artificial teeth for maxillary second molar T7 on both the left and right sides of the maxillary coupled artificial teeth 6 are arranged between the third virtual curve 28 expressed by the quadratic function Y mm={(X mm×X mm)/32 mm}−8 mm and the fourth virtual curve 29 expressed by Y mm={(X mm×X mm)/10 mm}+3 mm in the XY plane of the virtual XYZ orthogonal coordinate system.

A total width L2 in the mesiodistal direction from the left artificial tooth for maxillary second molar T7 to the right artificial tooth for maxillary second molar T7 is between 90.0 mm and 140.0 mm. To further exert the effects of the invention, preferably, the total width L2 in the mesiodistal direction from the left artificial tooth for maxillary second molar T7 to the right artificial tooth for maxillary second molar T7 is between 100.0 mm to 130.0 mm.

As shown in FIG. 5, the total width L2 in the mesiodistal direction from the left artificial tooth for maxillary second molar T7 to the right artificial tooth for maxillary second molar T7 is a sum of respective widths in the mesiodistal direction of the 14 teeth of the artificial teeth for maxillary central incisor T1, the artificial teeth for maxillary lateral incisor T2, the artificial teeth for maxillary canine T3, the artificial teeth for maxillary first premolar T4, the artificial teeth for maxillary second premolar T5, the artificial teeth for maxillary first molar T6, and the artificial teeth for maxillary second molar T7 respectively arranged on both the left and right sides.

Figure 6:
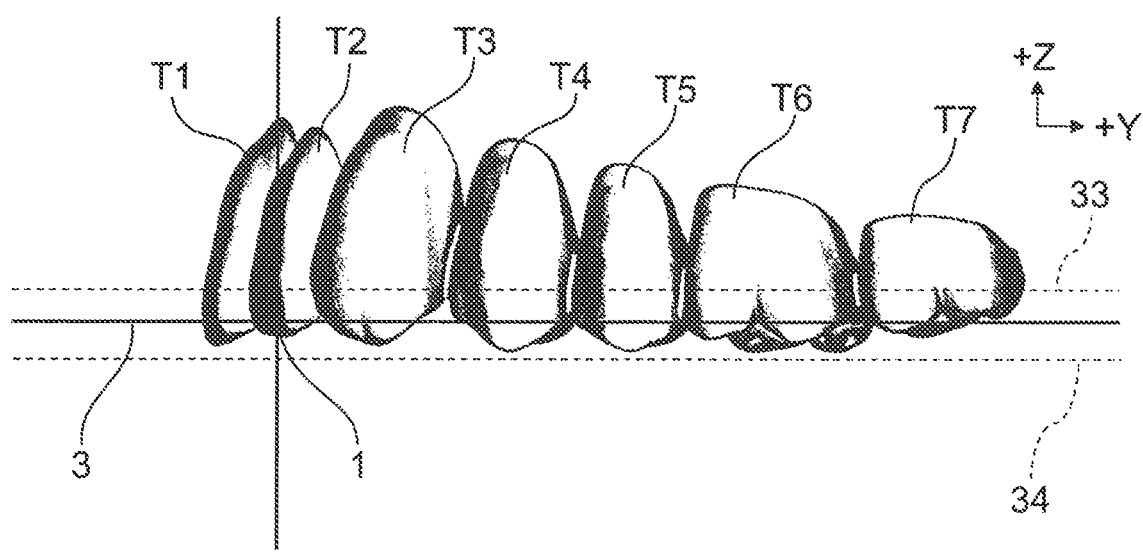
FIG. 6 is a left side view of the maxillary coupled artificial teeth.

FIG. 6 shows a state of the maxillary coupled artificial teeth 6 as viewed from the sagittal plane. FIG. 6 shows a third virtual straight line 33 indicative of an upper limit of a vertical arrangement region of the incisal edges of the incisors and the canines and the cusp apexes of the molars of the maxillary coupled artificial teeth 6, and a fourth virtual straight line 34 indicative of a lower limit of the vertical arrangement region of the incisal edges of the incisors and the canines and the cusp apexes of the molars of the maxillary coupled artificial teeth 6. The third virtual straight line 33 is a virtual straight line expressed by the Z coordinate value of +10.0 mm. The fourth virtual straight line 34 is a virtual straight line expressed by the Z coordinate value of −5.0 mm. In the maxillary coupled artificial teeth 6, the incisal edges of all the incisors and canines and the cusp apexes of all the molars are arranged between the third virtual straight line 33 and the fourth virtual straight line 34. In other words, the incisal edges of all the incisors and canines and the cusp apexes of all the molars in the maxillary coupled artificial teeth 6 have a Z coordinate value arranged between −5.0 mm and +10.0 mm. To further exert the effects of the invention, preferably, in the maxillary coupled artificial teeth 6, the incisal edges of all the incisors and canines and the cusp apexes of all the molars are arranged in the range of the Z coordinate value of −3.0 mm and +5.0 mm.

Figure 7A:
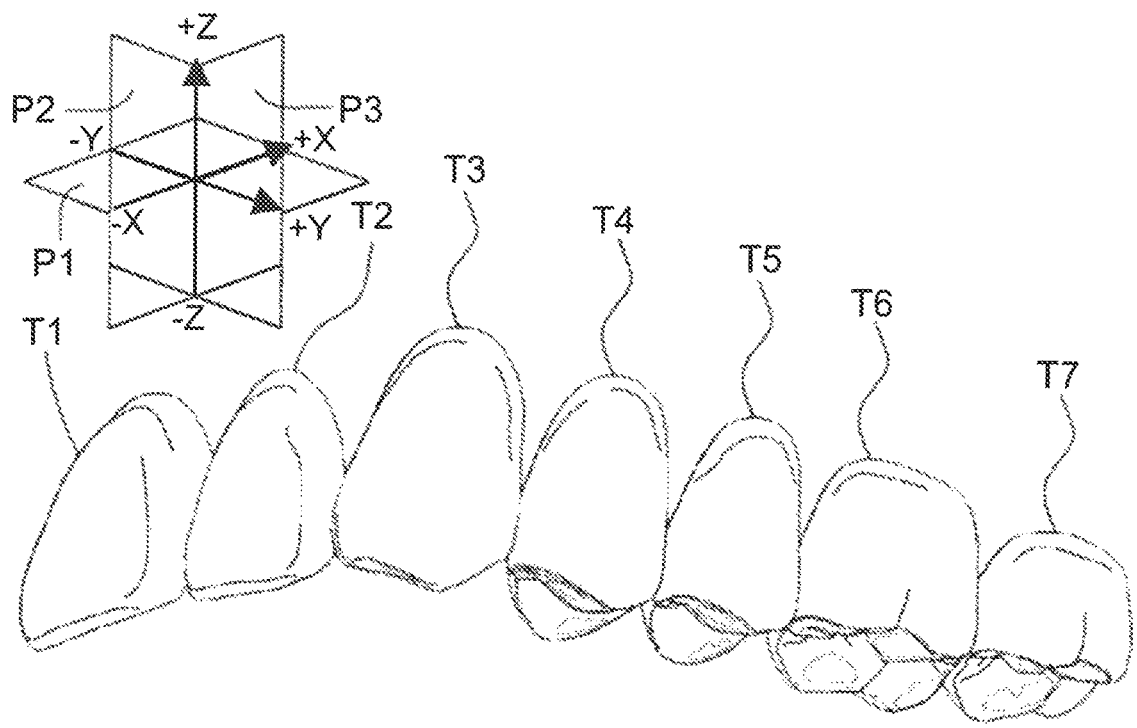
FIG. 7A is a perspective view of an arrangement relationship between a virtual occlusal plane and a virtual XYZ coordinate system, and the maxillary coupled artificial teeth as viewed from the buccal side.
Figure 7B:
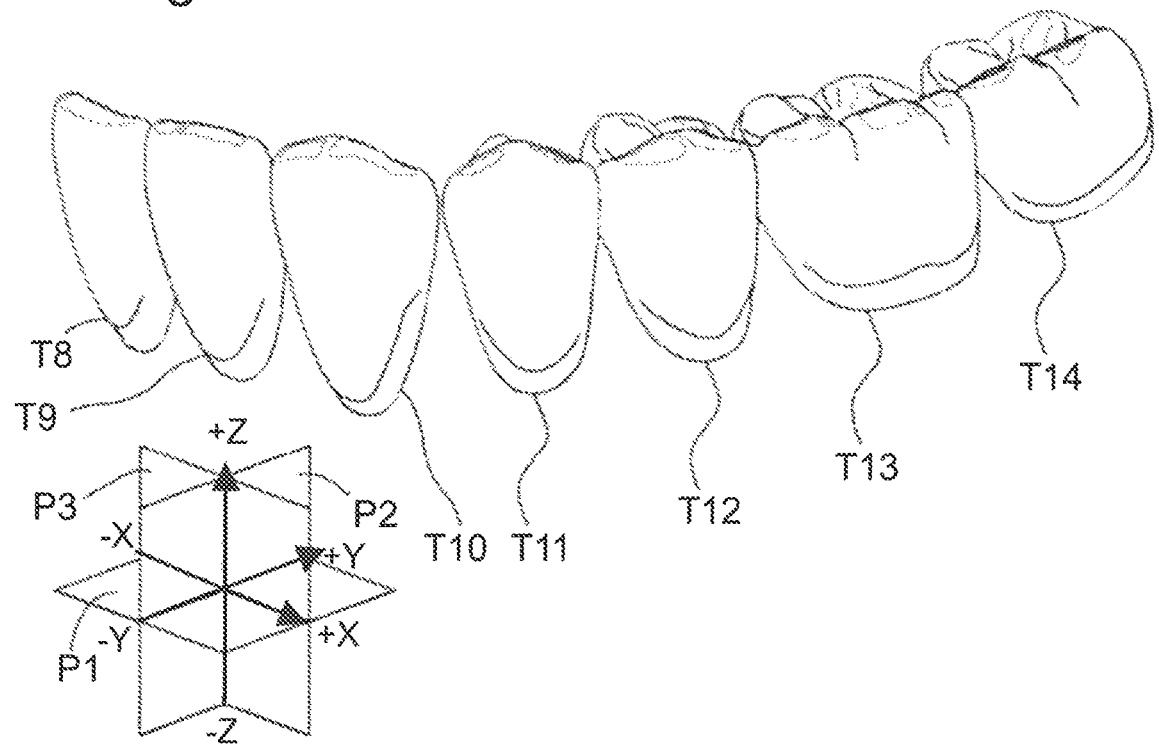
FIG. 7B is a perspective view of an arrangement relationship between a virtual occlusal plane and a virtual XYZ coordinate system, and the mandibular coupled artificial teeth as viewed from the buccal side.
Figure 8A:
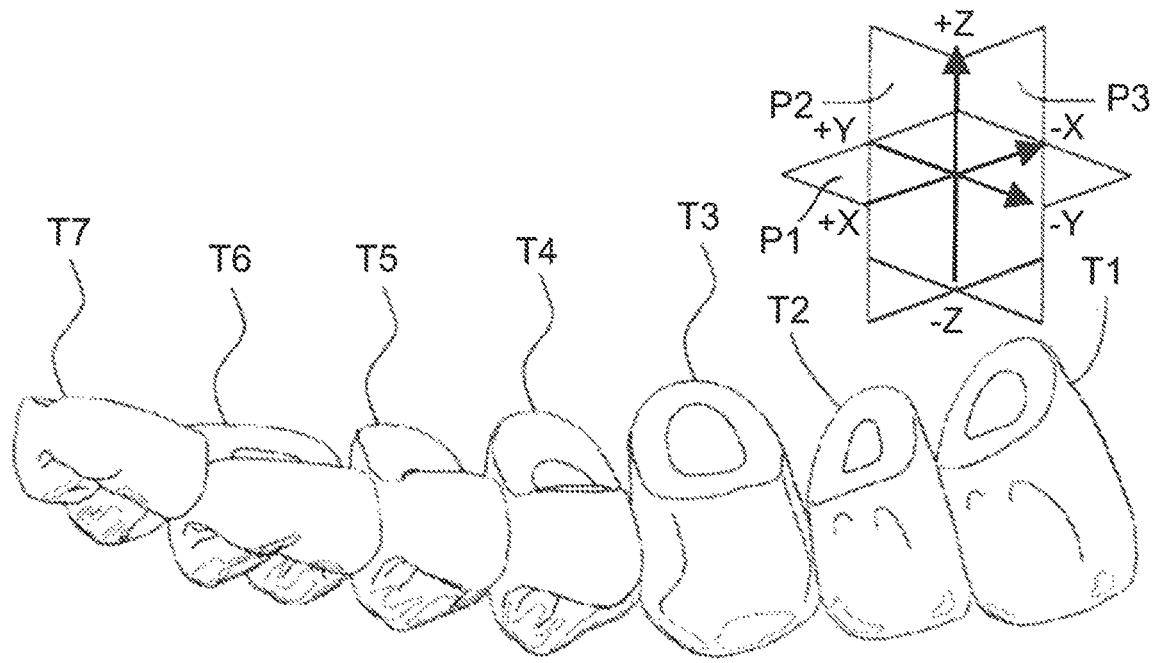
FIG. 8A is a perspective view of an arrangement relationship between a virtual occlusal plane and a virtual XYZ coordinate system, and the maxillary coupled artificial teeth as viewed from the lingual side.
Figure 8B:
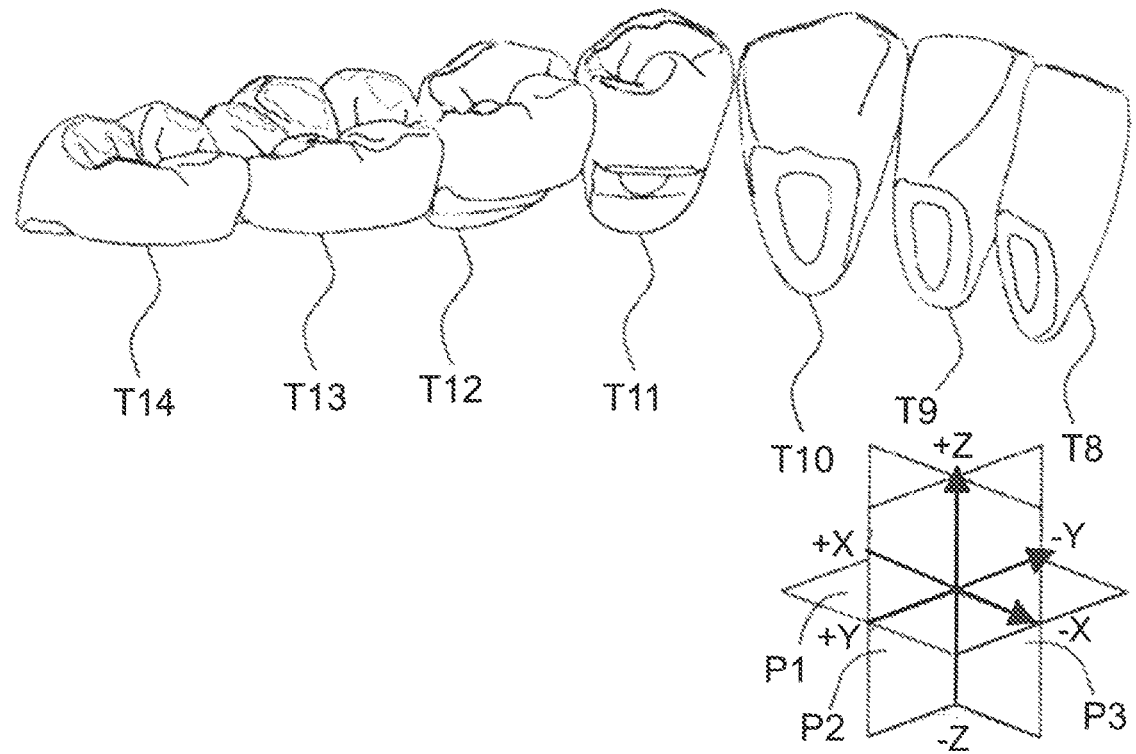
FIG. 8B is a perspective view of an arrangement relationship between a virtual occlusal plane and a virtual XYZ coordinate system, and the mandibular coupled artificial teeth as viewed from the lingual side.

FIG. 7A is a perspective view of an arrangement relationship between a virtual occlusal plane and a virtual XYZ coordinate system, and the maxillary coupled artificial teeth as viewed from the buccal side, and FIG. 7B is a perspective view of an arrangement relationship between a virtual occlusal plane and a virtual XYZ coordinate system, and the mandibular coupled artificial teeth as viewed from the buccal side. FIG. 8A is a perspective view of an arrangement relationship between a virtual occlusal plane and a virtual XYZ coordinate system, and the maxillary coupled artificial teeth as viewed from the lingual side, and FIG. 8B is a perspective view of an arrangement relationship between a virtual occlusal plane and a virtual XYZ coordinate system, and the mandibular coupled artificial teeth as viewed from the lingual side. In FIGS. 7A, 7B, 8A, and 8B, a tip of an incisor guidance target is made coincident with the origin 1 of the virtual XYZ coordinate system. An occlusal plane P1 of an occlusal plane table is defined as an XY plane of the virtual XYZ coordinate system, a sagittal plane P2 is defined as a YZ plane of the virtual XYZ coordinate system, and a frontal plane P3 is defined as a ZX plane of the virtual XYZ coordinate system. A set of maxillary and mandibular coupled artificial teeth is set such that the left parts of the artificial teeth have a positive (+) X coordinate value and the right parts have a negative (−) X coordinate value. Therefore, the left parts of the mandibular coupled artificial teeth 5 and the maxillary coupled artificial teeth 6 are arranged on the positive (+) X coordinate value side, and the right parts of the mandibular coupled artificial teeth 5 and the maxillary coupled artificial teeth 6 are arranged on the negative (−) X coordinate side.

Figure 9A:
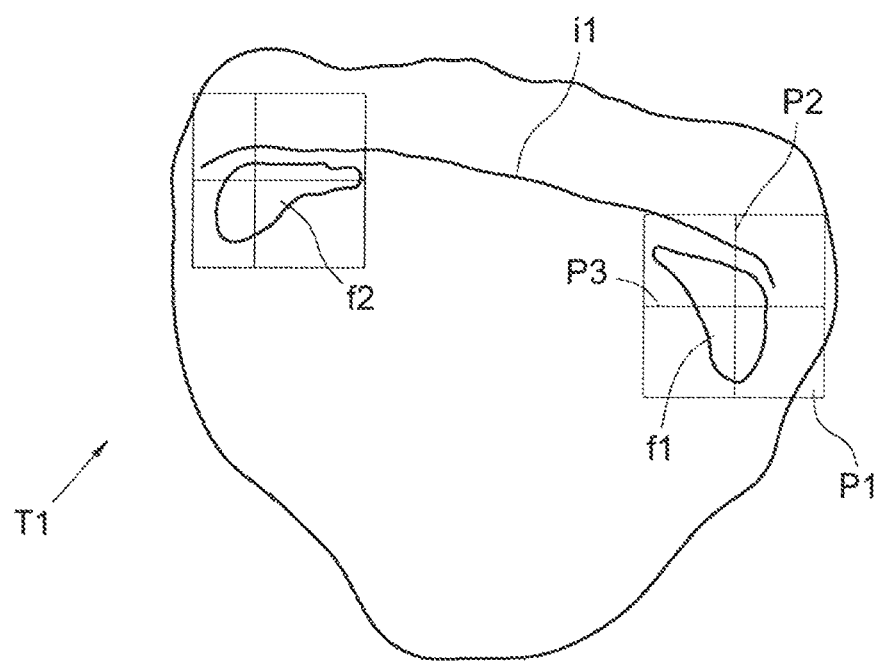
FIG. 9A is an occlusal view of an artificial tooth for central incisor in the maxillary coupled artificial teeth.
Figure 9B:
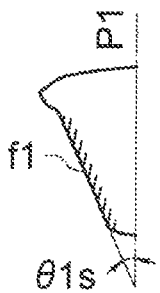
FIG. 9B is a view of the protrusive facet of the artificial tooth for central incisor of FIG. 9A as viewed from the sagittal plane side.
Figure 9C:
FIG. 9C is a view of the protrusive facet of the artificial tooth for central incisor of FIG. 9A as viewed from the frontal plane side.
Figure 9D:
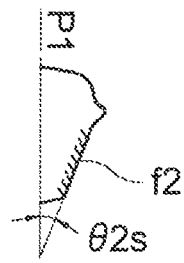
FIG. 9D is a view of the retrusive facet of the artificial tooth for central incisor of FIG. 9A as viewed from the sagittal plane side.
Figure 9E:
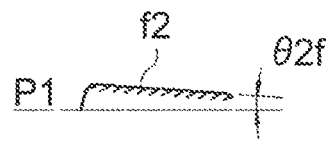
FIG. 9E is a view of the retrusive facet of the artificial tooth for central incisor of FIG. 9A as viewed from the frontal plane side.

FIG. 9A shows a state of the artificial tooth for maxillary central incisor T1 of the maxillary coupled artificial teeth 6 as viewed from the occlusal plane. FIG. 9B shows a view of a protrusive facet f1 of the artificial tooth for maxillary central incisor T1 of FIG. 9A as viewed from the sagittal plane P2 side. FIG. 9C shows a view of the protrusive facet f1 of the artificial tooth for maxillary central incisor T1 of FIG. 9A as viewed from the frontal plane P3 side. FIG. 9D shows a view of a protrusive facet f2 of the artificial tooth for maxillary central incisor T1 of FIG. 9A as viewed from the sagittal plane P2 side. FIG. 9E is a view of the protrusive facet f2 of the artificial tooth for maxillary central incisor T1 of FIG. 9A as viewed from the frontal plane P3 side.

The artificial tooth for maxillary central incisor T1 has the protrusive facet f1 and the protrusive facet f2 at an incisal edge i1.

Angles formed by the protrusive facet f1 relative to the occlusal plane P1 include an angle ($\theta 1s$) in a cross section on the sagittal plane P2 of 22.0° to 25.5°, preferably 23.5° to 24.5°, and an angle ($\theta 1f$) in a cross section on the frontal plane P3 of 1.5° to 6.5°, preferably 3.5° to 4.5°.

Angles formed by the protrusive facet f2 relative to the occlusal plane P1 include an angle ($\theta 2s$) in a cross section on the sagittal plane P2 of 20.5° to 23.0°, preferably 21.0 to 22.0°, and an angle ($\theta 2f$) in a cross section on the frontal plane P3 of 1.5° to 6.5°, preferably 2.5° to 5.5°.

Figure 10:
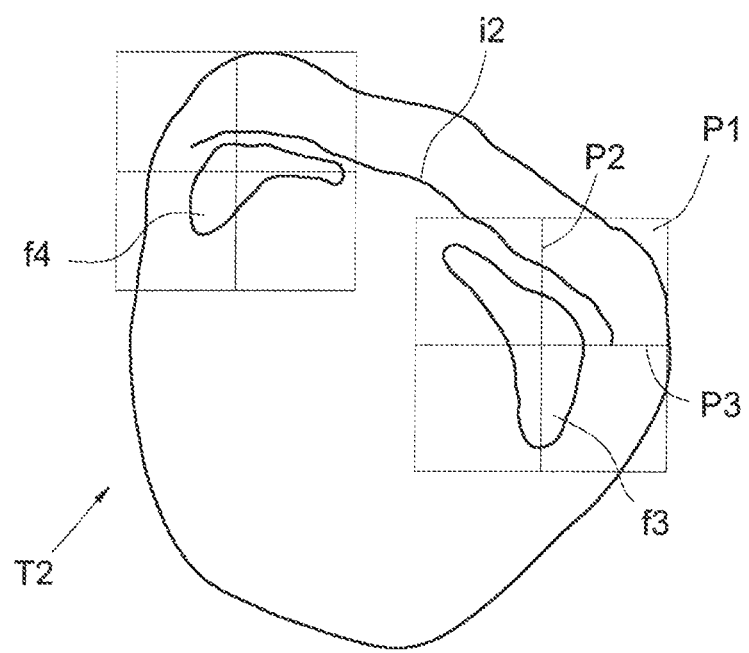
FIG. 10 is an occlusal view of an artificial tooth for lateral incisor in the maxillary coupled artificial teeth.

FIG. 10 shows a state of the artificial tooth for maxillary lateral incisor T2 of the maxillary coupled artificial teeth 6 as viewed from the occlusal plane.

The artificial tooth for maxillary lateral incisor T2 has a protrusive facet f3 and a protrusive facet f4 at an incisal edge i2.

Angles formed by the protrusive facet f3 relative to the occlusal plane P1 include an angle in a cross section on the sagittal plane P2 of 23.0° to 28.0°, preferably 25.0° to 26.0°, and an angle in a cross section on the frontal plane P3 of 15.0° to 17.0°, preferably 15.5° to 16.5°.

Angles formed by the protrusive facet f4 relative to the occlusal plane P1 include an angle in a cross section on the sagittal plane P2 of 16.0° to 22.0°, preferably 17.0° to 20.0°, and an angle in a cross section on the frontal plane P3 of 9.5° to 10.5°, preferably 10.0° to 10.5°.

Figure 11:
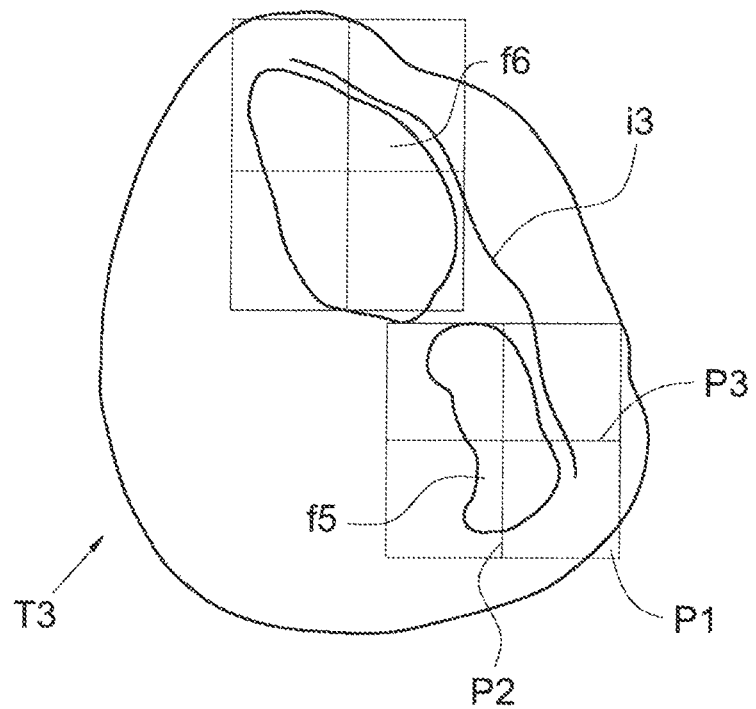
FIG. 11 is an occlusal view of an artificial tooth for canine in the maxillary coupled artificial teeth.

FIG. 11 shows a state of the artificial tooth for maxillary canine T3 of the maxillary coupled artificial teeth 6 as viewed from the occlusal plane.

The artificial tooth for maxillary canine T3 has a protrusive facet f5 and a retrusive facet f6 at an incisal edge i3.

Angles formed by the protrusive facet f5 relative to the occlusal plane P1 include an angle in a cross section on the sagittal plane P2 of 25.0° to 31.0°, preferably 26.0° to 30.0°, and an angle in a cross section on the frontal plane P3 of 1.5° to 5.0°, preferably 2.5° to 4.5°.

Angles formed by the retrusive facet f6 relative to the occlusal plane P1 include an angle in a cross section on the sagittal plane P2 of 8.5° to 22.5°, preferably 10.0° to 15.5°, and an angle in a cross section on the frontal plane P3 of 18.0° to 25.0°, preferably 19.0° to 24.0°.

Figure 12:
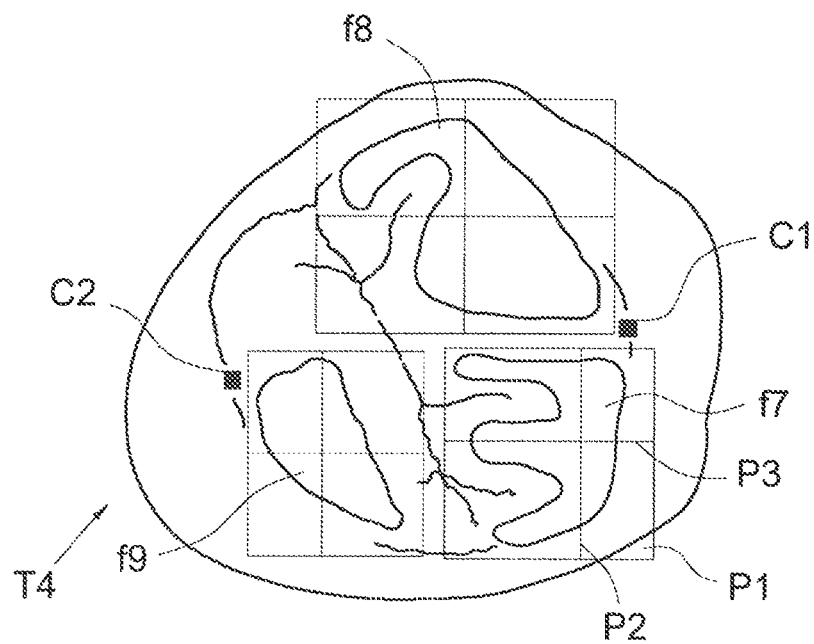
FIG. 12 is an occlusal view of an artificial tooth for first premolar in the maxillary coupled artificial teeth.

FIG. 12 shows a state of the artificial tooth for maxillary first premolar T4 of the maxillary coupled artificial teeth 6 as viewed from the occlusal plane.

The artificial tooth for maxillary first premolar T4 has a protrusive facet f7 and a retrusive facet f8 in the vicinity of a buccal cusp apex C1 and has a balancing facet f9 in the vicinity of a lingual cusp apex C2.

Angles formed by the protrusive facet f7 relative to the occlusal plane P1 include an angle in a cross section on the sagittal plane P2 of 24.5° to 27.5°, preferably 25.5° to 27.0°, and an angle in a cross section on the frontal plane P3 of 8.5° to 16.4°, preferably 10.0° to 15.0°.

Angles formed by the retrusive facet f8 relative to the occlusal plane P1 include an angle in a cross section on the sagittal plane P2 of 18.5° to 27.0°, preferably 20.5° to 25.0°, and an angle in a cross section on the frontal plane P3 of 10.0° to 18.0°, preferably 13.5° to 16.5°.

Angles formed by the balancing facet f9 relative to the occlusal plane P1 include an angle in a cross section on the sagittal plane P2 of 1.5° to 4.5°, preferably 2.0° to 3.5°, and an angle in a cross section on the frontal plane P3 of 29.5° to 35.5°, preferably 30.0° to 35.0°.

Figure 13:
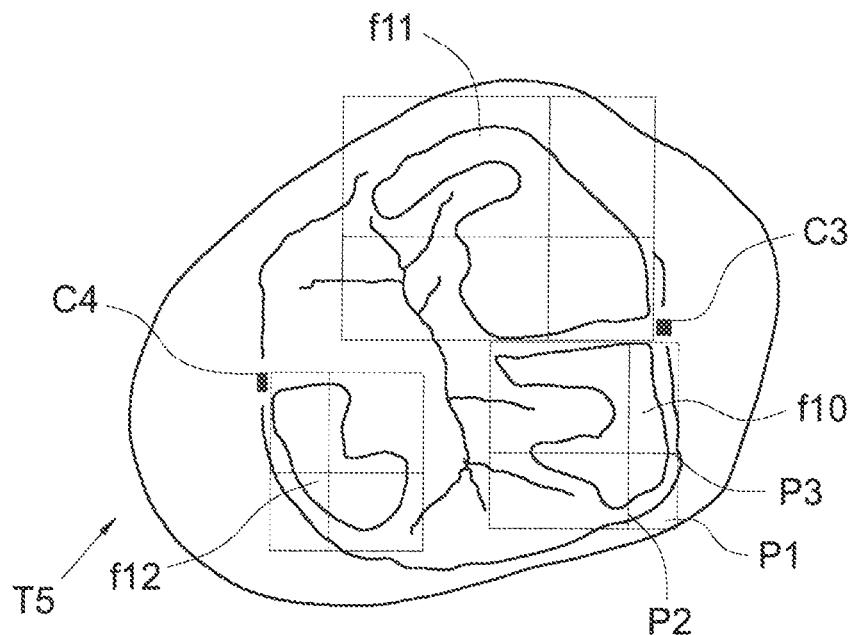
FIG. 13 is an occlusal view of an artificial tooth for second premolar in the maxillary coupled artificial teeth.

FIG. 13 shows a state of the artificial tooth for maxillary second premolar T5 of the maxillary coupled artificial teeth 6 as viewed from the occlusal plane.

The artificial tooth for maxillary second premolar T5 has a protrusive facet f10 and a retrusive facet f11 in the vicinity of a buccal cusp apex C3 and has a balancing facet f12 in the vicinity of a lingual cusp apex C4.

Angles formed by the protrusive facet f10 relative to the occlusal plane P1 include an angle in a cross section on the sagittal plane P2 of 23.0° to 28.0°, preferably 23.5° to 27.0°, and an angle in a cross section on the frontal plane P3 of 10.0° to 19.0°, preferably 12.5° to 15.5°.

Angles formed by the retrusive facet f11 relative to the occlusal plane P1 include an angle in a cross section on the sagittal plane P2 of 16.5° to 19.0°, preferably 17.5° to 18.5°, and an angle in a cross section on the frontal plane P3 of 13.0° to 17.5°, preferably 14.0° to 15.5°.

Angles formed by the balancing facet f12 relative to the occlusal plane P1 include an angle in a cross section on the sagittal plane P2 of 6.0° to 10.0°, preferably 7.5° to 9.0°, and an angle in a cross section on the frontal plane P3 of 25.5° to 29.0°, preferably 27.0° to 28.0°.

Figure 14:
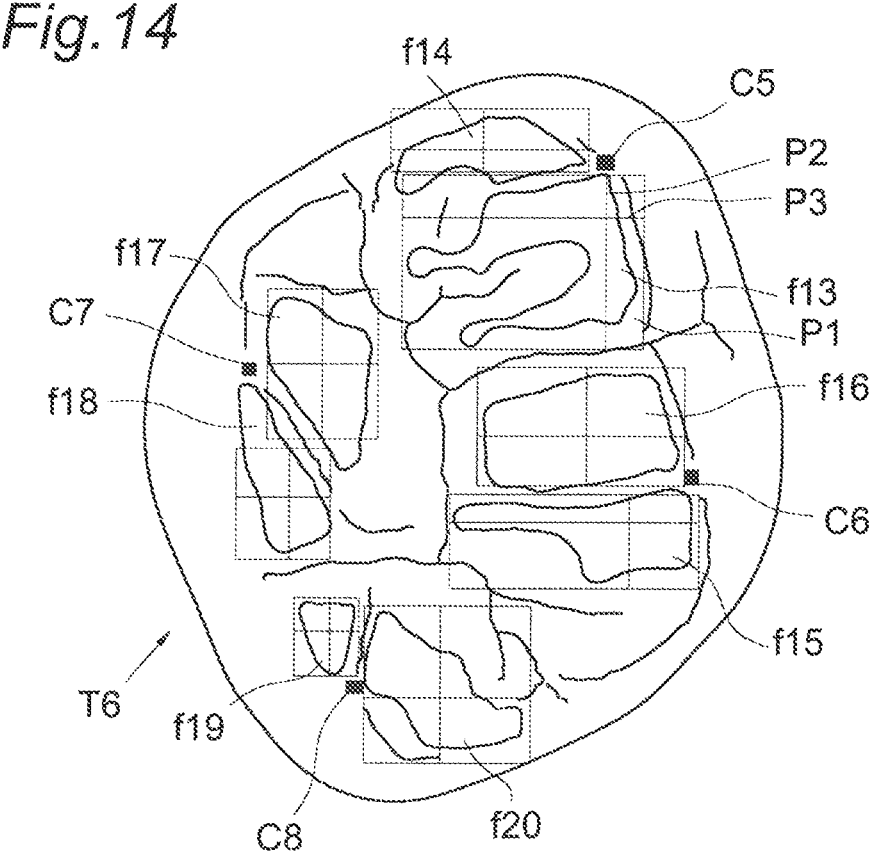
FIG. 14 is an occlusal view of an artificial tooth for first molar in the maxillary coupled artificial teeth.

FIG. 14 shows a state of the artificial tooth for maxillary first molar T6 of the maxillary coupled artificial teeth 6 as viewed from the occlusal plane.

The artificial tooth for maxillary first molar T6 has a protrusive facet f13 and a retrusive facet f14 in the vicinity of a mesiobuccal cusp apex C5, has a protrusive facet f15 and a retrusive facet f16 in the vicinity of a distobuccal cusp apex C6, has a balancing facet f17 and a protrusive facet f18 in the vicinity of a mesiobuccal cusp apex C7, and has a retrusive facet f19 and a protrusive facet f20 in the vicinity of a distolingual cusp apex C8.

Angles formed by the protrusive facet f13 relative to the occlusal plane P1 include an angle in a cross section on the sagittal plane P2 of 18.5° to 21.0°, preferably 19.5° to 20.5°, and an angle in a cross section on the frontal plane P3 of 5.0° to 11.0°, preferably 6.0° to 10.0°.

Angles formed by the retrusive facet f14 relative to the occlusal plane P1 include an angle in a cross section on the sagittal plane P2 of 7.0° to 12.0°, preferably 7.5° to 10.0°, and an angle in a cross section on the frontal plane P3 of 9.0° to 13.0°, preferably 10.0° to 12.0°.

Angles formed by the protrusive facet f15 relative to the occlusal plane P1 include an angle in a cross section on the sagittal plane P2 of 15.5° to 19.5°, preferably 17.0° to 18.5°, and an angle in a cross section on the frontal plane P3 of 8.0° to 9.0°, preferably 8.5° to 9.0°.

Angles formed by the retrusive facet f16 relative to the occlusal plane P1 include an angle in a cross section on the sagittal plane P2 of 18.5° to 23.0°, preferably 19.0° to 21.0°, and an angle in a cross section on the frontal plane P3 of 11.0° to 13.5°, preferably 12.0° to 13.0°.

Angles formed by the balancing facet f17 relative to the occlusal plane P1 include an angle in a cross section on the sagittal plane P2 of 14.5° to 16.5°, preferably 15.0° to 16.0°, and an angle in a cross section on the frontal plane P3 of 40.0° to 42.0°, preferably 40.5° to 41.5°.

Angles formed by the protrusive facet f18 relative to the occlusal plane P1 include an angle in a cross section on the sagittal plane P2 of 18.5° to 19.5°, preferably 18.5° to 19.0°, and an angle in a cross section on the frontal plane P3 of 4.5° to 6.5°, preferably 5.0° to 6.0°.

Angles formed by the retrusive facet f19 relative to the occlusal plane P1 include an angle in a cross section on the sagittal plane P2 of 6.5° to 7.5°, preferably 7.0° to 7.5°, and an angle in a cross section on the frontal plane P3 of 15.5° to 18.0°, preferably 16.0° to 17.5°.

Angles formed by the balancing facet f20 relative to the occlusal plane P1 include an angle in a cross section on the sagittal plane P2 of 3.0° to 12.0°, preferably 5.0° to 10.0°, and an angle in a cross section on the frontal plane P3 of 32.0° to 38.5°, preferably 33.0° to 37.0°.

Figure 15:
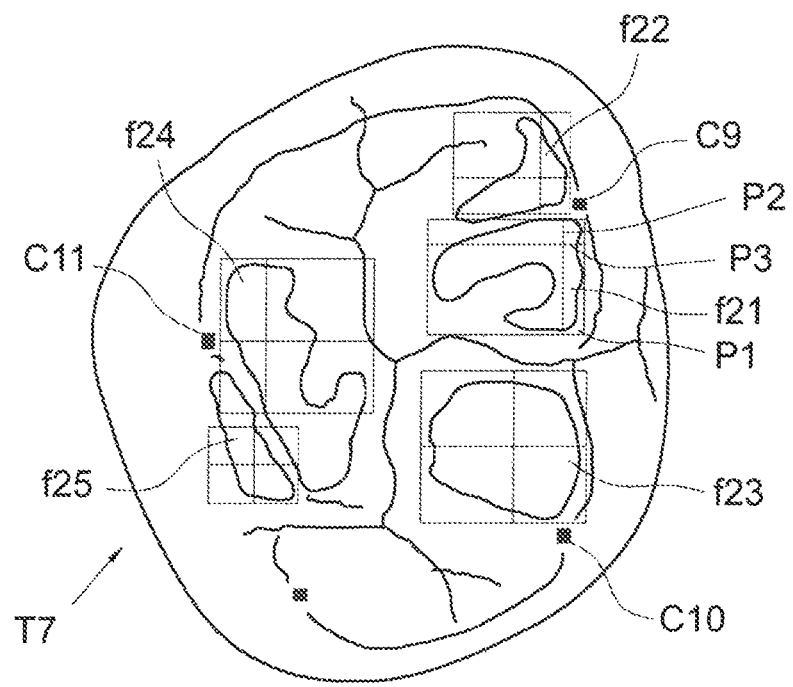
FIG. 15 is an occlusal view of an artificial tooth for second molar in the maxillary coupled artificial teeth.

FIG. 15 shows a state of the artificial tooth for maxillary second molar T7 of the maxillary coupled artificial teeth 6 as described above as viewed from the occlusal plane.

The artificial tooth for maxillary second molar T7 has a protrusive facet f21 and a retrusive facet f22 in the vicinity of a mesiobuccal cusp apex C9, has a retrusive facet f23 in the vicinity of a distobuccal cusp apex C10, and has a balancing facet f24 and a protrusive facet f25 in the vicinity of a mesiobuccal cusp apex C.

Angles formed by the protrusive facet f21 relative to the occlusal plane P1 include an angle in a cross section on the sagittal plane P2 of 22.5° to 25.5°, preferably 23.0° to 25.0°, and an angle in a cross section on the frontal plane P3 of 1.0° to 2.5°, preferably 1.5° to 2.0°.

Angles formed by the retrusive facet f22 relative to the occlusal plane P1 include an angle in a cross section on the sagittal plane P2 of 9.5° to 17.5°, preferably 10.0° to 15.0°, and an angle in a cross section on the frontal plane P3 of 13.0° to 16.5°, preferably 14.0° to 15.5°.

Angles formed by the retrusive facet f23 relative to the occlusal plane P1 include an angle in a cross section on the sagittal plane P2 of 6.5° to 12.0°, preferably 7.0° to 11.5°, and an angle in a cross section on the frontal plane P3 of 4.5° to 7.0°, preferably 5.0° to 6.5°.

Angles formed by the balancing facet f24 relative to the occlusal plane P1 include an angle in a cross section on the sagittal plane P2 of 0.5° to 10.0°, preferably 2.0° to 7.5°, and an angle in a cross section on the frontal plane P3 of 38.5° to 47.0°, preferably 39.0° to 45.0°.

Angles formed by the protrusive facet f25 relative to the occlusal plane P1 include an angle in a cross section on the sagittal plane P2 of 20.5° to 22.5°, preferably 21.0° to 22.0°, and an angle in a cross section on the frontal plane P3 of 1.5° to 6.0°, preferably 2.0 to 4.0°.

Figure 16A:
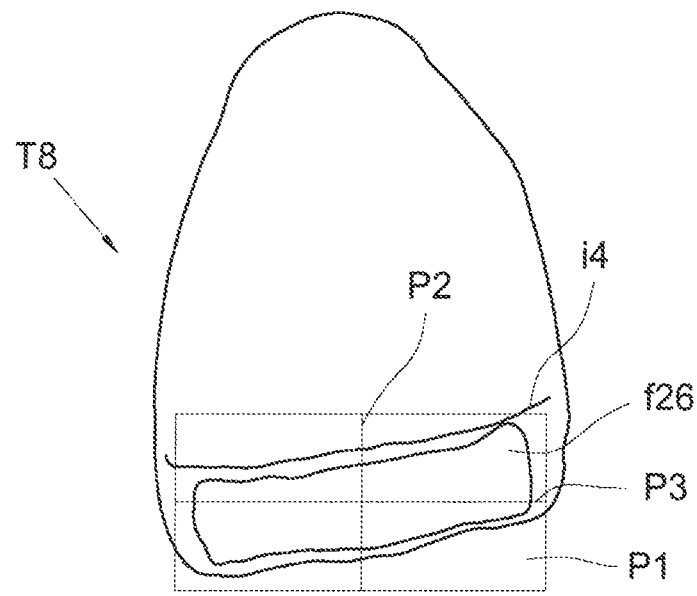
FIG. 16A is an occlusal view of an artificial tooth for central incisor in the mandibular coupled artificial teeth.
Figure 16B:
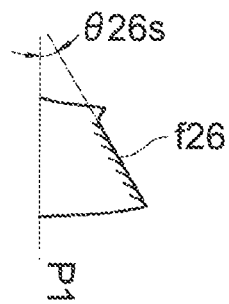
FIG. 16B is a view of the protrusive facet of the artificial tooth for central incisor of FIG. 16A as viewed from the sagittal plane side.
Figure 16C:
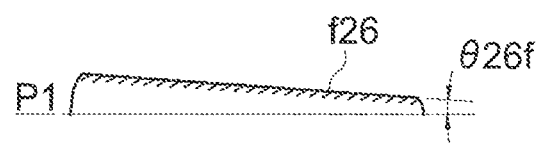
FIG. 16C is a view of the protrusive facet of the artificial tooth for central incisor of FIG. 16A as viewed from the frontal plane side.

FIG. 16A shows a state of the artificial tooth for mandibular central incisor T8 of the mandibular coupled artificial teeth 5 as viewed from the occlusal plane. FIG. 16B shows a view of a protrusive facet f26 of the artificial tooth for mandibular central incisor T8 of FIG. 16A as viewed from the sagittal plane P2 side. FIG. 16C shows a view of a protrusive facet f26 of the artificial tooth for mandibular central incisor T8 of FIG. 16A as viewed from the frontal plane P3 side.

The artificial tooth for mandibular central incisor T8 has the protrusive facet f26 at an incisal edge i4.

Angles formed by the protrusive facet f26 relative to the occlusal plane P1 include an angle ($\theta 26s$) in a cross section on the sagittal plane P2 of 27.0° to 35.0°, preferably 28.0° to 33.5°, and an angle ($\theta 26f$) in a cross section on the frontal plane P3 of 3.5° to 12.5°, preferably 5.0° to 11.0°.

Figure 17:
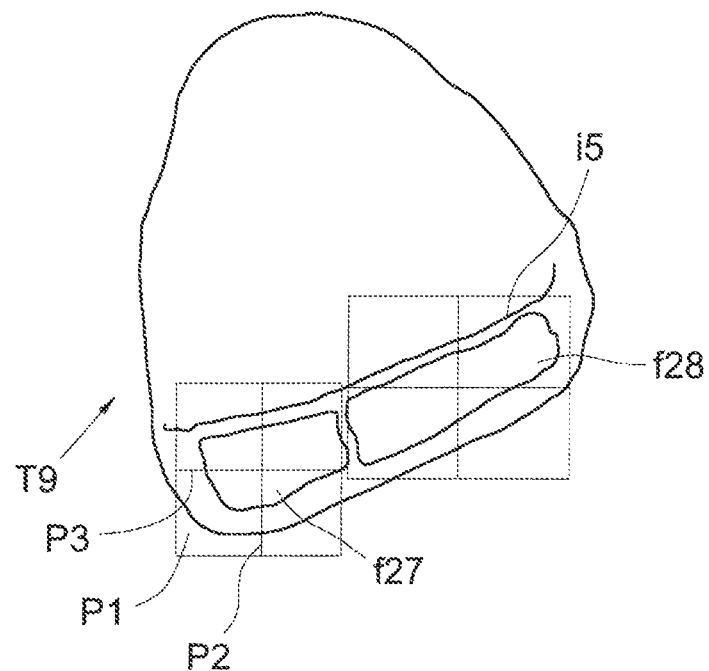
FIG. 17 is an occlusal view of an artificial tooth for lateral incisor in the mandibular coupled artificial teeth.

FIG. 17 shows a state of the artificial tooth for mandibular lateral incisor T9 of the mandibular coupled artificial teeth 5 as viewed from the occlusal plane.

The artificial tooth for mandibular lateral incisor T9 has a protrusive facet f27 and a protrusive facet f28 at an incisal edge i5.

Angles formed by the protrusive facet f27 relative to the occlusal plane P1 include an angle in a cross section on the sagittal plane P2 of 31.0° to 35.0°, preferably 32.0° to 33.5°, and an angle in a cross section on the frontal plane P3 of 0.0° to 1.5°, preferably 0.5° to 1.0°.

Angles formed by the protrusive facet f28 relative to the occlusal plane P1 include an angle in a cross section on the sagittal plane P2 of 22.0° to 35.0°, preferably 23.0° to 30.5°, and an angle in a cross section on the frontal plane P3 of 17.5° to 26.5°, preferably 18.0° to 23.5°.

Figure 18:
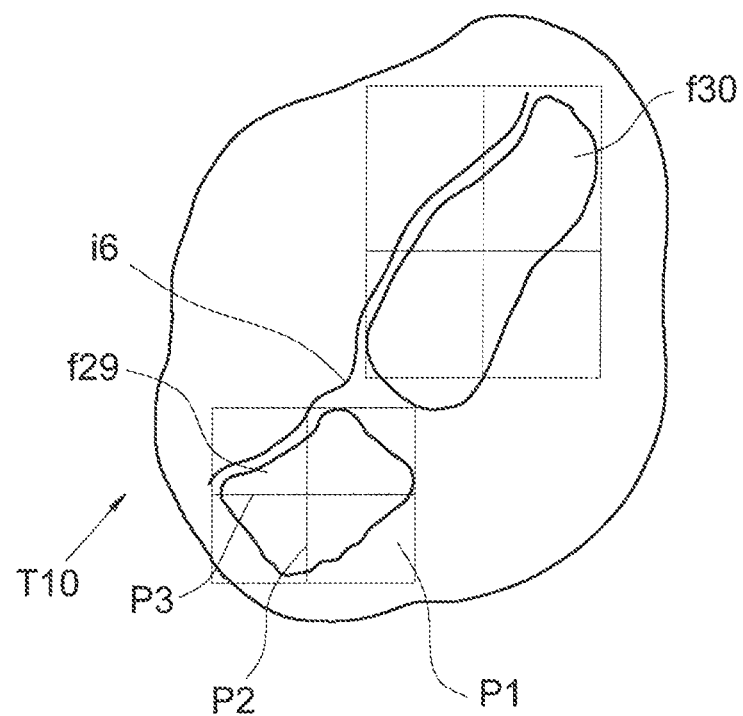
FIG. 18 is an occlusal view of an artificial tooth for canine in the mandibular coupled artificial teeth.

FIG. 18 shows a state of the artificial tooth for mandibular canine T10 of the mandibular coupled artificial teeth 5 as viewed from the occlusal plane.

The artificial tooth for mandibular canine T10 has a protrusive facet f29 and a retrusive facet f30 at an incisal edge i6.

Angles formed by the protrusive facet f29 relative to the occlusal plane P1 include an angle in a cross section on the sagittal plane P2 of 23.0° to 28.0°, preferably 24.0° to 26.0°, and an angle in a cross section on the frontal plane P3 of 0.5° to 10.0°, preferably 2.5° to 8.0°.

Angles formed by the retrusive facet f30 relative to the occlusal plane P1 include an angle in a cross section on the sagittal plane P2 of 14.5° to 18.0°, preferably 15.0° to 16.5°, and an angle in a cross section on the frontal plane P3 of 16.0° to 21.0°, preferably 17.5° to 19.5°.

Figure 19:
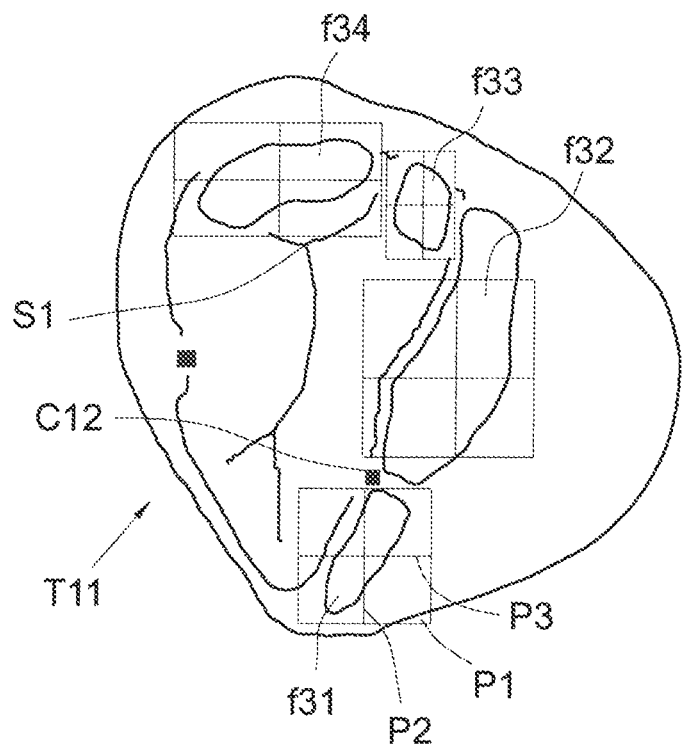
FIG. 19 is an occlusal view of an artificial tooth for first premolar in the mandibular coupled artificial teeth.

FIG. 19 shows a state of the artificial tooth for mandibular first premolar T11 of the mandibular coupled artificial teeth 5 as viewed from the occlusal plane.

The artificial tooth for mandibular first premolar T11 has a protrusive facet f31 and a retrusive facet f32 around a buccal cusp apex C12, has a balancing facet f33 on the distal marginal ridge, and has a protrusive facet f34 around the lingual cusp apex.

Angles formed by the protrusive facet f31 relative to the occlusal plane P1 include an angle in a cross section on the sagittal plane P2 of 38.0° to 41.0°, preferably 39.0° to 40.0°, and an angle in a cross section on the frontal plane P3 of 5.0° to 8.5°, preferably 6.0° to 7.5°.

Angles formed by the retrusive facet f32 relative to the occlusal plane P1 include an angle in a cross section on the sagittal plane P2 of 7.0° to 17.5°, preferably 10.0° to 15.0°, and an angle in a cross section on the frontal plane P3 of 9.0° to 15.5°, preferably 10.0° to 13.5°.

Angles formed by the balancing facet f33 relative to the occlusal plane P1 include an angle in a cross section on the sagittal plane P2 of 15.0° to 24.0°, preferably 16.0° to 23.0°, and an angle in a cross section on the frontal plane P3 of 29.0° to 32.0°, preferably 30.0° to 31.0°.

Angles formed by the protrusive facet f34 relative to the occlusal plane P1 include an angle in a cross section on the sagittal plane P2 of 3.5° to 10.0°, preferably 5.0° to 7.5°, and an angle in a cross section on the frontal plane P3 of 1.0° to 5.0°, preferably 2.5° to 4.5°.

Figure 20:
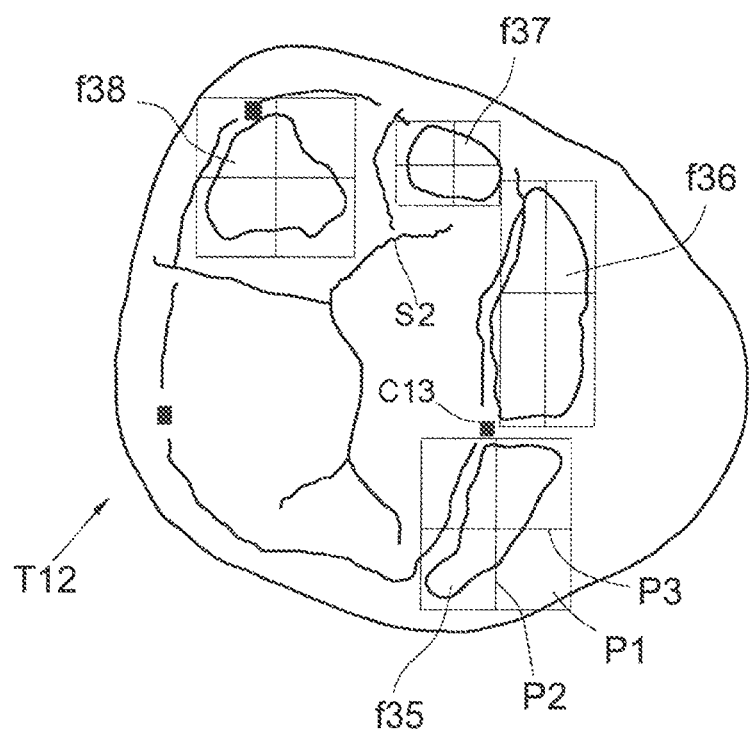
FIG. 20 is an occlusal view of an artificial tooth for second premolar in the mandibular coupled artificial teeth.

FIG. 20 shows a state of the artificial tooth for mandibular second premolar T12 of the mandibular coupled artificial teeth 5 as viewed from the occlusal plane.

The artificial tooth for mandibular second premolar T12 has a protrusive facet f35 and a retrusive facet f36 around a buccal cusp apex C13, has a balancing facet f37 on the distal marginal ridge, and has a protrusive facet f38 around the linguistic cusp apex.

Angles formed by the protrusive facet f35 relative to the occlusal plane P1 include an angle in a cross section on the sagittal plane P2 of 27.5° to 30.0°, preferably 28.0° to 29.0°, and an angle in a cross section on the frontal plane P3 of 16.0° to 19.0°, preferably 17.5° to 18.5°.

Angles formed by the retrusive facet f36 relative to the occlusal plane P1 include an angle in a cross section on the sagittal plane P2 of 13.0° to 15.0°, preferably 13.5° to 14.5°, and an angle in a cross section on the frontal plane P3 of 17.0° to 24.0°, preferably 18.5° to 23.0°.

Angles formed by the balancing facet f37 relative to the occlusal plane P1 include an angle in a cross section on the sagittal plane P2 of 1.5° to 17.0°, preferably 15.5° to 16.5°, and an angle in a cross section on the frontal plane P3 of 10.0° to 16.5°, preferably 12.0° to 15.5°.

Angles formed by the protrusive facet f38 relative to the occlusal plane P1 include an angle in a cross section on the sagittal plane P2 of 2.0° to 5.0°, preferably 3.0° to 4.0°, and an angle in a cross section on the frontal plane P3 of 12.0° to 14.5°, preferably 12.5° to 13.5°.

Figure 21:
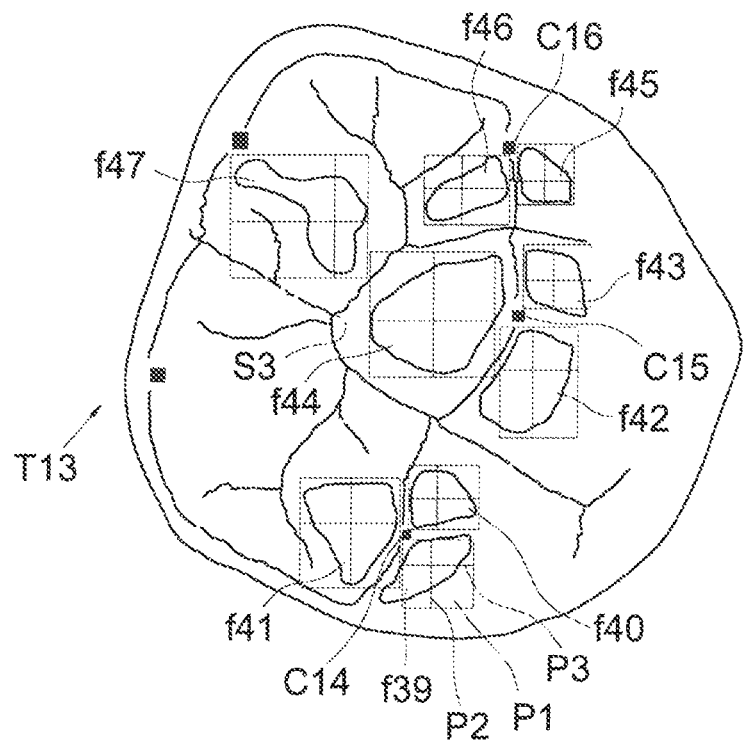
FIG. 21 is an occlusal view of an artificial tooth for first molar in the mandibular coupled artificial teeth.

FIG. 21 shows a state of the artificial tooth for mandibular first molar T13 of the mandibular coupled artificial teeth 5 as viewed from the occlusal plane.

The artificial tooth for mandibular first molar T13 has a protrusive facet f39, a retrusive facet f40, and a balancing facet f41 around a mesiobuccal cusp apex C14, has a protrusive facet f42, a retrusive facet f43, and a balancing facet f44 around a distobuccal cusp apex C15, has a protrusive facet f45 and a balancing facet f46 around a distobuccal cusp apex C16, and has a protrusive facet f47 in the vicinity of a central fossa S3.

Angles formed by the protrusive facet f39 relative to the occlusal plane P1 include an angle in a cross section on the sagittal plane P2 of 23.5° to 32.0°, preferably 25.0° to 30.0°, and an angle in a cross section on the frontal plane P3 of 7.0° to 15.0°, preferably 8.0° to 12.0°.

Angles formed by the retrusive facet f40 relative to the occlusal plane P1 include an angle in a cross section on the sagittal plane P2 of 7.5° to 12.0°, preferably 9.0° to 11.0°, and an angle in a cross section on the frontal plane P3 of 14.0° to 16.0°, preferably 14.5° to 15.5°.

Angles formed by the balancing facet f41 relative to the occlusal plane P1 include an angle in a cross section on the sagittal plane P2 of 2.0° to 5.5°, preferably 3.0° to 4.5°, and an angle in a cross section on the frontal plane P3 of 30.0° to 32.0°, preferably 30.0° to 31.5°.

Angles formed by the protrusive facet f42 relative to the occlusal plane P1 include an angle in a cross section on the sagittal plane P2 of 15.5° to 21.0°, preferably 16.0° to 19.0°, and an angle in a cross section on the frontal plane P3 of 8.0° to 11.0°, preferably 9.0° to 10.5°.

Angles formed by the retrusive facet f43 relative to the occlusal plane include an angle in a cross section on the sagittal plane P2 of 25.0° to 27.0°, preferably 25.5° to 26.0°, and an angle in a cross section on the frontal plane P3 of 24.0° to 25.0°, preferably 24.5° to 25.0°.

Angles formed by the balancing facet f44 relative to the occlusal plane include an angle in a cross section on the sagittal plane P2 of 12.0° to 20.0°, preferably 13.5° to 18.5°, and an angle in a cross section on the frontal plane P3 of 30.0° to 37.0°, preferably 31.5° to 33.5°.

Angles formed by the protrusive facet f45 relative to the occlusal plane P1 include an angle in a cross section on the sagittal plane P2 of 7.5° to 13.0°, preferably 9.0° to 11.5°, and an angle in a cross section on the frontal plane P3 of 10.0° to 13.0°, preferably 10.5° to 12.0°.

Angles formed by the balancing facet f46 relative to the occlusal plane P1 include an angle in a cross section on the sagittal plane P2 of 2.5° to 4.5°, preferably 3.0° to 4.0°, and an angle in a cross section on the frontal plane P3 of 27.0° to 33.0°, preferably 29.0° to 32.0°.

Angles formed by the protrusive facet f47 relative to the occlusal plane P1 include an angle in a cross section on the sagittal plane P2 of 10.5° to 18.5°, preferably 12.5° to 16.5°, and an angle in a cross section on the frontal plane P3 of 1.0° to 8.0°, preferably 2.5° to 6.0°.

Figure 22:
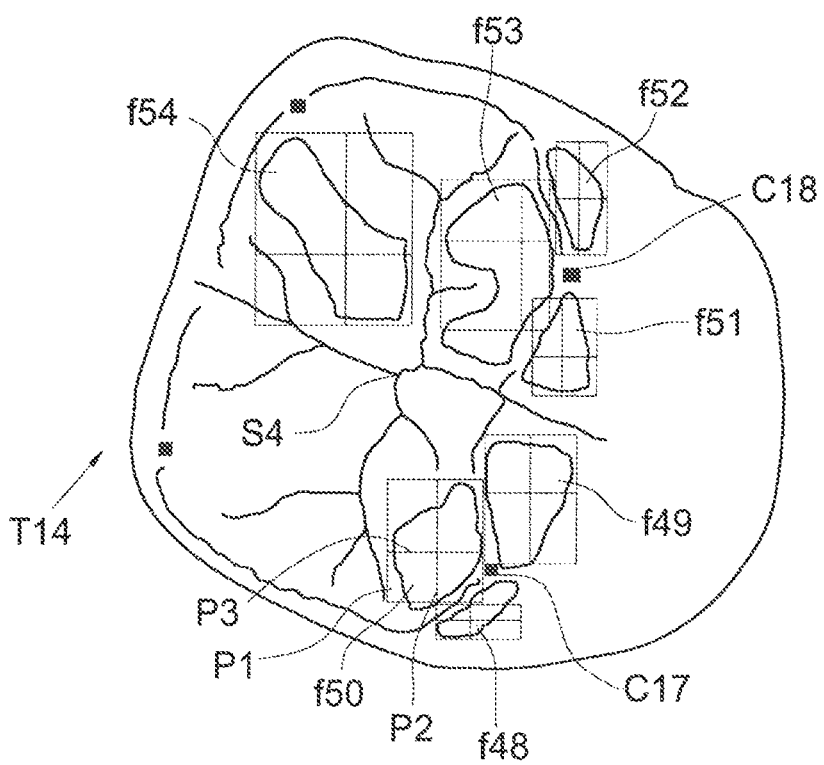
FIG. 22 is an occlusal view of an artificial tooth for second molar in the mandibular coupled artificial teeth.

FIG. 22 shows the artificial tooth for mandibular second molar T14 of the mandibular coupled artificial teeth 5 as viewed from the occlusal plane.

The artificial tooth for mandibular second molar T14 has a protrusive facet f48, a retrusive facet f49, and a balancing facet f50 around a mesiobuccal cusp apex C17, has a protrusive facet f51, a retrusive facet f52, and a balancing facet f53 around a distobuccal cusp apex C18, and has a protrusive facet f54 in the vicinity of a central fossa S4.

Angles formed by the protrusive facet f48 relative to the occlusal plane P1 include an angle in a cross section on the sagittal plane P2 of 26.0° to 30.0°, preferably 27.0° to 29.0°, and an angle in a cross section on the frontal plane P3 of 10.0° to 13.0°, preferably 10.5° to 12.5°.

Angles formed by the retrusive facet f49 relative to the occlusal plane P1 include an angle in a cross section on the sagittal plane P2 of 14.0° to 16.0°, preferably 14.5° to 15.5°, and an angle in a cross section on the frontal plane P3 of 15.0° to 17.5°, preferably 15.5° to 17.0°.

Angles formed by the balancing facet f50 relative to the occlusal plane P1 include an angle in a cross section on the sagittal plane P2 of 2.5° to 3.5°, preferably 2.5° to 3.0°, and an angle in a cross section on the frontal plane P3 of 34.0° to 38.0°, preferably 35.0° to 37.0°.

Angles formed by the protrusive facet f51 relative to the occlusal plane P1 include an angle in a cross section on the sagittal plane P2 of 17.0° to 21.0°, preferably 18.0° to 20.0°, and an angle in a cross section on the frontal plane P3 of 4.5° to 6.5°, preferably 5.0° to 6.0°.

Angles formed by the retrusive facet f52 relative to the occlusal plane P1 include an angle in a cross section on the sagittal plane P2 of 19.0° to 22.0°, preferably 19.5° to 21.0°, and an angle in a cross section on the frontal plane P3 of 13.0° to 14.5°, preferably 13.5° to 14.0°.

Angles formed by the balancing facet f53 relative to the occlusal plane P1 include an angle in a cross section on the sagittal plane P2 of 1.0° to 3.0°, preferably 1.5° to 2.5°, and an angle in a cross section on the frontal plane P3 of 34.0° to 38.0°, preferably 35.0° to 37.0°.

Angles formed by the protrusive facet f54 relative to the occlusal plane P1 include an angle in a cross section on the sagittal plane P2 of 15.5° to 23.0°, preferably 17.0° to 20.0°, and an angle in a cross section on the frontal plane P3 of 5.5° to 12.0°, preferably 7.0° to 10.0°.

When the maxillary coupled artificial teeth 6 and the mandibular coupled artificial teeth 5 having the occlusal facets described above are set in a mean-value articulator, the occlusal facets make contact as follows.

Figure 23:
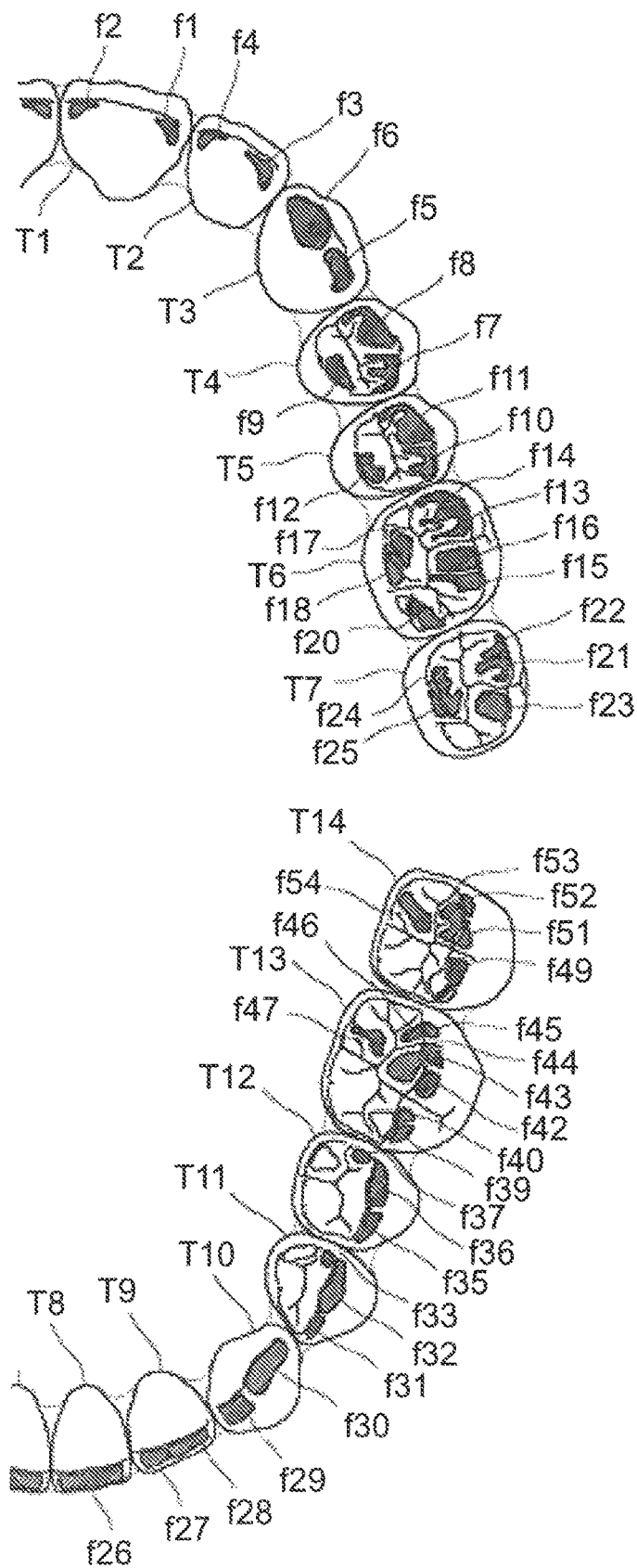
FIG. 23 is an occlusal view of a coupled artificial tooth set showing occlusal facets in partial contact in the intercuspal position.

Regarding the intercuspal position, as shown in FIG. 23, in the intercuspal position, the protrusive facet f1 of the artificial tooth for maxillary central incisor T1 makes partial contact with the protrusive facet f27 of the artificial tooth for mandibular lateral incisor T9, the protrusive facet f2 of the artificial tooth for maxillary central incisor T1 makes partial contact with the protrusive facet f26 of the artificial tooth for mandibular central incisor T8, the protrusive facet f3 of the artificial tooth for maxillary lateral incisor T2 makes partial contact with the protrusive facet f29 of the artificial tooth for mandibular canine T10, the protrusive facet f4 of the artificial tooth for maxillary lateral incisor T2 makes partial contact with the protrusive facet f28 of the artificial tooth for mandibular lateral incisor T9, the protrusive facet f5 of the artificial tooth for maxillary canine T3 makes partial contact with the protrusive facet f31 of the artificial tooth for mandibular first premolar T11, the retrusive facet f6 of the artificial tooth for maxillary canine T3 makes partial contact with the retrusive facet f30 of the artificial tooth for mandibular canine T10, the protrusive facet f7 of the artificial tooth for maxillary first premolar T4 makes partial contact with the protrusive facet f35 of the artificial tooth for mandibular second premolar T12, the retrusive facet f8 of the artificial tooth for maxillary first premolar T4 makes partial contact with the retrusive facet f32 of the artificial tooth for mandibular first premolar T11, the balancing facet f9 of the artificial tooth for the maxillary first premolar T4 makes partial contact with the balancing facet f33 of the artificial tooth for mandibular first premolar T11, the protrusive facet f10 of the artificial tooth for maxillary second premolar T5 makes partial contact with the protrusive facet f39 of the artificial tooth for mandibular first molar T13, the retrusive facet f11 of the artificial tooth for maxillary second premolar T5 makes partial contact with the retrusive facet f36 of the artificial tooth for mandibular second premolar T12, the balancing facet f12 of the artificial tooth for maxillary second premolar T5 makes partial contact with the balancing facet f37 of the artificial tooth for mandibular second premolar T12, the protrusive facet f13 of the artificial tooth for maxillary first molar T6 makes partial contact with the protrusive facet f42 of the artificial tooth for mandibular first molar T13, the retrusive facet f14 of the artificial tooth for maxillary first molar T6 makes partial contact with the retrusive facet f40 of the artificial tooth for mandibular first molar T13, the protrusive facet f15 of the artificial tooth for maxillary first molar T6 makes partial contact with the protrusive facet f45 of the artificial tooth for mandibular first molar T13, the retrusive facet f16 of the artificial tooth for maxillary first molar T6 makes partial contact with the retrusive facet f43 of the artificial tooth for mandibular first molar T13, the balancing facet f17 of the artificial tooth for maxillary first molar T6 makes partial contact with the balancing facet f44 of the artificial tooth for mandibular first molar T13, the protrusive facet f18 of the artificial tooth for maxillary first molar T6 makes partial contact with the protrusive facet f47 of the artificial tooth for mandibular first molar T13, the protrusive facet f21 of the artificial tooth for the maxillary second molar T7 makes partial contact with the protrusive facet f51 of the artificial tooth for mandibular second molar T14, the retrusive facet f22 of the artificial tooth for maxillary second molar T7 makes partial contact with the retrusive facet f49 of the artificial tooth for mandibular second molar T14, the retrusive facet f23 of the artificial tooth for maxillary second molar T7 makes partial contact with the retrusive facet f52 of the artificial tooth for mandibular second molar T14, the balancing facet f24 of the artificial tooth for maxillary second molar T7 makes partial contact with the balancing facet f53 of the artificial tooth for mandibular second molar T14, and the protrusive facet f25 of the artificial tooth for maxillary second molar T7 makes partial contact with the protrusive facet f54 of the artificial tooth for mandibular second molar T14.

During forward movement, the occlusal facets on the working side and the balancing side glide as follows.

Figure 24:
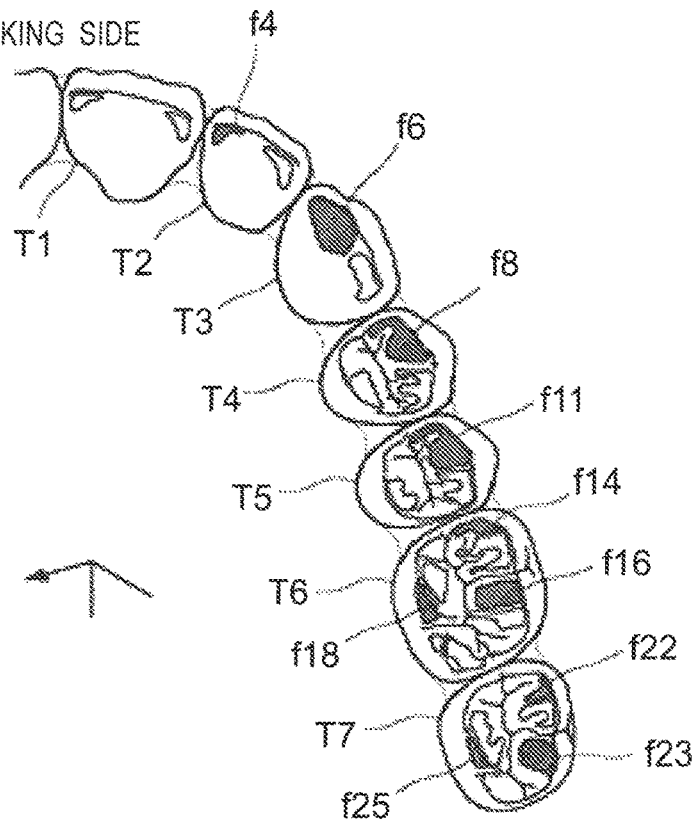
FIG. 24 is an occlusal view of the coupled artificial tooth set showing occlusal facets gliding on the working side during lateral movement.
Figure 24:
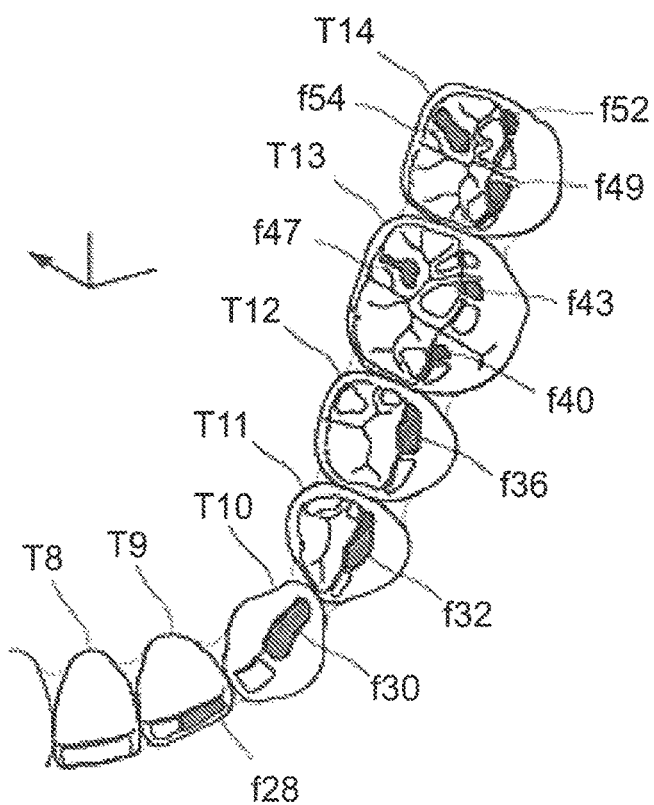

On the working side during lateral movement, as shown in FIG. 24, the protrusive facet f4 of the artificial tooth for maxillary lateral incisor T2 partially glides on the protrusive facet f28 of the artificial tooth for mandibular lateral incisor T9, the retrusive facet f6 of the artificial tooth for maxillary canine T3 partially glides on the retrusive facet f30 of the artificial tooth for mandibular canine T10, the retrusive facet f8 of the artificial tooth for maxillary first premolar T4 partially glides on the retrusive facet f32 of the artificial tooth for mandibular first premolar T11, the retrusive facet f11 of the artificial tooth for maxillary second premolar T5 partially glides on the retrusive facet f36 of the artificial tooth for mandibular second premolar T12, the retrusive facet f14 of the artificial tooth for maxillary first molar T6 partially glides on the retrusive facet f40 of the artificial tooth for mandibular first molar T13, the retrusive facet f16 of the artificial tooth for maxillary first molar T6 partially glides on the retrusive facet f43 of the artificial tooth for mandibular first molar T13, the protrusive facet f18 of the artificial tooth for maxillary first molar T6 partially glides on the protrusive facet f47 of the artificial tooth for mandibular first molar T13, the retrusive facet f22 of the artificial tooth for maxillary second molar T7 partially glides on the retrusive facet f49 of the artificial tooth for mandibular second molar T14, the retrusive facet f23 of the artificial tooth for maxillary second molar T7 partially glides on the retrusive facet f52 of the artificial tooth for mandibular second molar T14, and the protrusive facet f25 of the artificial tooth for maxillary second molar T7 partially glides on the protrusive facet f54 of the artificial tooth for mandibular second molar T14.

Figure 25:
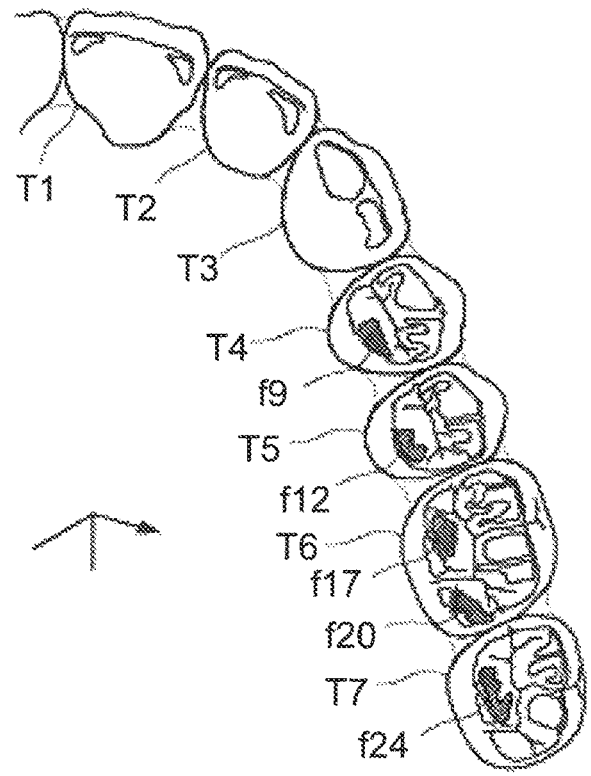
FIG. 25 is an occlusal view of the coupled artificial tooth set showing occlusal facets gliding toward the balancing side during lateral movement.
Figure 25:
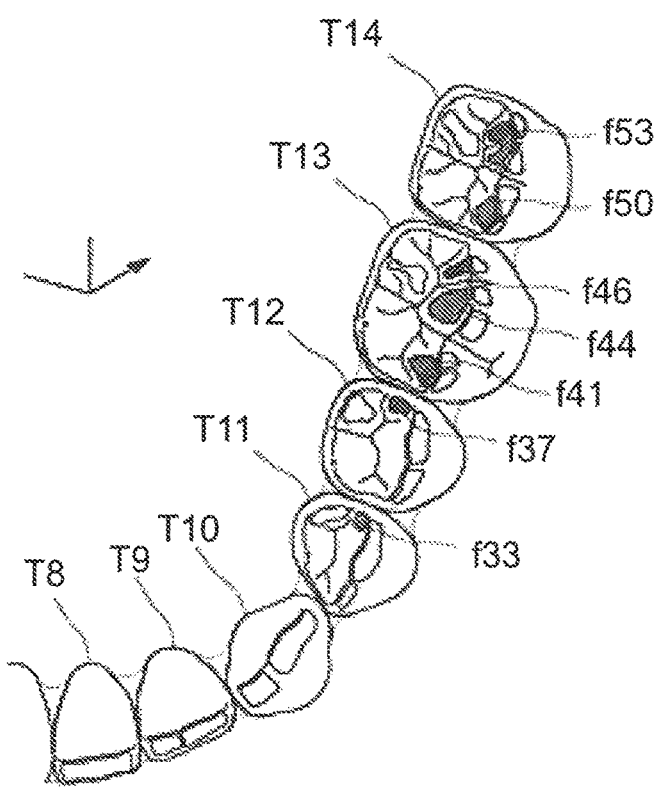

On the balancing side during lateral movement, as shown in FIG. 25, the balancing facet f9 of the artificial tooth for the maxillary first premolar T4 partially glides on the balancing facet f33 of the artificial tooth for mandibular first premolar T11, the balancing facet f12 of the artificial tooth for maxillary second premolar T5 partially glides on the balancing facet f37 of the artificial tooth for mandibular second premolar T12 and the balancing facet f41 of the artificial tooth for mandibular first molar T13, the balancing facet f17 of the artificial tooth for maxillary first molar T6 partially glides on the balancing facet f44 of the artificial tooth for mandibular first molar T13, the balancing facet f20 of the artificial tooth for maxillary first molar T6 partially glides on the balancing facet f46 of the artificial tooth for mandibular first molar T13 and the balancing facet f50 of the artificial tooth for mandibular second molar T14, and the balancing facet f24 of the artificial tooth for maxillary second molar T7 partially glides on the balancing facet f53 of the artificial tooth for mandibular second molar T14.

Figure 26:
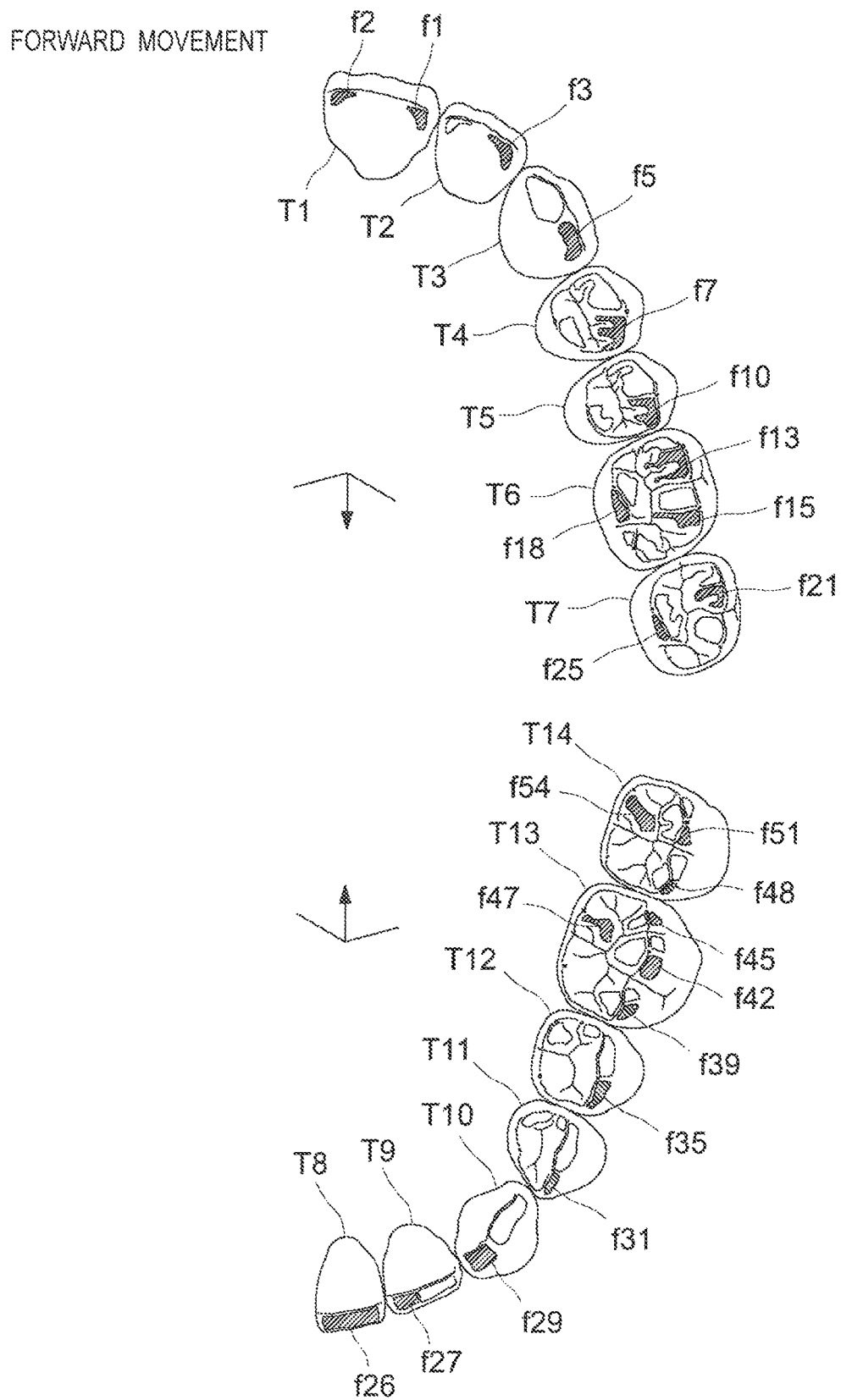
FIG. 26 is an artificial tooth set occlusal view showing occlusal facets sliding during lateral movement.

During forward movement, as shown in FIG. 26, the protrusive facet f1 of the artificial tooth for maxillary central incisor T1 partially glides on the protrusive facet f27 of the artificial tooth for mandibular lateral incisor T9, the protrusive facet f2 of the artificial tooth for maxillary central incisor T1 partially glides on the protrusive facet f26 of the artificial tooth for mandibular central incisor T8, the protrusive facet f3 of the artificial tooth for maxillary lateral incisor T2 partially glides on the protrusive facet f29 of the artificial tooth for mandibular canine T10, the protrusive facet f5 of the artificial tooth for maxillary canine T3 partially glides on the protrusive facet f31 of the artificial tooth for mandibular first premolar T11, the protrusive facet f7 of the artificial tooth for maxillary first premolar T4 partially glides on the protrusive facet f35 of the artificial tooth for mandibular second premolar T12, the protrusive facet f10 of the artificial tooth for maxillary second premolar T5 partially glides on the protrusive facet f39 of the artificial tooth for mandibular first molar T13, the protrusive facet f13 of the artificial tooth for maxillary first molar T6 partially glides on the protrusive facet f42 of the artificial tooth for mandibular first molar T13, the protrusive facet f15 of the artificial tooth for maxillary first molar T6 partially glides on the protrusive facet f45 of the artificial tooth for mandibular first molar T13 and the protrusive facet f48 of the artificial tooth for mandibular second molar T14, the protrusive facet f18 of the artificial tooth for maxillary first molar T6 partially glides on the protrusive facet f47 of the artificial tooth for mandibular first molar T13, the protrusive facet f21 of the artificial tooth for the maxillary second molar T7 partially glides on the protrusive facet f51 of the artificial tooth for mandibular second molar T14, and the protrusive facet f25 of the artificial tooth for maxillary second molar T7 partially glides on the protrusive facet f54 of the artificial tooth for mandibular second molar T14.

In a maxillomandibular fitting type coupled artificial tooth set configured as described above, the mandibular coupled artificial teeth 5 and the maxillary coupled artificial teeth 6 can be brought into contact and fit in a one-to-one or one-to-two tooth relationship of parts with the same name so as to achieve static stability. This enables production of a complete denture harmonizing regardless of a skill of a technician and a difference in shape of the alveolar ridge of an edentulous patient and allowing the technician to easily establish an ideal occlusal contact relationship in a short time.

The parts with the same name mean, for example, artificial teeth for central incisor represented as the artificial tooth for mandibular central incisor T8 of the mandibular coupled artificial teeth 5 and the artificial tooth for maxillary central incisor T1 of the maxillary coupled artificial teeth 6, artificial teeth for first premolar represented as the artificial tooth for mandibular first premolar T11 of the mandibular coupled artificial teeth 5 and the artificial tooth for maxillary first premolar T4 of the maxillary coupled artificial teeth 6, etc.

In the first embodiment, the first virtual curve 18 is expressed by the quadratic function Y mm={(X mm×X mm)/32 mm}−5 mm in the example described above; however, the present invention is not limited thereto. The first virtual curve 18 may be expressed by a quadratic function Y mm={(X mm×X mm)/α1 mm}−β1 mm. In this case, α1 mm and β1 mm may be determined in a range of 30 to 32 mm and a range of 3 to 5 mm, respectively.

In the first embodiment, the second virtual curve 19 is expressed by the quadratic function Y mm={(X mm×X mm)/8 mm}+5 mm in the example described above; however, the present invention is not limited thereto. The second virtual curve 19 may be expressed by a quadratic function Y mm={(X mm×X mm)/α2 mm}+β2 mm. In this case, α2 mm and β2 mm may be determined in a range of 8 to 16 mm and a range of 2 to 5 mm, respectively.

In the first embodiment, the third virtual curve 28 is expressed by the quadratic function Y mm={(X mm×X mm)/32 mm}−11 mm in the example described above; however, the present invention is not limited thereto. The third virtual curve 28 may be expressed by a quadratic function Y mm={(X mm×X mm)/α3 mm}−β3 mm. In this case, α3 mm and β3 mm may be determined in a range of 32 to 36 mm and a range of 8 to 12 mm, respectively.

In the first embodiment, the fourth virtual curve 29 is expressed by the quadratic function Y mm={(X mm×X mm)/8 mm}+5 mm in the example described above; however, the present invention is not limited thereto. The fourth virtual curve 29 may be expressed by a quadratic function Y mm={(X mm×X mm)/α4 mm}+β4 mm. In this case, α4 mm and β4 mm may be determined in a range of 8 to 16 mm and a range of 1 to 5 mm, respectively.

In the first embodiment, the mandibular coupled artificial teeth 5 and the maxillary coupled artificial teeth 6 are brought into contact and fit in a one-to-one or one-to-two tooth relationship of parts with the same name in the example described above; however, the present invention is not limited thereto as long as any premolars and any molars are brought into contact and fit at each of the left and right parts. In the maxillomandibular fitting type coupled artificial tooth set, when the mandibular coupled artificial teeth 5 and the maxillary coupled artificial teeth 6 are in the intercuspal state, at least one of the artificial tooth for mandibular first premolar T11 and the artificial tooth for mandibular second premolar T12 may make contact at one or more positions with at least one of the artificial tooth for maxillary first premolar T4 and the artificial tooth for maxillary second premolar T5 at each of the left and right parts. At least one of the artificial tooth for mandibular first molar T13 and the artificial tooth for mandibular second molar T14 may make contact at one or more positions with at least one of the artificial tooth for maxillary first molar T6 and the artificial tooth for maxillary second molar T7. A sum of contact positions at both the left and right parts of the mandibular coupled artificial teeth 5 and the maxillary coupled artificial teeth 6 may be four or more. Even with such a configuration, the static stability can be achieved.

EXAMPLES

Examples will hereinafter be described. The evaluation of the examples was performed on two items, i.e., a time required for arrangement of artificial teeth for production of a complete denture, and a degree of completion of establishment of an occlusal contact relationship of the produced complete denture.

A total of four types of coupled artificial teeth sets of Examples 1 and 2 and Comparative Examples 1 and 2 were prepared as samples.

The maxillomandibular fitting type coupled artificial tooth set of Example 1 will be described.

The maxillomandibular fitting type coupled artificial tooth set of Example 1 includes the mandibular coupled artificial teeth 5 and the maxillary coupled artificial teeth 6 having an arch shape.

In Example 1, the mandibular coupled artificial teeth 5 have the artificial tooth for mandibular central incisor T8, the artificial tooth for mandibular lateral incisor T9, the artificial tooth for mandibular canine T10, the artificial tooth for mandibular first premolar T11, the artificial tooth for mandibular second premolar T12, the artificial tooth for mandibular first molar T13, and the artificial tooth for mandibular second molar T14 arranged on each of the left and right sides. Therefore, the mandibular coupled artificial teeth 5 include 14 forms made up of the two artificial teeth for mandibular central incisor T8, the two artificial teeth for mandibular lateral incisor T9, the two artificial teeth for mandibular canine T10, the two artificial teeth for mandibular first premolar T11, the two artificial teeth for mandibular second premolar T12, the two artificial teeth for mandibular first molar T13, and the two artificial teeth for mandibular second molar T14.

In the mandibular coupled artificial teeth 5, the respective parts are all coupled. Specifically, at the center of the mandibular coupled artificial teeth 5, the left and right artificial teeth for mandibular central incisor T8 are coupled to each other. At the respective parts on both the left and right sides of the mandibular coupled artificial teeth 5, the artificial tooth for mandibular central incisor T8, the artificial tooth for mandibular lateral incisor T9, the artificial tooth for mandibular canine T10, the artificial tooth for mandibular first premolar T11, the artificial tooth for mandibular second premolar T12, the artificial tooth for mandibular first molar T13, and the artificial tooth for mandibular second molar T14 are coupled in this order.

When the mandibular coupled artificial teeth 5 are represented in a virtual XYZ orthogonal coordinate system, the following conditions (i) to (iv) are satisfied:

(i) the origin 1 of the virtual XYZ orthogonal coordinate system is made coincident with the mandibular incisal point 10 at the X coordinate value of 0 mm, the Y coordinate value of 0 mm, and the Z coordinate value of 0 mm;

(ii) in the mandibular coupled artificial teeth 5, the distobuccal cusp apexes C15 of the artificial teeth for mandibular first molar T13 on both the left and right sides have the Z coordinate value of 0 mm;

(iii) the left parts of the mandibular coupled artificial teeth 5 are arranged on the positive (+) X coordinate value side while the right parts of the mandibular coupled artificial teeth 5 are arranged on the negative (−) X coordinate value side; and (iv) the absolute values of the X, Y, and Z coordinate values of positions of the incisal edges of the incisors and the canine and the cusp apexes of the molars of the left parts of the mandibular coupled artificial teeth 5 are respectively equal to the absolute values of the X, Y, and Z coordinate values of positions of the incisal edges of the incisors and the canine and the cusp apexes of the molars of the right parts of the mandibular coupled artificial teeth 5.

When the conditions (i) to (iv) are satisfied, the crown forms of the artificial teeth for mandibular central incisor T8, the artificial teeth for mandibular lateral incisor T9, the artificial teeth for mandibular canine T10, the artificial teeth for mandibular first premolar T11, the artificial teeth for mandibular second premolar T12, the artificial teeth for mandibular first molar T13, and the artificial teeth for mandibular second molar T14 on both the left and right sides of the mandibular coupled artificial teeth 5 are arranged between the first virtual curve 18 expressed by a quadratic function Y mm={(X mm×X mm)/32 mm}−4 mm and the second virtual curve 19 expressed by Y mm={(X mm×X mm)/16 mm}+2 mm;

the total width L1 in the mesiodistal direction from the left artificial tooth for mandibular second molar T14 to the right artificial tooth for mandibular second molar T14 is 126.0 mm; and in the mandibular coupled artificial teeth 5, the incisal edges of all the incisors and canines and the cusp apexes of all the molars have the Z coordinate values between −3.0 mm and +4.0 mm.

In Example 1, the maxillary coupled artificial teeth 6 have the artificial tooth for maxillary central incisor T1, the artificial tooth for maxillary lateral incisor T2, the artificial tooth for maxillary canine T3, the artificial tooth for maxillary first premolar T4, the artificial tooth for maxillary second premolar T5, the artificial tooth for maxillary first molar T6, and the artificial tooth for maxillary second molar T7 arranged on each of the left and right sides. Therefore, the maxillary coupled artificial teeth 6 include 14 forms made up of the two artificial teeth for maxillary central incisor T1, the two artificial teeth for maxillary lateral incisor T2, the two artificial teeth for maxillary canine T3, the two artificial teeth for maxillary first premolar T4, the two artificial teeth for maxillary second premolar T5, the two artificial teeth for maxillary first molar T6, and the two artificial teeth for maxillary second molar T7.

In the maxillary coupled artificial teeth 6, the respective parts are all coupled. Specifically, at the center of the maxillary coupled artificial teeth 6, the left and right artificial teeth for maxillary central incisor T1 are coupled to each other. At the respective parts on both the left and right sides of the maxillary coupled artificial teeth 6, the artificial tooth for maxillary central incisor T1, the artificial tooth for maxillary lateral incisor T2, the artificial tooth for maxillary canine T3, the artificial tooth for maxillary first premolar T4, the artificial tooth for maxillary second premolar T5, the artificial tooth for maxillary first molar T6, and the artificial tooth for maxillary second molar T7 are coupled in this order.

When the maxillary coupled artificial teeth 6 are represented in a virtual XYZ orthogonal coordinate system, the following conditions (v) to (viii) are satisfied:

(v) the maxillary coupled artificial teeth 6 are arranged such that the maxillary incisal point 20 has the X coordinate value of 0 mm, the Y coordinate value of −8.0 mm, and the Z coordinate value of −2.0 mm relative to the origin 1 of the virtual XYZ orthogonal coordinate system;

(vi) the left parts of the maxillary coupled artificial teeth 6 are arranged on the positive (+) X coordinate value side while the right parts of the maxillary coupled artificial teeth 6 are arranged on the negative (−) X coordinate value side;

(vii) the absolute values of the X, Y, and Z coordinate values of positions of the incisal edges of the incisors and the canine and the cusp apexes of the molars of the left parts of the maxillary coupled artificial teeth 6 are respectively equal to the absolute values of the X, Y, and Z coordinate values of positions of the incisal edges of the incisors and the canine and the cusp apexes of the molars of the right parts of the maxillary coupled artificial teeth 6; and (viii) the maxillary coupled artificial teeth 6 are arranged such that the central fossa S6 of the artificial tooth for maxillary first molar T6 has X and Y coordinate values within a radius of 3.0 mm around the distobuccal cusp apex C15 of the artificial tooth for mandibular first molar T13 and a Z coordinate value of +1.0 mm.

When the conditions (v) to (viii) are satisfied, the crown forms of the artificial teeth for maxillary central incisor T1, the artificial teeth for maxillary lateral incisor T2, the artificial teeth for maxillary canine T3, the artificial teeth for maxillary first premolar T4, the artificial teeth for maxillary second premolar T5, the artificial teeth for maxillary first molar T6, and the artificial teeth for maxillary second molar T7 are arranged between the third virtual curve 28 expressed by a quadratic function Y mm={(X mm×X mm)/32 mm}−11 mm and the fourth virtual curve 29 expressed by Y mm={(X mm×X mm)/16 mm}+1 mm;

the total width L2 in the mesiodistal direction from the left artificial tooth for maxillary second molar T7 to the right artificial tooth for maxillary second molar T7 is 130.0 mm;

the width in a buccolingual direction of the left and right artificial teeth for maxillary first molar T6 is 8.5 mm; and in the maxillary coupled artificial teeth 6, the incisal edges of all the incisors and canines and the cusp apexes of all the molars have the Z coordinate values between −4.0 mm and +3.0 mm.

In the maxillomandibular fitting type coupled artificial tooth set of Example 1, the mandibular coupled artificial teeth 5 and the maxillary coupled artificial teeth 6 in the intercuspal state are brought into contact and fit at a total of four positions, i.e., at one position on the left artificial teeth for first premolar, one position on the left artificial teeth for first molar, one position on the right artificial teeth for first premolar, and one position on the right artificial teeth for first molar, in a cusp-to-fossa relationship of parts with the same name, so that the static stability is achieved.

The maxillomandibular fitting type coupled artificial tooth set of Example 2 will be described.

The maxillomandibular fitting type coupled artificial tooth set of Example 2 has the following constituent requirements in addition to the constituent requirements of the first embodiment.

The artificial tooth for maxillary central incisor T1 has two facets which include the protrusive facet f1 and the protrusive facet f2, at the incisal edge i1;

the angles formed by the protrusive facet f1 relative to the occlusal plane P1 include the angle in a cross section on the sagittal plane P2 of 23.5° and the angle in a cross section on the frontal plane P3 of 4.0°; and the angles formed by the protrusive facet f2 relative to the occlusal plane P1 include the angle in a cross section on the sagittal plane P2 of 22.0° and the angle in a cross section on the frontal plane P3 of 4.0°.

The artificial tooth for maxillary lateral incisor T2 has two facets which include the protrusive facet f3 and the protrusive facet f4, at the incisal edge i2;

the angles formed by the protrusive facet f3 relative to the occlusal plane P1 include the angle in a cross section on the sagittal plane P2 of 26.0° and the angle in a cross section on the frontal plane P3 of 16.0°; and the angles formed by the protrusive facet f4 relative to the occlusal plane P1 include the angle in a cross section on the sagittal plane P2 of 18.5° and the angle in a cross section on the frontal plane P3 of 10.0°.

The artificial tooth for maxillary canine T3 has two facets which include the protrusive facet f5 and the retrusive facet f6, at the incisal edge i3;

the angles formed by the protrusive facet f5 relative to the occlusal plane P1 include the angle in a cross section on the sagittal plane P2 of 28.0° and the angle in a cross section on the frontal plane P3 of 3.0°; and the angles formed by the retrusive facet f6 relative to the occlusal plane P1 include the angle in a cross section on the sagittal plane P2 of 15.0° and the angle in a cross section on the frontal plane P3 of 22.0°.

The artificial tooth for maxillary first premolar T4 has two facets which include the protrusive facet f7 and the retrusive facet f8, around the buccal cusp apex C1 and has one facet which includes the balancing facet f9, around the lingual cusp apex C2;

the angles formed by the protrusive facet f7 near the buccal cusp apex C1 relative to the occlusal plane P1 include the angle in a cross section on the sagittal plane P2 of 26.0° and the angle in a cross section on the frontal plane P3 of 13.0°;

the angles formed by the retrusive facet f8 near the buccal cusp apex C1 relative to the occlusal plane P1 include the angle in a cross section on the sagittal plane P2 of 22.5° and the angle in a cross section on the frontal plane P3 of 14.0°; and the angles formed by the balancing facet f9 near the lingual cusp apex C2 relative to the occlusal plane P1 include the angle in a cross section on the sagittal plane P2 of 3.0°, and the angle in a cross section on the frontal plane P3 of 32.0°.

The artificial tooth for maxillary second premolar T5 has two facets which include the protrusive facet f10 and the retrusive facet f11, around the buccal cusp apex C3 and has one facet which includes the balancing facet f12, around the lingual cusp apex C4;

the angles formed by the protrusive facet f10 near the buccal cusp apex C3 relative to the occlusal plane P1 include the angle in a cross section on the sagittal plane P2 of 25.0° and the angle in a cross section on the frontal plane P3 of 14.0°;

the angles formed by the retrusive facet f11 near the buccal cusp apex C3 relative to the occlusal plane P1 include the angle in a cross section on the sagittal plane P2 of 17.5° and the angle in a cross section on the frontal plane P3 of 15.5°; and the angles formed by the balancing facet f12 near the lingual cusp apex C4 relative to the occlusal plane P1 include the angle in a cross section on the sagittal plane P2 of 8.0° and the angle in a cross section on the frontal plane P3 of 27.0°.

The artificial tooth for maxillary first molar T6 has two facets which include the protrusive facet f13 and the retrusive facet f14, around the mesiobuccal cusp apex C5, has two facets which include the protrusive facet f15 and the retrusive facet f16, around the distobuccal cusp apex C6, has two facets which include the protrusive facet f18 and the balancing facet f17, around the mesiobuccal cusp apex C7, and has two facets which include the retrusive facet f19 and the protrusive facet f20, around the distolingual cusp apex C8;

the angles formed by the protrusive facet f13 near the mesiobuccal cusp apex C5 relative to the occlusal plane P1 include an angle in a cross section on the sagittal plane (P2) of 19.0° and the angle in a cross section on the frontal plane P3 of 8.0°;

the angles formed by the retrusive facet f14 near the mesiobuccal cusp apex C5 relative to the occlusal plane P1 include the angle in a cross section on the sagittal plane P2 of 9.5° and the angle in a cross section on the frontal plane P3 of 11.5°;

the angles formed by the protrusive facet f15 near the distobuccal cusp apex C6 relative to the occlusal plane P1 include the angle in a cross section on the sagittal plane P2 of 17.5° and the angle in a cross section on the frontal plane P3 of 8.5°;

the angles formed by the retrusive facet f16 near the distobuccal cusp apex C6 relative to the occlusal plane P1 include the angle in a cross section on the sagittal plane P2 of 20.5° and the angle in a cross section on the frontal plane P3 of 12.0°;

the angles formed by the balancing facet f17 near the mesiobuccal cusp apex C7 relative to the occlusal plane P1 include the angle in a cross section on the sagittal plane P2 of 15.5° and the angle in a cross section on the frontal plane P3 of 41.0°;

the angles formed by the protrusive facet f18 near the mesiobuccal cusp apex C7 relative to the occlusal plane P1 include the angle in a cross section on the sagittal plane P2 of 19.0° and the angle in a cross section on the frontal plane P3 of 5.5°;

the angles formed by the retrusive facet f19 near the distolingual cusp apex C8 relative to the occlusal plane P1 include the angle in a cross section on the sagittal plane P2 of 7.0° and the angle in a cross section on the frontal plane P3 of 16.5°; and the angles formed by the balancing facet f20 near the distolingual cusp apex C8 relative to the occlusal plane P1 include the angle in a cross section on the sagittal plane P2 of 7.5° and the angle in a cross section on the frontal plane P3 of 35.0°.

The artificial tooth for maxillary second molar T7 has two facets which include the protrusive facet f21 and the retrusive facet f22, around the mesiobuccal cusp apex C9, has one facet which includes the retrusive facet f23, around the distobuccal cusp apex C10, and has two facets which include the protrusive facet f25 and the balancing facet f24, around the mesiobuccal cusp apex C11;

the angles formed by the protrusive facet f21 near the mesiobuccal cusp apex C9 relative to the occlusal plane P1 include the angle in a cross section on the sagittal plane P2 of 24.5° and the angle in a cross section on the frontal plane P3 of 1.7°;

the angles formed by the retrusive facet f22 near the mesiobuccal cusp apex C9 relative to the occlusal plane P1 include the angle in a cross section on the sagittal plane P2 of 13.0° and the angle in a cross section on the frontal plane P3 of 15.0°;

the angles formed by the retrusive facet f23 near the distobuccal cusp apex C10 relative to the occlusal plane P1 include the angle in a cross section on the sagittal plane P2 of 9.0° and the angle in a cross section on the frontal plane P3 of 6.5°;

the angles formed by the balancing facet f24 near the mesiobuccal cusp apex C11 relative to the occlusal plane P1 include the angle in a cross section on the sagittal plane P2 of 5.0° and the angle in a cross section on the frontal plane P3 of 42.0°; and the angles formed by the protrusive facet f25 near the mesiobuccal cusp apex C11 relative to the occlusal plane P1 include the angle in a cross section on the sagittal plane P2 of 21.0° and the angle in a cross section on the frontal plane P3 of 3.0°.

The artificial tooth for mandibular central incisor T8 has the protrusive facet f26 at the incisal edge i4, and the angles formed by the protrusive facet f26 relative to the occlusal plane P1 include the angle in a cross section on the sagittal plane P2 of 31.0° and the angle in a cross section on the frontal plane P3 of 5.0°.

The artificial tooth for mandibular lateral incisor T9 has
the protrusive facet f27 and the protrusive facet f28 at the incisal edge i5;
the angles formed by the protrusive facet f27 relative to the occlusal plane P1 include the angle in a cross section on the sagittal plane P2 of 33.0° and the angle in a cross section on the frontal plane P3 of 1.0°; and
the angles formed by the protrusive facet f28 relative to the occlusal plane P1 include the angle in a cross section on the sagittal plane P2 of 28.5° and the angle in a cross section on the frontal plane P3 of 22.0°.

The artificial tooth for mandibular canine T10 has
the protrusive facet f29 and the retrusive facet f30 at the incisal edge i6;
the angles formed by the protrusive facet f29 relative to the occlusal plane P1 include the angle in a cross section on the sagittal plane P2 of 25.0° and the angle in a cross section on the frontal plane P3 of 7.5°; and
the angles formed by the retrusive facet f30 relative to the occlusal plane P1 include the angle in a cross section on the sagittal plane P2 of 16.0° and the angle in a cross section on the frontal plane P3 of 18.5°.

The artificial tooth for mandibular first premolar T11 has
two facets which include the protrusive facet f31 and the retrusive facet f32, around the buccal cusp apex C12, has one facet which includes the balancing facet f33, on the distal marginal ridge, and has one facet which includes the protrusive facet f34, around the lingual cusp apex;
the angles formed by the protrusive facet f31 near the buccal cusp apex C12 relative to the occlusal plane P1 include the angle in a cross section on the sagittal plane P2 of 39.5° and the angle in a cross section on the frontal plane P3 of 7.0°;
the angles formed by the retrusive facet f32 near the buccal cusp apex C12 relative to the occlusal plane P1 include the angle in a cross section on the sagittal plane P2 of 12.5° and the angle in a cross section on the frontal plane P3 of 12.5°;
the angles formed by the balancing facet f33 near the distal fossete relative to the occlusal plane P1 include an angle in a cross section on the sagittal plane P2 of 18.0° and the angle in a cross section on the frontal plane P3 of 31.0°; and
the angles formed by the protrusive facet f34 near the distal fossete relative to the occlusal plane P1 include the angle in a cross section on the sagittal plane P2 of 7.0° and the angle in a cross section on the frontal plane P3 of 3.5°.

The artificial tooth for mandibular second premolar T12 has
two facets which include the protrusive facet f35 and the retrusive facet f36, around the buccal cusp apex C13, has one facet which includes the balancing facet f37, on the distal marginal ridge, and has one facet which includes the protrusive facet f38, around the linguistic cusp apex;
the angles formed by the protrusive facet f35 near the buccal cusp apex C13 relative to the occlusal plane P1 include an angle in a cross section on the sagittal plane P2 of 28.5° and the angle in a cross section on the frontal plane P3 of 17.5°;
the angles formed by the retrusive facet f36 near the buccal cusp apex C13 relative to the occlusal plane P1 include the angle in a cross section on the sagittal plane P2 of 14.0° and the angle in a cross section on the frontal plane P3 of 21.0°;
the angles formed by the balancing facet f37 near the distal fossete relative to the occlusal plane P1 include the angle in a cross section on the sagittal plane P2 of 9.0° and the angle in a cross section on the frontal plane P3 of 13.0°; and
the angles formed by the protrusive facet f38 near the distal fossete relative to the occlusal plane P1 include the angle in a cross section on the sagittal plane P2 of 3.5° and the angle in a cross section on the frontal plane P3 of 13.0°.

The artificial tooth for mandibular first molar T13 has
three facets which include the protrusive facet f39, the retrusive facet f40, and the balancing facet f41, around the mesiobuccal cusp apex C14, has three facets which include the protrusive facet f42, the retrusive facet f43, and the balancing facet f44, around the distobuccal cusp apex C15, has two facets which include the protrusive facet f45 and the balancing facet f46, around the distobuccal cusp apex C16, and has one facet which includes the protrusive facet f47, in the vicinity of the central fossa S3;
the angles formed by the protrusive facet f39 near the mesiobuccal cusp apex C14 relative to the occlusal plane P1 include the angle in a cross section on the sagittal plane P2 of 27.5° and the angle in a cross section on the frontal plane P3 of 11.0°;
the angles formed by the retrusive facet f40 near the mesiobuccal cusp apex C14 relative to the occlusal plane P1 include the angle in a cross section on the sagittal plane P2 of 10.0° and the angle in a cross section on the frontal plane P3 of 15.0°;
the angles formed by the balancing facet f41 near the mesiobuccal cusp apex C14 relative to the occlusal plane P1 include the angle in a cross section on the sagittal plane P2 of 3.5° and the angle in a cross section on the frontal plane P3 of 31.0°;
the angles formed by the protrusive facet f42 near the distobuccal cusp apex C15 relative to the occlusal plane P1 include an angle in a cross section on the sagittal plane P2 of 18.0° and the angle in a cross section on the frontal plane P3 of 9.5°;
the angles formed by the retrusive facet f43 near the distobuccal cusp apex C15 relative to the occlusal plane P1 include the angle in a cross section on the sagittal plane P2 of 26.0° and the angle in a cross section on the frontal plane P3 of 24.5°;
the angles formed by the balancing facet f44 near the distobuccal cusp apex C15 relative to the occlusal plane P1 include an angle in a cross section on the sagittal plane P2 of 16.0° and the angle in a cross section on the frontal plane P3 of 33.0°;
the angles formed by the protrusive facet f45 near the distobuccal cusp apex C16 relative to the occlusal plane P1 include the angle in a cross section on the sagittal plane P2 of 10.0° and the angle in a cross section on the frontal plane P3 of 11.5°;
the angles formed by the balancing facet f46 near the distobuccal cusp apex C16 relative to the occlusal plane P1 include the angle in a cross section on the sagittal plane P2 of 3.5° and the angle in a cross section on the frontal plane P3 of 30.0°; and
the angles formed by the protrusive facet f47 near the central fossa S3 relative to the occlusal plane P1 include the angle in a cross section on the sagittal plane P2 of 14.5° and the angle in a cross section on the frontal plane P3 of 4.5°.

The artificial tooth for mandibular second molar T14 has three facets which include the protrusive facet f48, the retrusive facet f49, and the balancing facet f50, around the mesiobuccal cusp apex C17, has three facets which include the protrusive facet f51, the retrusive facet f52, and the balancing facet f53, around the distobuccal cusp apex C18, and has one facet which includes the protrusive facet f54, around the vicinity of the central fossa S4;

the angles formed by the protrusive facet f48 near the mesiobuccal cusp apex C17 relative to the occlusal plane P1 include the angle in a cross section on the sagittal plane P2 of 28.0° and the angle in a cross section on the frontal plane P3 of 11.5°;

the angles formed by the retrusive facet f49 near the mesiobuccal cusp apex C17 relative to the occlusal plane P1 include the angle in a cross section on the sagittal plane P2 of 15.0° and the angle in a cross section on the frontal plane P3 of 16.5°;

the angles formed by the balancing facet f50 near the mesiobuccal cusp apex C17 relative to the occlusal plane P1 include the angle in a cross section on the sagittal plane P2 of 3.0° and the angle in a cross section on the frontal plane P3 of 36.0°;

the angles formed by the protrusive facet f51 near the distobuccal cusp apex C18 relative to the occlusal plane P1 include the angle in a cross section on the sagittal plane P2 of 19.0° and the angle in a cross section on the frontal plane P3 of 5.5°;

the angles formed by the retrusive facet f52 near the distobuccal cusp apex C18 relative to the occlusal plane P1 include the angle in a cross section on the sagittal plane P2 of 20.5° and the angle in a cross section on the frontal plane P3 of 14.0°;

the angles formed by the balancing facet f53 near the distobuccal cusp apex C18 relative to the occlusal plane P1 include the angle in a cross section on the sagittal plane P2 of 2.0° and the angle in a cross section on the frontal plane P3 of 36.5°; and the angles formed by the protrusive facet f54 near the central fossa S4 relative to the occlusal plane P1 include the angle in a cross section on the sagittal plane P2 of 19.0° and the angle in a cross section on the frontal plane P3 of 8.5°.

In the intercuspal position, the protrusive facet f1 of the artificial tooth for maxillary central incisor T1 makes partial contact with the protrusive facet f27 of the artificial tooth for mandibular lateral incisor T9, the protrusive facet f2 of the artificial tooth for maxillary central incisor T1 makes partial contact with the protrusive facet f26 of the artificial tooth for mandibular central incisor T8, the protrusive facet f3 of the artificial tooth for maxillary lateral incisor T2 makes partial contact with the protrusive facet f29 of the artificial tooth for mandibular canine T10, the protrusive facet f4 of the artificial tooth for maxillary lateral incisor T2 makes partial contact with the protrusive facet f28 of the artificial tooth for mandibular lateral incisor T9, the protrusive facet f5 of the artificial tooth for maxillary canine T3 makes partial contact with the protrusive facet f31 of the artificial tooth for mandibular first premolar T11, the retrusive facet f6 of the artificial tooth for maxillary canine T3 makes partial contact with the retrusive facet f30 of the artificial tooth for mandibular canine T10, the protrusive facet f7 of the artificial tooth for maxillary first premolar T4 makes partial contact with the protrusive facet f35 of the artificial tooth for mandibular second premolar T12, the retrusive facet f8 of the artificial tooth for maxillary first premolar T4 makes partial contact with the retrusive facet f32 of the artificial tooth for mandibular first premolar T11, the balancing facet f9 of the artificial tooth for the maxillary first premolar T4 makes partial contact with the balancing facet f33 of the artificial tooth for mandibular first premolar T11, the protrusive facet f10 of the artificial tooth for maxillary second premolar T5 makes partial contact with the protrusive facet f39 of the artificial tooth for mandibular first molar T13, the retrusive facet f11 of the artificial tooth for maxillary second premolar T5 makes partial contact with the retrusive facet f36 of the artificial tooth for mandibular second premolar T12, the balancing facet f12 of the artificial tooth for maxillary second premolar T5 makes partial contact with the balancing facet f37 of the artificial tooth for mandibular second premolar T12, the protrusive facet f13 of the artificial tooth for maxillary first molar T6 makes partial contact with the protrusive facet f42 of the artificial tooth for mandibular first molar T13, the retrusive facet f14 of the artificial tooth for maxillary first molar T6 makes partial contact with the retrusive facet f40 of the artificial tooth for mandibular first molar T13, the protrusive facet f15 of the artificial tooth for maxillary first molar T6 makes partial contact with the protrusive facet f45 of the artificial tooth for mandibular first molar T13, the retrusive facet f16 of the artificial tooth for maxillary first molar T6 makes partial contact with the retrusive facet f43 of the artificial tooth for mandibular first molar T13, the balancing facet f17 of the artificial tooth for maxillary first molar T6 makes partial contact with the balancing facet f44 of the artificial tooth for mandibular first molar T13, the protrusive facet f18 of the artificial tooth for maxillary first molar T6 makes partial contact with the protrusive facet f47 of the artificial tooth for mandibular first molar T13, the protrusive facet f21 of the artificial tooth for the maxillary second molar T7 makes partial contact with the protrusive facet f51 of the artificial tooth for mandibular second molar T14, the retrusive facet f22 of the artificial tooth for maxillary second molar T7 makes partial contact with the retrusive facet f49 of the artificial tooth for mandibular second molar T14, the retrusive facet f23 of the artificial tooth for maxillary second molar T7 makes partial contact with the retrusive facet f52 of the artificial tooth for mandibular second molar T14, the balancing facet f24 of the artificial tooth for maxillary second molar T7 makes partial contact with the balancing facet f53 of the artificial tooth for mandibular second molar T14, and the protrusive facet f25 of the artificial tooth for maxillary second molar T7 makes partial contact with the protrusive facet f54 of the artificial tooth for mandibular second molar T14, during lateral movement, on the working side, the protrusive facet f4 of the artificial tooth for maxillary lateral incisor T2 partially glides on the protrusive facet f28 of the artificial tooth for mandibular lateral incisor T9, the retrusive facet f6 of the artificial tooth for maxillary canine T3 partially glides on the retrusive facet f30 of the artificial tooth for mandibular canine T10, the retrusive facet f8 of the artificial tooth for maxillary first premolar T4 partially glides on the retrusive facet f32 of the artificial tooth for mandibular first premolar T11, the retrusive facet f11 of the artificial tooth for maxillary second premolar T5 partially glides on the retrusive facet f36 of the artificial tooth for mandibular second premolar T12, the retrusive facet f14 of the artificial tooth for maxillary first molar T6 partially glides on the retrusive facet f40 of the artificial tooth for mandibular first molar T13, the retrusive facet f16 of the artificial tooth for maxillary first molar T6 partially glides on the retrusive facet f43 of the artificial tooth for mandibular first molar T13, the protrusive facet f18 of the artificial tooth for maxillary first molar T6 partially glides on the protrusive facet f47 of the artificial tooth for mandibular first molar T13, the retrusive facet f22 of the artificial tooth for maxillary second molar T7 partially glides on the retrusive facet f49 of the artificial tooth for mandibular second molar T14, the retrusive facet f23 of the artificial tooth for maxillary second molar T7 partially glides on the retrusive facet f52 of the artificial tooth for mandibular second molar T14, and the protrusive facet f25 of the artificial tooth for maxillary second molar T7 partially glides on the protrusive facet f54 of the artificial tooth for mandibular second molar T14, at the same time on the balancing side, the balancing facet f9 of the artificial tooth for the maxillary first premolar T4 partially glides on the balancing facet f33 of the artificial tooth for mandibular first premolar T11, the balancing facet f12 of the artificial tooth for maxillary second premolar T5 partially glides on the balancing facet f37 of the artificial tooth for mandibular second premolar T12 and the balancing facet f41 of the artificial tooth for mandibular first molar T13, the balancing facet f17 of the artificial tooth for maxillary first molar T6 partially glides on the balancing facet f44 of the artificial tooth for mandibular first molar T13, the balancing facet f20 of the artificial tooth for maxillary first molar T6 partially glides on the balancing facet f46 of the artificial tooth for mandibular first molar T13 and the balancing facet f50 of the artificial tooth for mandibular second molar T14, and the balancing facet f24 of the artificial tooth for maxillary second molar T7 partially glides on the balancing facet f53 of the artificial tooth for mandibular second molar T14, during forward movement, the protrusive facet f1 of the artificial tooth for maxillary central incisor T1 partially glides on the protrusive facet f27 of the artificial tooth for mandibular lateral incisor T9, the protrusive facet f2 of the artificial tooth for maxillary central incisor T1 partially glides on the protrusive facet f26 of the artificial tooth for mandibular central incisor T8, the protrusive facet f3 of the artificial tooth for maxillary lateral incisor T2 partially glides on the protrusive facet f29 of the artificial tooth for mandibular canine T10, the protrusive facet f5 of the artificial tooth for maxillary canine T3 partially glides on the protrusive facet f31 of the artificial tooth for mandibular first premolar T11, the protrusive facet f7 of the artificial tooth for maxillary first premolar T4 partially glides on the protrusive facet f35 of the artificial tooth for mandibular second premolar T12, the protrusive facet f10 of the artificial tooth for maxillary second premolar T5 partially glides on the protrusive facet f39 of the artificial tooth for mandibular first molar T13, the protrusive facet f13 of the artificial tooth for maxillary first molar T6 partially glides on the protrusive facet f42 of the artificial tooth for mandibular first molar T13, the protrusive facet f15 of the artificial tooth for maxillary first molar T6 partially glides on the protrusive facet f45 of the artificial tooth for mandibular first molar T13 and the protrusive facet f48 of the artificial tooth for mandibular second molar T14, the protrusive facet f18 of the artificial tooth for maxillary first molar T6 partially glides on the protrusive facet f47 of the artificial tooth for mandibular first molar T13, the protrusive facet f21 of the artificial tooth for the maxillary second molar T7 partially glides on the protrusive facet f51 of the artificial tooth for mandibular second molar T14, and the protrusive facet f25 of the artificial tooth for maxillary second molar T7 partially glides on the protrusive facet f54 of the artificial tooth for mandibular second molar T14.

The maxillomandibular fitting type coupled artificial tooth set of Comparative Example 1 will be described.

The maxillomandibular fitting type coupled artificial tooth set of Comparative Example 1 includes the mandibular coupled artificial teeth 5 and the maxillary coupled artificial teeth 6 having an arch shape.

In Comparative Example 1, the mandibular coupled artificial teeth 5 have the artificial tooth for mandibular central incisor T8, the artificial tooth for mandibular lateral incisor T9, the artificial tooth for mandibular canine T10, the artificial tooth for mandibular first premolar T11, the artificial tooth for mandibular second premolar T12, the artificial tooth for mandibular first molar T13, and the artificial tooth for mandibular second molar T14 arranged on each of the left and right sides. Therefore, the mandibular coupled artificial teeth 5 include 14 forms made up of the two artificial teeth for mandibular central incisor T8, the two artificial teeth for mandibular lateral incisor T9, the two artificial teeth for mandibular canine T10, the two artificial teeth for mandibular first premolar T11, the two artificial teeth for mandibular second premolar T12, the two artificial teeth for mandibular first molar T13, and the two artificial teeth for mandibular second molar T14.

In the mandibular coupled artificial teeth 5, the respective parts are all coupled. Specifically, at the center of the mandibular coupled artificial teeth 5, the left and right artificial teeth for mandibular central incisor T8 are coupled to each other. At the respective parts on both the left and right sides of the mandibular coupled artificial teeth 5, the artificial tooth for mandibular central incisor T8, the artificial tooth for mandibular lateral incisor T9, the artificial tooth for mandibular canine T10, the artificial tooth for mandibular first premolar T11, the artificial tooth for mandibular second premolar T12, the artificial tooth for mandibular first molar T13, and the artificial tooth for mandibular second molar T14 are coupled in this order.

When the mandibular coupled artificial teeth 5 are represented in a virtual XYZ orthogonal coordinate system, the following conditions (i) to (iv) are satisfied:

(i) the origin 1 of the virtual XYZ orthogonal coordinate system is made coincident with the mandibular incisal point 10 at the X coordinate value of 0 mm, the Y coordinate value of 0 mm, and the Z coordinate value of 0 mm;

(ii) in the mandibular coupled artificial teeth 5, the distobuccal cusp apexes C15 of the artificial teeth for mandibular first molar T13 on both the left and right sides have the Z coordinate value of 0 mm;

(iii) the left parts of the mandibular coupled artificial teeth 5 are arranged on the positive (+) X coordinate value side while the right parts of the mandibular coupled artificial teeth 5 are arranged on the negative (−) X coordinate value side; and (iv) the absolute values of the X, Y, and Z coordinate values of positions of the incisal edges of the incisors and the canine and the cusp apexes of the molars of the left parts of the mandibular coupled artificial teeth 5 are respectively equal to the absolute values of the X, Y, and Z coordinate values of positions of the incisal edges of the incisors and the canine and the cusp apexes of the molars of the right parts of the mandibular coupled artificial teeth 5.

When the conditions (i) to (iv) are satisfied, the crown forms of the artificial teeth for mandibular central incisor T8, the artificial teeth for mandibular lateral incisor T9, the artificial teeth for mandibular canine T10, the artificial teeth for mandibular first premolar T11, the artificial teeth for mandibular second premolar T12, the artificial teeth for mandibular first molar T13, and the artificial teeth for mandibular second molar T14 on both the left and right sides of the mandibular coupled artificial teeth 5 are arranged between the first virtual curve 18 expressed by a quadratic function Y mm={(X mm×X mm)/36 mm}−6 mm and the second virtual curve 19 expressed by Y mm={(X mm×X mm)/24 mm}+2 mm;

the total width L1 in the mesiodistal direction from the left artificial tooth for mandibular second molar T14 to the right artificial tooth for mandibular second molar T14 is 126.0 mm; and in the mandibular coupled artificial teeth 5, the incisal edges of all the incisors and canines and the cusp apexes of all the molars have the Z coordinate values between −10.0 mm and +0.5 mm.

In Comparative Example 1, the maxillary coupled artificial teeth 6 have the artificial tooth for maxillary central incisor T1, the artificial tooth for maxillary lateral incisor T2, the artificial tooth for maxillary canine T3, the artificial tooth for maxillary first premolar T4, the artificial tooth for maxillary second premolar T5, the artificial tooth for maxillary first molar T6, and the artificial tooth for maxillary second molar T7 arranged on each of the left and right sides. Therefore, the maxillary coupled artificial teeth 6 include 14 forms made up of the two artificial teeth for maxillary central incisor T1, the two artificial teeth for maxillary lateral incisor T2, the two artificial teeth for maxillary canine T3, the two artificial teeth for maxillary first premolar T4, the two artificial teeth for maxillary second premolar T5, the two artificial teeth for maxillary first molar T6, and the two artificial teeth for maxillary second molar T7.

In the maxillary coupled artificial teeth 6, the respective parts are all coupled. Specifically, at the center of the maxillary coupled artificial teeth 6, the left and right artificial teeth for maxillary central incisor T1 are coupled to each other. At the respective parts on both the left and right sides of the maxillary coupled artificial teeth 6, the artificial tooth for maxillary central incisor T1, the artificial tooth for maxillary lateral incisor T2, the artificial tooth for maxillary canine T3, the artificial tooth for maxillary first premolar T4, the artificial tooth for maxillary second premolar T5, the artificial tooth for maxillary first molar T6, and the artificial tooth for maxillary second molar T7 are coupled in this order.

When the maxillary coupled artificial teeth 6 are represented in a virtual XYZ orthogonal coordinate system, the following conditions (v) to (viii) are satisfied:

(v) the maxillary coupled artificial teeth 6 are arranged such that the maxillary incisal point 20 has the X coordinate value of 0 mm, the Y coordinate value of −8.0 mm, and the Z coordinate value of −2.0 mm relative to the origin 1 of the virtual XYZ orthogonal coordinate system;

(vi) the left parts of the maxillary coupled artificial teeth 6 are arranged on the positive (+) X coordinate value side while the right parts of the maxillary coupled artificial teeth 6 are arranged on the negative (−) X coordinate value side;

(vii) the absolute values of the X, Y, and Z coordinate values of positions of the incisal edges of the incisors and the canine and the cusp apexes of the molars of the left parts of the maxillary coupled artificial teeth 6 are respectively equal to the absolute values of the X, Y, and Z coordinate values of positions of the incisal edges of the incisors and the canine and the cusp apexes of the molars of the right parts of the maxillary coupled artificial teeth 6; and (viii) the maxillary coupled artificial teeth 6 are arranged such that the central fossa S6 of the artificial tooth for maxillary first molar T6 has X and Y coordinate values within a radius of 3.0 mm around the distobuccal cusp apex C15 of the artificial tooth for mandibular first molar T13 and a Z coordinate value of +1.0 mm.

When the conditions (v) to (viii) are satisfied, the crown forms of the artificial teeth for maxillary central incisor T1, the artificial teeth for maxillary lateral incisor T2, the artificial teeth for maxillary canine T3, the artificial teeth for maxillary first premolar T4, the artificial teeth for maxillary second premolar T5, the artificial teeth for maxillary first molar T6, and the artificial teeth for maxillary second molar T7 are arranged between the third virtual curve 28 expressed by a quadratic function Y mm={(X mm×X mm)/36 mm}−16 mm and the fourth virtual curve 29 expressed by Y mm={(X mm×X mm)/24 mm}+1 mm;

the total width L2 in the mesiodistal direction from the left artificial tooth for maxillary second molar T7 to the right artificial tooth for maxillary second molar T7 is 130.0 mm; and in the maxillary coupled artificial teeth 6, the incisal edges of all the incisors and canines and the cusp apexes of all the molars have the Z coordinate values between −12.0 mm and +1.0 mm.

In the maxillomandibular fitting type coupled artificial tooth set of Comparative Example 1, the mandibular coupled artificial teeth 5 and the maxillary coupled artificial teeth 6 in the intercuspal state are brought into contact at a total of two positions, i.e., at one position of the left artificial teeth for first premolar and one position of the right artificial teeth for first molar, with respect to maxillary functional cusps of parts with the same name on mandibular buccal cusp inner inclines.

The maxillomandibular fitting type coupled artificial tooth set of Comparative Example 2 will be described.

The maxillomandibular fitting type coupled artificial tooth set of Comparative Example 2 includes the mandibular coupled artificial teeth 5 and the maxillary coupled artificial teeth 6 having an arch shape.

In Comparative Example 2, the mandibular coupled artificial teeth 5 have the artificial tooth for mandibular central incisor T8, the artificial tooth for mandibular lateral incisor T9, the artificial tooth for mandibular canine T10, the artificial tooth for mandibular first premolar T11, the artificial tooth for mandibular second premolar T12, the artificial tooth for mandibular first molar T13, and the artificial tooth for mandibular second molar T14 arranged on each of the left and right sides. Therefore, the mandibular coupled artificial teeth 5 include 14 forms made up of the two artificial teeth for mandibular central incisor T8, the two artificial teeth for mandibular lateral incisor T9, the two artificial teeth for mandibular canine T10, the two artificial teeth for mandibular first premolar T11, the two artificial teeth for mandibular second premolar T12, the two artificial teeth for mandibular first molar T13, and the two artificial teeth for mandibular second molar T14.

In the mandibular coupled artificial teeth 5, the respective parts are all coupled. Specifically, at the center of the mandibular coupled artificial teeth 5, the left and right artificial teeth for mandibular central incisor T8 are coupled to each other. At the respective parts on both the left and right sides of the mandibular coupled artificial teeth 5, the artificial tooth for mandibular central incisor T8, the artificial tooth for mandibular lateral incisor T9, the artificial tooth for mandibular canine T10, the artificial tooth for mandibular first premolar T11, the artificial tooth for mandibular second premolar T12, the artificial tooth for mandibular first molar T13, and the artificial tooth for mandibular second molar T14 are coupled in this order.

When the mandibular coupled artificial teeth 5 are represented in a virtual XYZ orthogonal coordinate system, the following conditions (i) to (iv) are satisfied:

(i) the origin 1 of the virtual XYZ orthogonal coordinate system is made coincident with the mandibular incisal point 10 at the X coordinate value of 0 mm, the Y coordinate value of 0 mm, and the Z coordinate value of 0 mm;

(ii) in the mandibular coupled artificial teeth 5, the distobuccal cusp apexes C15 of the artificial teeth for mandibular first molar T13 on both the left and right sides have the Z coordinate value of 0 mm;

(iii) the left parts of the mandibular coupled artificial teeth 5 are arranged on the positive (+) X coordinate value side while the right parts of the mandibular coupled artificial teeth 5 are arranged on the negative (−) X coordinate value side; and (iv) the absolute values of the X, Y, and Z coordinate values of positions of the incisal edges of the incisors and the canine and the cusp apexes of the molars of the left parts of the mandibular coupled artificial teeth 5 are respectively equal to the absolute values of the X, Y, and Z coordinate values of positions of the incisal edges of the incisors and the canine and the cusp apexes of the molars of the right parts of the mandibular coupled artificial teeth 5.

When the conditions (i) to (iv) are satisfied, the crown forms of the artificial teeth for mandibular central incisor T8, the artificial teeth for mandibular lateral incisor T9, the artificial teeth for mandibular canine T10, the artificial teeth for mandibular first premolar T11, the artificial teeth for mandibular second premolar T12, the artificial teeth for mandibular first molar T13, and the artificial teeth for mandibular second molar T14 on both the left and right sides of the mandibular coupled artificial teeth 5 are arranged between the first virtual curve 18 expressed by a quadratic function Y mm={(X mm×X mm)/32 mm}−4 mm and the second virtual curve 19 expressed by Y mm={(X mm×X mm)/16 mm}+2 mm;

the total width L1 in the mesiodistal direction from the left artificial tooth for mandibular second molar T14 to the right artificial tooth for mandibular second molar T14 is 126.0 mm; and in the mandibular coupled artificial teeth 5, the incisal edges of all the incisors and canines and the cusp apexes of all the molars have the Z coordinate values between −3.0 mm and +4.0 mm.

In Comparative Example 2, the maxillary coupled artificial teeth 6 have the artificial tooth for maxillary central incisor T1, the artificial tooth for maxillary lateral incisor T2, the artificial tooth for maxillary canine T3, the artificial tooth for maxillary first premolar T4, the artificial tooth for maxillary second premolar T5, the artificial tooth for maxillary first molar T6, and the artificial tooth for maxillary second molar T7 arranged on each of the left and right sides. Therefore, the maxillary coupled artificial teeth 6 include 14 forms made up of the two artificial teeth for maxillary central incisor T1, the two artificial teeth for maxillary lateral incisor T2, the two artificial teeth for maxillary canine T3, the two artificial teeth for maxillary first premolar T4, the two artificial teeth for maxillary second premolar T5, the two artificial teeth for maxillary first molar T6, and the two artificial teeth for maxillary second molar T7.

In the maxillary coupled artificial teeth 6, the respective parts are all coupled. Specifically, at the center of the maxillary coupled artificial teeth 6, the left and right artificial teeth for maxillary central incisor T1 are coupled to each other. At the respective parts on both the left and right sides of the maxillary coupled artificial teeth 6, the artificial tooth for maxillary central incisor T1, the artificial tooth for maxillary lateral incisor T2, the artificial tooth for maxillary canine T3, the artificial tooth for maxillary first premolar T4, the artificial tooth for maxillary second premolar T5, the artificial tooth for maxillary first molar T6, and the artificial tooth for maxillary second molar T7 are coupled in this order.

When the maxillary coupled artificial teeth 6 are represented in a virtual XYZ orthogonal coordinate system, the following conditions (v) to (viii) are satisfied:

(v) the maxillary coupled artificial teeth 6 are arranged such that the maxillary incisal point 20 has the X coordinate value of 0 mm, the Y coordinate value of −8.0 mm, and the Z coordinate value of −2.0 mm relative to the origin 1 of the virtual XYZ orthogonal coordinate system;

(vi) the left parts of the maxillary coupled artificial teeth 6 are arranged on the positive (+) X coordinate value side while the right parts of the maxillary coupled artificial teeth 6 are arranged on the negative (−) X coordinate value side;

(vii) the absolute values of the X, Y, and Z coordinate values of positions of the incisal edges of the incisors and the canine and the cusp apexes of the molars of the left parts of the maxillary coupled artificial teeth 6 are respectively equal to the absolute values of the X, Y, and Z coordinate values of positions of the incisal edges of the incisors and the canine and the cusp apexes of the molars of the right parts of the maxillary coupled artificial teeth 6; and (viii) the maxillary coupled artificial teeth 6 are arranged such that the central fossa S6 of the artificial tooth for maxillary first molar T6 has X and Y coordinate values within a radius of 3.0 mm around the distobuccal cusp apex C15 of the artificial tooth for mandibular first molar T13 and a Z coordinate value of +1.0 mm.

When the conditions (v) to (viii) are satisfied, the crown forms of the parts of the artificial teeth for maxillary central incisor T1, the artificial teeth for maxillary lateral incisor T2, the artificial teeth for maxillary canine T3, the artificial teeth for maxillary first premolar T4, the artificial teeth for maxillary second premolar T5, the artificial teeth for maxillary first molar T6, and the artificial teeth for maxillary second molar T7 are arranged between the third virtual curve 28 expressed by a quadratic function Y mm={(X mm×X mm)/32 mm}−11 mm and the fourth virtual curve 29 expressed by Y mm={(X mm×X mm)/16 mm}+1 mm;

the total width L2 in the mesiodistal direction from the left artificial tooth for maxillary second molar T7 to the right artificial tooth for maxillary second molar T7 is 130.0 mm;

the width in a buccolingual direction of the left and right artificial teeth for maxillary first molar T6 is 8.5 mm; and in the maxillary coupled artificial teeth 6, the incisal edges of all the incisors and canines and the cusp apexes of all the molars have the Z coordinate values between −4.0 mm and +3.0 mm.

In the maxillomandibular fitting type coupled artificial tooth set of Comparative Example 2, the mandibular coupled artificial teeth 5 and the maxillary coupled artificial teeth 6 in the intercuspal state are brought into contact at a total of two positions, i.e., at one position of the left artificial teeth for first premolar and one position of the right artificial teeth for first molar, with respect to maxillary functional cusps of parts with the same name on mandibular buccal cusp inner inclines.

Subsequently, three technicians with different years of experience produced complete dentures in a normal manner by using the maxillomandibular fitting type coupled artificial tooth sets of Examples 1 and 2 and Comparative Examples 1 and 2 for edentulous jaw models of three patients different in shape and size.

The technicians were referred to as Technician a, Technician b, and Technician c in descending order of years of complete-denture production experience.

The patients were referred to as Edentulous Jaw Model M1, Edentulous Jaw Model M2, and Edentulous Jaw Model M3 in descending order of apparent size.

Edentulous Jaw Model M1 has a distance of 62 mm between the right and left retromolar trigone posterior borders in the mandible and a distance of 56 mm between the left and right hamular notches in the maxilla. Edentulous Jaw Model M2 has a distance of 56 mm between the right and left retromolar trigone posterior borders in the mandible and a distance of 48 mm between the left and right hamular notches in the maxilla. Edentulous Jaw Model M3 has a distance of 50 mm between the right and left retromolar trigone posterior borders in the mandible and a distance of 42 mm between the left and right hamular notches in the maxilla.

Regarding the time required for artificial tooth arrangement, an articulator used was a mean-value articulator (Handy IIA manufactured by Shofu inc.). The maxillomandibular fitting type coupled artificial tooth sets of Examples 1 and 2 and Comparative Examples 1 and 2 were arranged by the technician a, the technician b, and the technician c on occlusal rims manufactured based on the occlusal plane table, and a time required for completing the arrangement was measured.

Table 1 shows evaluation results of the time required for artificial tooth arrangement.

TABLE 1

| | | Time required for arrangement operation | | | | |
|---|---|---|---|---|---|---|
| | | arrangement time (minutes) | | | | |
| | | Edentulous Jaw Model M1 | Edentulous Jaw Model M2 | Edentulous Jaw Model M1 | average by technician | average by model |
| Example 1 | Technician a | 12 | 13 | 14 | 13 | 13 |
| | Technician b | 10 | 12 | 17 | 13 | |
| | Technician c | 16 | 13 | 12 | 14 | |
| Example 2 | Technician a | 11 | 9 | 9 | 10 | 11 |
| | Technician b | 8 | 10 | 12 | 10 | |
| | Technician c | 13 | 12 | 10 | 12 | |
| Comparative Example 1 | Technician a | 33 | 41 | 39 | 38 | 39 |
| | Technician b | 36 | 39 | 46 | 40 | |
| | Technician c | 38 | 48 | 31 | 39 | |

TABLE 1-continued

Time required for arrangement operation

| | | arrangement time (minutes) | | | | |
|---|---|---|---|---|---|---|
| | | Edentulous Jaw Model M1 | Edentulous Jaw Model M2 | Edentulous Jaw Model M1 | average by technician | average by model |
| Comparative Example 2 | Technician a | 32 | 34 | 23 | 30 | 34 |
| | Technician b | 29 | 28 | 24 | 27 | |
| | Technician c | 49 | 39 | 46 | 45 | |

It can be seen that when the maxillomandibular fitting type coupled artificial tooth set of Example 1 is used and when the maxillomandibular fitting type coupled artificial tooth set of Example 2 is used, the time required for the arrangement operation is clearly shorter as compared to when the maxillomandibular fitting type coupled artificial tooth set of Comparative Example 1 is used and when the maxillomandibular fitting type coupled artificial tooth set of Comparative Example 2 is used.

It can also be seen that variations due to a difference in the years of experience of the technicians are small when the same coupled artificial tooth set is used.

This suggests that the maxillomandibular fitting type coupled artificial tooth set of the present invention enables a technician to arrange artificial teeth in a short time regardless of a skill of the technician and a difference in shape of the alveolar ridge of an edentulous patient.

Subsequently, a completeness of an occlusal contact state was evaluated in terms of a contact state of the parts of the coupled artificial tooth set in the intercuspal position on the articulator and of a contact state of the parts of the coupled artificial tooth set at the time of lateral movement and forward movement along a guide path of the articulator.

The completeness of an occlusal contact state was visually and subjectivity evaluated in three grades of "A", "B", and "C" by a technician. "A" denotes a state of harmonizing with an alveolar ridge shape on a model based on a technician's subjective evaluation and establishing bilateral balanced occlusion. "B" denotes a state of harmonizing with an alveolar ridge shape on a model and establishing bilateral balanced occlusion without all the parts being in contact. "C" denotes a state of not harmonizing with an alveolar ridge shape on a model based on a technician's subjective evaluation or not achieving the static stability in the intercuspal position.

Table 2 shows the evaluation results of the completeness of the arrangement state on the articulator.

TABLE 2

Completeness of arrangement state on the articulator

| | | arrangement time (minutes) | | |
|---|---|---|---|---|
| | | Edentulous Jaw Model M1 | Edentulous Jaw Model M2 | Edentulous Jaw Model M1 |
| Example 1 | Technician a | B | B | B |
| | Technician b | B | B | B |
| | Technician c | B | B | B |
| Example 2 | Technician a | A | A | A |
| | Technician b | A | A | A |
| | Technician c | A | A | A |
| Comparative Example 1 | Technician a | C | C | C |
| | Technician b | C | C | C |
| | Technician c | C | C | C |

TABLE 2-continued

Completeness of arrangement state on the articulator

| | | arrangement time (minutes) | | |
|---|---|---|---|---|
| | | Edentulous Jaw Model M1 | Edentulous Jaw Model M2 | Edentulous Jaw Model M1 |
| Comparative Example 2 | Technician a | C | C | C |
| | Technician b | C | C | C |
| | Technician c | C | C | C |

It can be seen that when the maxillomandibular fitting type coupled artificial tooth set of Example 1 is used and when the maxillomandibular fitting type coupled artificial tooth set of Example 2 is used, the completeness is clearly higher as compared to when the maxillomandibular fitting type coupled artificial tooth set of Comparative Example 1 is used and when the maxillomandibular fitting type coupled artificial tooth set of Comparative Example 2 is used.

It can also be seen that when the maxillomandibular fitting type coupled artificial tooth set of Example 1 is used, the completeness of the arrangement state is higher as compared to when the maxillomandibular fitting type coupled artificial tooth set of Example 2 is used.

It can be seen that when the maxillomandibular fitting type coupled artificial tooth set of Comparative Example 1 is used, the completeness of the arrangement state is low in any of the examples.

When the maxillomandibular fitting type coupled artificial tooth set of Comparative Example 2 is used, the shape of the dental arch is equivalent to that of the maxillomandibular fitting type coupled artificial tooth set of Example 1, and therefore, the dental arch harmonizes with the alveolar ridge shape of the edentulous jaw model; however, in most cases, the bilateral balanced occlusion cannot be established, resulting in low completeness in all conditions.

This suggests that the maxillomandibular fitting type coupled artificial tooth set of the present invention enables a technician to arrange artificial teeth with high completeness and to establish ideal occlusal contact relationship regardless of a skill of the technician and a difference in shape of the alveolar ridge of an edentulous patient.

INDUSTRIAL APPLICABILITY

Although the present invention is mainly intended to be used for complete dentures, the use thereof is not necessarily limited to complete dentures, and the present invention is effectively used for only one of the upper and lower jaws and for fabricating dentures in combination of a partial denture for multiple tooth loss and a complete denture.

For example, in the case that the maxilla has all the incisors and canines remaining and all the molars lost while all the teeth are lost in the mandible, maxillary coupled artificial teeth of the present invention may be divided between an artificial tooth for canine and an artificial tooth for first premolar to use only the artificial teeth for molar. In this case, a fitting state is ensured between the maxillary molars and the mandibular molars, a favorable denture can be produced in a shorter time than using conventional artificial teeth independent of each other.

With the progress of super-aging society, the number of patients difficult to visit a dental clinic is expected to increase, and it may be necessary to manufacture dentures and repair artificial teeth in an environment without a dental care facility, such as ordinary homes, nursing facilities, and hospitals. The present invention is expected to facilitate application to such a situation.

EXPLANATIONS OF LETTERS OR NUMERALS 1 virtual coordinate system origin
2 virtual coordinate system X axis
3 virtual coordinate system Y axis
4 virtual coordinate system Z axis
5 mandibular coupled artificial teeth
6 maxillary coupled artificial teeth
10 mandibular incisal point
18 first virtual curve
19 second virtual curve
20 maxillary incisal point
28 third virtual curve
29 fourth virtual curve
31 first virtual straight line
32 second virtual straight line
33 third virtual straight line
34 fourth virtual straight line
L1 total width in mesiodistal direction from left artificial tooth for mandibular second molar to right artificial tooth for mandibular second molar
L2 total width in mesiodistal direction from left artificial tooth for maxillary second molar to right artificial tooth for maxillary second molar
T1 artificial tooth for maxillary central incisor
i1 incisal edge
f1 protrusive facet
f2 protrusive facet
T2 artificial tooth for maxillary lateral incisor
i2 incisal edge
f3 protrusive facet
f4 protrusive facet
T3 artificial tooth for maxillary canine
i3 incisal edge
f5 protrusive facet
f6 retrusive facet
T4 artificial tooth for maxillary first premolar
C1 buccal cusp apex
f7 protrusive facet
f8 retrusive facet
C2 lingual cusp apex
f9 balancing facet
T5 artificial tooth for maxillary second premolar
C3 buccal cusp apex
f10 protrusive facet
f11 retrusive facet
C4 lingual cusp apex
f12 balancing facet
T6 artificial tooth for maxillary first molar
C5 mesiobuccal cusp apex
f13 protrusive facet
f14 retrusive facet
C6 distobuccal cusp apex
f15 protrusive facet
f16 retrusive facet
C7 mesiobuccal cusp apex
f17 balancing facet
f18 protrusive facet
C8 distolingual cusp apex
f19 retrusive facet
f20 balancing facet
S6 central fossa
T7 artificial tooth for maxillary second molar
C9 mesiobuccal cusp apex
f21 protrusive facet
f22 retrusive facet
C10 distobuccal cusp apex
f23 retrusive facet
C11 mesiobuccal cusp apex
f24 balancing facet
f25 protrusive facet
T8 artificial tooth for mandibular central incisor
i4 incisal edge
f26 protrusive facet
T9 artificial tooth for mandibular lateral incisor
i5 incisal edge
f27 protrusive facet
f28 protrusive facet
T10 artificial tooth for mandibular canine
i6 incisal edge
f29 protrusive facet
f30 retrusive facet
T11 artificial tooth for mandibular first premolar
C12 buccal cusp apex
f31 protrusive facet
f32 retrusive facet
S1 distal fossete
f33 balancing facet
f34 protrusive facet
T12 artificial tooth for mandibular second premolar
C13 buccal cusp apex
f35 protrusive facet
f36 retrusive facet
S2 distal fossete
f37 balancing facet
f38 protrusive facet
T13 artificial tooth for mandibular first molar
C14 mesiobuccal cusp apex
f39 protrusive facet
f40 retrusive facet
f41 balancing facet
C15 distobuccal cusp apex
f42 protrusive facet
f43 retrusive facet
f44 balancing facet
C16 distal cusp apex
f45 protrusive facet
f46 balancing facet
S3 central fossa
f47 protrusive facet
T14 artificial tooth for mandibular second molar
C17 mesiobuccal cusp apex
f48 protrusive facet
f49 retrusive facet
f50 balancing facet
C18 distobuccal cusp apex
f51 protrusive facet
f52 retrusive facet

The invention claimed is:

1. An artificial teeth set comprising:
mandibular coupled artificial teeth (5) having an arch shape; and
maxillary coupled artificial teeth (6) having an arch shape, wherein
the mandibular coupled artificial teeth (5) have a center which divides the arch shape of the mandibular coupled artificial teeth (5) into a left side and a right side, wherein
the left side of the mandibular coupled artificial teeth (5) includes an artificial tooth for a mandibular central incisor (T8), an artificial tooth for a mandibular lateral incisor (T9), an artificial tooth for a mandibular canine (T10), an artificial tooth for a mandibular first premolar (T11), an artificial tooth for a mandibular second premolar (T12), an artificial tooth for a mandibular first molar (T13), and an artificial tooth for a mandibular second molar (T14), wherein
the right side of the mandibular coupled artificial teeth (5) includes an artificial tooth for a mandibular central incisor (T8), an artificial tooth for a mandibular lateral incisor (T9), an artificial tooth for a mandibular canine (T10), an artificial tooth for a mandibular first premolar (T11), an artificial tooth for a mandibular second premolar (T12), an artificial tooth for a mandibular first molar (T13), and an artificial tooth for a mandibular second molar (T14), wherein
the center of the mandibular coupled artificial teeth (5) is between the artificial tooth for the mandibular central incisor (T8) on the left side and the artificial tooth for the mandibular central incisor (T8) on the right side, wherein
at the center of the mandibular coupled artificial teeth (5), the artificial tooth for the mandibular central incisor (T8) on the left side and the artificial tooth for the mandibular central incisor (T8) on the right side are coupled to each other, wherein
on each of the left side and the right side of the mandibular coupled artificial teeth (5), the artificial tooth for the mandibular central incisor (T8), the artificial tooth for the mandibular lateral incisor (T9), the artificial tooth for the mandibular canine (T10), the artificial tooth for the mandibular first premolar (T11), the artificial tooth for the mandibular second premolar (T12), the artificial tooth for the mandibular first molar (T13), and the artificial tooth for the mandibular second molar (T14) are coupled in the order listed, wherein
when the mandibular coupled artificial teeth (5) are arranged within an XYZ orthogonal coordinate system,
a mandibular incisal point (10) is a middle point between the artificial tooth for the mandibular central incisor (T8) on the left side and the artificial tooth for the mandibular central incisor (T8) on the right side and coincides with an origin (1) of the XYZ orthogonal coordinate system having an X coordinate value of 0 mm, a Y coordinate value of 0 mm, and a Z coordinate value of 0 mm, wherein
distobuccal cusp apexes (C15) of the artificial tooth for the mandibular first molar (T13) on the left side and the artificial tooth for the mandibular first molar (T13) on the right side are arranged at positions having the Z coordinate value of 0 mm, wherein
all the artificial teeth (T8 to T14) arranged on the left side of the mandibular coupled artificial teeth (5) are arranged on a positive (+) X coordinate value side while all the artificial teeth (T8 to T14) arranged on the right side of the mandibular coupled artificial teeth (5) are arranged on a negative (−) X coordinate value side, wherein
on each of the left side and the right side of the mandibular coupled artificial teeth (5), the artificial tooth for the mandibular central incisor (T8), the artificial tooth for the mandibular lateral incisor (T9), and the artificial tooth for the mandibular canine (T10) have incisal edges, respectively, and the artificial tooth for the mandibular first premolar (T11), the artificial tooth for the mandibular second premolar (T12), the artificial tooth for the mandibular first molar (T13), and the artificial tooth for the mandibular second molar (T14) have cusp apexes, respectively,
absolute values of the X, Y, and Z coordinate values of positions of the incisal edges and the cusp apexes on the left side of the mandibular coupled artificial teeth (5) are respectively equal to absolute values of the X, Y, and Z coordinate values of positions of the incisal edges and the cusp apexes on the right side of the mandibular coupled artificial teeth (5), wherein
on both the left side and the right side of the mandibular coupled artificial teeth (5), the artificial teeth for the mandibular central incisor (T8), the artificial teeth for the mandibular lateral incisor (T9), the artificial teeth for the mandibular canine (T10), the artificial teeth for the mandibular first premolar (T11), the artificial teeth for the mandibular second premolar (T12), the artificial teeth for the mandibular first molar (T13), and the artificial teeth for the mandibular second molar (T14) have crown forms, respectively, the crown forms being arranged between a first curve (18) expressed by a quadratic function Y mm={(X mm×X mm)/α1 mm}−β1 mm and a second curve (19) expressed by Y mm={(X mm×X mm)/α2 mm}+β2 mm, the first curve (18) and the second curve (19) being arranged within an XY plane of the XYZ orthogonal coordinate system, where α1 mm, β1 mm, α2 mm, and β2 mm are in a range of 30 mm to 32 mm, in a range of 3 mm to 5 mm, in a range of 8 mm to 16 mm, and in a range of 2 mm to 5 mm, respectively, wherein
a total width (L1) in a mesiodistal direction from the artificial tooth for the mandibular second molar (T14) on the left side to the artificial tooth for the mandibular second molar (T14) on the right side is between 80.0 mm and 130.0 mm, wherein
in the mandibular coupled artificial teeth (5), all the incisal edges and all the cusp apexes are arranged at the Z coordinate values between −10.0 mm and +5.0 mm, wherein
the maxillary coupled artificial teeth (6) have a center which divides the arch shape of the maxillary coupled artificial teeth (6) into a left side and a right side, wherein
the left side of the maxillary coupled artificial teeth (6) includes an artificial tooth for a maxillary central incisor (T1), an artificial tooth for a maxillary lateral incisor (T2), an artificial tooth for a maxillary canine (T3), an artificial tooth for a maxillary first premolar (T4), an artificial tooth for a maxillary second premolar (T5), an artificial tooth for a maxillary first molar (T6), and an artificial tooth for a maxillary second molar (T7), wherein
the right side of the maxillary coupled artificial teeth (6) includes an artificial tooth for a maxillary central incisor (T1), an artificial tooth for a maxillary lateral incisor (T2), an artificial tooth for a maxillary canine (T3), an artificial tooth for a maxillary first premolar (T4), an artificial tooth for a maxillary second premolar (T5), an artificial tooth for a maxillary first molar (T6), and an artificial tooth for a maxillary second molar (T7), wherein the center of the maxillary coupled artificial teeth (6) is between the artificial tooth for the maxillary central incisor (T1) on the left side and the artificial tooth for the maxillary central incisor (T1) on the right side, wherein at the center of the maxillary coupled artificial teeth (6), the artificial tooth for the maxillary central incisor (T1) on the left side and the artificial tooth for the maxillary central incisor (T1) on the right side are coupled to each other, wherein on each of the left side and the right side of the maxillary coupled artificial teeth (6), the artificial tooth for the maxillary central incisor (T1), the artificial tooth for the maxillary lateral incisor (T2), the artificial tooth for the maxillary canine (T3), the artificial tooth for the maxillary first premolar (T4), the artificial tooth for the maxillary second premolar (T5), the artificial tooth for the maxillary first molar (T6), and the artificial tooth for the maxillary second molar (T7) are coupled in the order listed, wherein when the maxillary coupled artificial teeth (6) are arranged within the XYZ orthogonal coordinate system, a maxillary incisal point (20) is a middle point between a mesial incisal edge corner of the artificial tooth for the maxillary central incisor (T1) on the left side and a mesial incisal edge corner of the artificial tooth for the maxillary central incisor (T1) on the right side and is arranged to have an X coordinate value of 0 mm, a Y coordinate value of −10.0 mm to 0 mm, and a Z coordinate value of −10.0 mm to 0 mm relative to the origin (1) of the XYZ orthogonal coordinate system, wherein all the artificial teeth (T1 to T7) arranged on the left side of the maxillary coupled artificial teeth (6) are arranged on the positive (+) X coordinate value side while all the artificial teeth (T1 to T7) arranged on the right side of the maxillary coupled artificial teeth (6) are arranged on the negative (−) X coordinate value side, wherein on each of the left side and the right side of the maxillary coupled artificial teeth (6), the artificial tooth for the maxillary central incisor (T1), the artificial tooth for the maxillary lateral incisor (T2), and the artificial tooth for the maxillary canine (T3) have incisal edges, respectively, and the artificial tooth for the maxillary first premolar (T4), the artificial tooth for the maxillary second premolar (T5), the artificial tooth for the maxillary first molar (T6), and the artificial tooth for the maxillary second molar (T7) have cusp apexes, respectively, absolute values of the X, Y, and Z coordinate values of positions of the incisal edges and the cusp apexes on the left side of the maxillary coupled artificial teeth (6) are respectively equal to absolute values of the X, Y, and Z coordinate values of positions of the incisal edges and the cusp apexes of the right side of the maxillary coupled artificial teeth (6), wherein on at least one of the left side and the right side of the maxillary coupled artificial teeth (6), a central fossa (S6) of the artificial tooth for the maxillary first molar (T6) has X and Y coordinate values within a radius of 5.0 mm around the distobuccal cusp apex (C15) of the artificial tooth for the mandibular first molar (T13) and a Z coordinate value between 0 mm and +5.0 mm, wherein on each of the left side and the right side of the maxillary coupled artificial teeth (6), the artificial tooth for the maxillary central incisor (T1), the artificial tooth for the maxillary lateral incisor (T2), the artificial tooth for the maxillary canine (T3), the artificial tooth for the maxillary first premolar (T4), the artificial tooth for the maxillary second premolar (T5), the artificial tooth for the maxillary first molar (T6), and the artificial tooth for the maxillary second molar (T7) have crown forms, respectively, the crown forms being arranged between a third curve (28) expressed by a quadratic function Y mm={(X mm×X mm)/α3 mm}−β3 mm and a fourth curve (29) expressed by Y mm={(X mm×X mm)/α4 mm}+β4 mm, the third curve (28) and the fourth curve (29) being arranged within the XY plane of the XYZ orthogonal coordinate system, where α3 mm, β3 mm, α4 mm, and β4 mm are in a range of 32 mm to 36 mm, in a range of 8 mm to 12 mm, in a range of 8 mm to 16 mm, and in a range of 1 mm to 5 mm, respectively, wherein a total width (L2) in a mesiodistal direction from the artificial tooth for the maxillary second molar (T7) on the left side to the artificial tooth for the maxillary second molar (T7) on the right side is between 90.0 mm and 140.0 mm, wherein in the maxillary coupled artificial teeth (6), all the incisal edges and all the cusp apexes are arranged at the Z coordinate values between −5.0 mm and +10.0 mm, wherein the artificial teeth set is configured such that, when in use and in an intercuspal state in which the mandibular coupled artificial teeth (5) and the maxillary coupled artificial teeth (6) are in contact in a maximum number of areas, at each of the left side and the right side, at least one of the artificial tooth for the mandibular first premolar (T11) and the artificial tooth for the mandibular second premolar (T12) makes contact at one or more positions with at least one of the artificial tooth for the maxillary first premolar (T4) and the artificial tooth for the maxillary second premolar (T5), wherein at least one of the artificial tooth for the mandibular first molar (T13) and the artificial tooth for the mandibular second molar (T14) makes contact at one or more positions with at least one of the artificial tooth for the maxillary first molar (T6) and the artificial tooth for the maxillary second molar (T7), wherein a sum of contact positions at both the left side and the right side of the mandibular coupled artificial teeth (5) and the maxillary coupled artificial teeth (6) is four or more, and wherein on each of the left side and the right side, the artificial tooth for the mandibular first premolar (T11), the artificial tooth for the mandibular second premolar (T12), the artificial tooth for the mandibular first molar (T13), and the artificial tooth for the mandibular second molar (T14) and the artificial tooth for the maxillary first premolar (T4), the artificial tooth for the maxillary second premolar (T5), the artificial tooth for the maxillary first molar (T6), and the artificial tooth for the maxillary second molar (T7) are brought into contact and fit in a one-to-one or one-to-two tooth relationship.

2. The artificial teeth set according to claim 1, wherein
the artificial teeth set is configured to be arranged on an articulator including an occlusal plane table and an incisor guidance target and having an intercondylar distance of 105 mm, a sagittal condyle path angle of 25.0° relative to a horizontal plane, an angle of 15.0° formed by an occlusal triangle and an occlusal plane (P1), a sagittal incisal path angle of 10.0°, and a lateral incisal path angle of 10.0°, a tip of the incisor guidance target is coincident with the origin (1) of the XYZ orthogonal coordinate system, the occlusal plane (P1) of the occlusal plane table is defined as the XY plane of the XYZ coordinate system, a sagittal plane (P2) is defined as a YZ plane of the XYZ coordinate system, a frontal plane (P3) is defined as a ZX plane of the XYZ coordinate system, the left side of the mandibular coupled artificial teeth (5) and the left side of the maxillary coupled artificial teeth (6) are arranged on the positive (+) X coordinate value side, and the right side of the mandibular coupled artificial teeth (5) and the right side of the maxillary coupled artificial teeth (6) are arranged on the negative (−) X coordinate value side, each of the artificial tooth for the maxillary central incisor (T1) on the left side and the artificial tooth for the maxillary central incisor (T1) on the right side has two facets which include a first protrusive facet (f1) and a second protrusive facet (f2), at the incisal edge (i1), wherein angles formed by the first protrusive facet (f1) relative to the occlusal plane (P1) include an angle in a cross section on the sagittal plane (P2) of 22.0° to 25.5° and an angle in a cross section on the frontal plane (P3) of 1.5° to 6.5°, wherein angles formed by the second protrusive facet (f2) relative to the occlusal plane (P1) include an angle in a cross section on the sagittal plane (P2) of 20.5° to 23.0° and an angle in a cross section on the frontal plane (P3) of 1.5° to 6.5°, wherein each of the artificial tooth for the maxillary lateral incisor (T2) on the left side and the artificial tooth for the maxillary lateral incisor (T2) on the right side has two facets which include a third protrusive facet (f3) and a fourth protrusive facet (f4), at the incisal edge (i2), wherein angles formed by the third protrusive facet (f3) relative to the occlusal plane (P1) include an angle in a cross section on the sagittal plane (P2) of 23.0° to 28.0° and an angle in a cross section on the frontal plane (P3) of 15.0° to 17.0°, wherein angles formed by the fourth protrusive facet (f4) relative to the occlusal plane (P1) include an angle in a cross section on the sagittal plane (P2) of 16.0° to 22.0° and an angle in a cross section on the frontal plane (P3) of 9.5° to 10.5°, wherein each of the artificial tooth for the maxillary canine (T3) on the left side and the artificial tooth for the maxillary canine (T3) on the right side has two facets which include a fifth protrusive facet (f5) and a first retrusive facet (f6), at the incisal edge (i3), wherein angles formed by the fifth protrusive facet (f5) relative to the occlusal plane (P1) include an angle in a cross section on the sagittal plane (P2) of 25.0° to 31.0° and an angle in a cross section on the frontal plane (P3) of 1.5° to 5.0° wherein angles formed by the first retrusive facet (f6) relative to the occlusal plane (P1) include an angle in a cross section on the sagittal plane (P2) of 8.5° to 22.5° and an angle in a cross section on the frontal plane (P3) of 18.0° to 25.0°, wherein each of the artificial tooth for the maxillary first premolar (T4) on the left side and the artificial tooth for the maxillary first premolar (T4) on the right side has two facets which include a sixth protrusive facet (f7) and a second retrusive facet (f8), around a buccal cusp apex (C1) and has one facet which includes a first balancing facet (f9), around a lingual cusp apex (C2), wherein angles formed by the sixth protrusive facet (f7) near the buccal cusp apex (C1) relative to the occlusal plane (P1) include an angle in a cross section on the sagittal plane (P2) of 24.5° to 27.5° and an angle in a cross section on the frontal plane (P3) of 8.5° to 16.4°, wherein angles formed by the second retrusive facet (f8) near the buccal cusp apex (C1) relative to the occlusal plane (P1) include an angle in a cross section on the sagittal plane (P2) of 18.5° to 27.0° and an angle in a cross section on the frontal plane (P3) of 10.0° to 18.0°, wherein angles formed by the first balancing facet (f9) near the lingual cusp apex (C2) relative to the occlusal plane (P1) include an angle in a cross section on the sagittal plane (P2) of 1.5° to 4.5° and an angle in a cross section on the frontal plane (P3) of 29.5° to 35.5°, wherein each of the artificial tooth for the maxillary second premolar (T5) on the left side and the artificial tooth for the maxillary second premolar (T5) on the right side has two facets which include a seventh protrusive facet (f10) and a third retrusive facet (f11), around a buccal cusp apex (C3) and has one facet which includes a second balancing facet (f12), around a lingual cusp apex (C4), wherein angles formed by the seventh protrusive facet (f10) near the buccal cusp apex (C3) relative to the occlusal plane (P1) include an angle in a cross section on the sagittal plane (P2) of 23.0° to 28.0° and an angle in a cross section on the frontal plane (P3) of 10.0° to 19.0°, wherein angles formed by the third retrusive facet (f11) near the buccal cusp apex (C3) relative to the occlusal plane (P1) include an angle in a cross section on the sagittal plane (P2) of 16.5° to 19.0° and an angle in a cross section on the frontal plane (P3) of 13.0° to 17.5°, wherein angles formed by the second balancing facet (f12) near the lingual cusp apex (C4) relative to the occlusal plane (P1) include an angle in a cross section on the sagittal plane (P2) of 6.0° to 10.0° and an angle in a cross section on the frontal plane (P3) of 25.5° to 29.0°, wherein each of the artificial tooth for the maxillary first molar (T6) on the left side and the artificial tooth for the maxillary first molar (T6) on the right side has two facets which include an eighth protrusive facet (f13) and a fourth retrusive facet (f14), around a mesiobuccal cusp apex (C5), has two facets which includes a ninth protrusive facet (f15) and a fifth retrusive facet (f16), around the distobuccal cusp apex (C6), has two facets which include a tenth protrusive facet (f18) and a third balancing facet (f17), around a mesiobuccal cusp apex (C7), and has two facets which include a sixth retrusive facet (f19) and a fourth balancing facet (f20), around a distolingual cusp apex (C8), wherein angles formed by the eighth protrusive facet (f13) near the mesiobuccal cusp apex (C5) relative to the occlusal plane (P1) include an angle in a cross section on the sagittal plane (P2) of 18.5° to 21.0° and an angle in a cross section on the frontal plane (P3) of 5.0° to 11.0°, wherein angles formed by the fourth retrusive facet (f14) near the mesiobuccal cusp apex (C5) relative to the occlusal plane (P1) include an angle in a cross section on the sagittal plane (P2) of 7.0° to 12.0° and an angle in a cross section on the frontal plane (P3) of 9.0° to 13.0°, wherein angles formed by the ninth protrusive facet (f15) near the distobuccal cusp apex (C6) relative to the occlusal plane (P1) include an angle in a cross section on the sagittal plane (P2) of 15.5° to 19.5° and an angle in a cross section on the frontal plane (P3) of 8.0° to 9.0°, wherein angles formed by the fifth retrusive facet (f16) near the distobuccal cusp apex (C6) relative to the occlusal plane (P1) include an angle in a cross section on the sagittal plane (P2) of 18.5° to 23.0° and an angle in a cross section on the frontal plane (P3) of 11.0° to 13.5°, wherein angles formed by the third balancing facet (f17) near the mesiobuccal cusp apex (C7) relative to the occlusal plane (P1) include an angle in a cross section on the sagittal plane (P2) of 14.5° to 16.5° and an angle in a cross section on the frontal plane (P3) of 40.0° to 42.0°, wherein angles formed by the tenth protrusive facet (f18) near the mesiobuccal cusp apex (C7) relative to the occlusal plane (P1) include an angle in a cross section on the sagittal plane (P2) of 18.5° to 19.5° and an angle in a cross section on the frontal plane (P3) of 4.5° to 6.5°, wherein angles formed by the sixth retrusive facet (f19) near the distolingual cusp apex (C8) relative to the occlusal plane (P1) include an angle in a cross section on the sagittal plane (P2) of 6.5° to 7.5° and an angle in a cross section on the frontal plane (P3) of 15.5° to 18.0°, wherein angles formed by the fourth balancing facet (f20) near the distolingual cusp apex (C8) relative to the occlusal plane (P1) include an angle in a cross section on the sagittal plane (P2) of 3.0° to 12.0° and an angle in a cross section on the frontal plane (P3) of 32.0° to 38.5°, wherein each of the artificial tooth for the maxillary second molar (T7) on the left side and the artificial tooth for the maxillary second molar (T7) on the right side has two facets which include an eleventh protrusive facet (f21) and a seventh retrusive facet (f22), around a mesiobuccal cusp apex (C9), has one facet which includes an eighth retrusive facet (f23), around a distobuccal cusp apex (C10), and has two facets which include a twelfth protrusive facet (f25) and a fifth balancing facet (f24), around a mesiobuccal cusp apex (C11), wherein angles formed by the eleventh protrusive facet (f21) near the mesiobuccal cusp apex (C9) relative to the occlusal plane (P1) include an angle in a cross section on the sagittal plane (P2) of 22.5° to 25.5° and an angle in a cross section on the frontal plane (P3) of 1.0° to 2.5°, wherein angles formed by the seventh retrusive facet (f22) near the mesiobuccal cusp apex (C9) relative to the occlusal plane (P1) include an angle in a cross section on the sagittal plane (P2) of 9.5° to 17.5° and an angle in a cross section on the frontal plane (P3) of 13.0° to 16.5°, wherein angles formed by the eighth retrusive facet (f23) near the distobuccal cusp apex (C10) relative to the occlusal plane (P1) include an angle in a cross section on the sagittal plane (P2) of 6.5° to 12.0° and an angle in a cross section on the frontal plane (P3) of 4.5° to 7.0°, wherein angles formed by the fifth balancing facet (f24) near the mesiobuccal cusp apex (C11) relative to the occlusal plane (P1) include an angle in a cross section on the sagittal plane (P2) of 0.5° to 10.0° and an angle in a cross section on the frontal plane (P3) of 38.5° to 47.0°, wherein angles formed by the twelfth protrusive facet (f25) near the mesiobuccal cusp apex (C11) relative to the occlusal plane (P1) include an angle in a cross section on the sagittal plane (P2) of 20.5° to 22.5° and an angle in a cross section on the frontal plane (P3) of 1.5° to 6.0°, wherein each of the artificial tooth for the mandibular central incisor (T8) on the left side and the artificial tooth for the mandibular central incisor (T8) on the right side has a thirteenth protrusive facet (f26) at the incisal edge (i4), wherein angles formed by the thirteenth protrusive facet (f26) relative to the occlusal plane (P1) include an angle in a cross section on the sagittal plane (P2) of 27.0° to 35.0° and an angle in a cross section on the frontal plane (P3) of 3.5° to 12.5°, wherein each of the artificial tooth for the mandibular lateral incisor (T9) on the left side and the artificial tooth for the mandibular lateral incisor (T9) on the right side has a fourteenth protrusive facet (f27) and a fifteenth protrusive facet (f28) at the incisal edge (i5), wherein angles formed by the fourteenth protrusive facet (f27) relative to the occlusal plane (P1) include an angle in a cross section on the sagittal plane (P2) of 31.0° to 35.0° and an angle in a cross section on the frontal plane (P3) of 0.0° to 1.5°, wherein angles formed by the fifteenth protrusive facet (f28) relative to the occlusal plane (P1) include an angle in a cross section on the sagittal plane (P2) of 22.0° to 35.0° and an angle in a cross section on the frontal plane (P3) of 17.5° to 26.5°, wherein each of the artificial tooth for the mandibular canine (T10) on the left side and the artificial tooth for the mandibular canine (T10) on the right side has a sixteenth protrusive facet (f29) and a ninth retrusive facet (f30) at the incisal edge (i6), wherein angles formed by the sixteenth protrusive facet (f29) relative to the occlusal plane (P1) include an angle in a cross section on the sagittal plane (P2) of 23.0° to 28.0° and an angle in a cross section on the frontal plane (P3) of 0.5° to 10.0°, wherein angles formed by the ninth retrusive facet (f30) relative to the occlusal plane (P1) include an angle in a cross section on the sagittal plane (P2) of 14.5° to 18.0° and an angle in a cross section on the frontal plane (P3) of 16.0° to 21.0°, wherein each of the artificial tooth for the mandibular first premolar (T11) on the left side and the artificial tooth for the mandibular first premolar (T11) on the right side has two facets which include a seventeenth protrusive facet (f31) and a tenth retrusive facet (f32), around a buccal cusp apex (C12), has one facet which includes a sixth balancing facet (f33), on the distal marginal ridge, and has one facet which includes an eighteenth protrusive facet (f34), around the lingual cusp apex, wherein angles formed by the seventeenth protrusive facet (f31) near the buccal cusp apex (C12) relative to the occlusal plane (P1) include an angle in a cross section on the sagittal plane (P2) of 38.0° to 41.0° and an angle in a cross section on the frontal plane (P3) of 5.0° to 8.5°, wherein angles formed by the tenth retrusive facet (f32) near the buccal cusp apex (C12) relative to the occlusal plane (P1) include an angle in a cross section on the sagittal plane (P2) of 7.0° to 17.5° and an angle in a cross section on the frontal plane (P3) of 9.0° to 15.5°, wherein angles formed by the sixth balancing facet (f33) near a distal fossa relative to the occlusal plane (P1) include an angle in a cross section on the sagittal plane (P2) of 15.0° to 24.0° and an angle in a cross section on the frontal plane (P3) of 29.0° to 32.0°, wherein angles formed by the eighteenth protrusive facet (f34) near the distal fossa relative to the occlusal plane (P1) include an angle in a cross section on the sagittal plane (P2) of 3.5° to 10.0° and an angle in a cross section on the frontal plane (P3) of 1.0° to 5.0°, wherein each of the artificial tooth for the mandibular second premolar (T12) on the left side and the artificial tooth for the mandibular second premolar (T12) on the right side has two facets which include a nineteenth protrusive facet (f35) and an eleventh retrusive facet (f36), around a buccal cusp apex (C13), has one facet which includes a seventh balancing facet (f37), on the distal marginal ridge, and has one facet which includes a twentieth protrusive facet (f38), around the linguistic cusp apex, wherein angles formed by the nineteenth protrusive facet (f35) near the buccal cusp apex (C13) relative to the occlusal plane (P1) include an angle in a cross section on the sagittal plane (P2) of 27.5° to 30.0° and an angle in a cross section on the frontal plane (P3) of 16.0° to 19.0°, wherein angles formed by the eleventh retrusive facet (f36) near the buccal cusp apex (C13) relative to the occlusal plane (P1) include an angle in a cross section on the sagittal plane (P2) of 13.0° to 15.0° and an angle in a cross section on the frontal plane (P3) of 17.0° to 24.0°, wherein angles formed by the seventh balancing facet (f37) near the distal fossa relative to the occlusal plane (P1) include an angle in a cross section on the sagittal plane (P2) of 1.5° to 17.0° and an angle in a cross section on the frontal plane (P3) of 10.0° to 16.5°, wherein angles formed by the twentieth protrusive facet (f38) near the distal fossa relative to the occlusal plane (P1) include an angle in a cross section on the sagittal plane (P2) of 2.0° to 5.0° and an angle in a cross section on the frontal plane (P3) of 12.0° to 14.5°, wherein each of the artificial tooth for the mandibular first molar (T13) on the left side and the artificial tooth for the mandibular first molar (T13) on the right side has three facets which include a twenty-first protrusive facet (f39), a twelfth retrusive facet (f40), and an eighth balancing facet (f41), around a mesiobuccal cusp apex (C14), has three facets which include a twenty-second protrusive facet (f42), a thirteenth retrusive facet (f43), and a ninth balancing facet (f44), around a distobuccal cusp apex (C15), has two facets which include a twenty-third protrusive facet (f45) and a tenth balancing facet (f46), around a distobuccal cusp apex (C16), and has one facet which includes a twenty-fourth protrusive facet (f47), near a central fossa (S3), wherein angles formed by the twenty-first protrusive facet (f39) near the mesiobuccal cusp apex (C14) relative to the occlusal plane (P1) include an angle in a cross section on the sagittal plane (P2) of 23.5° to 32.0° and an angle in a cross section on the frontal plane (P3) of 7.0° to 15.0°, wherein angles formed by the twelfth retrusive facet (f40) near the mesiobuccal cusp apex (C14) relative to the occlusal plane (P1) include an angle in a cross section on the sagittal plane (P2) of 7.5° to 12.0° and an angle in a cross section on the frontal plane (P3) of 14.0° to 16.0°, wherein angles formed by the eighth balancing facet (f41) near the mesiobuccal cusp apex (C14) relative to the occlusal plane (P1) include an angle in a cross section on the sagittal plane (P2) of 2.0° to 5.5° and an angle in a cross section on the frontal plane (P3) of 30.0° to 32.0°, wherein angles formed by the twenty-second protrusive facet (f42) near the distobuccal cusp apex (C15) relative to the occlusal plane (P1) include an angle in a cross section on the sagittal plane (P2) of 15.5° to 21.0° and an angle in a cross section on the frontal plane (P3) of 8.0° to 11.0°, wherein angles formed by the thirteenth retrusive facet (f43) near the distobuccal cusp apex (C15) relative to the occlusal plane (P1) include an angle in a cross section on the sagittal plane (P2) of 25.0° to 27.0° and an angle in a cross section on the frontal plane (P3) of 24.0° to 25.0°, wherein angles formed by the ninth balancing facet (f44) near the distobuccal cusp apex (C15) relative to the occlusal plane (P1) include an angle in a cross section on the sagittal plane (P2) of 12.0° to 20.0° and an angle in a cross section on the frontal plane (P3) of 30.0° to 37.0°, wherein angles formed by the twenty-third protrusive facet (f45) near the distobuccal cusp apex (C16) relative to the occlusal plane (P1) include an angle in a cross section on the sagittal plane (P2) of 7.5° to 13.0° and an angle in a cross section on the frontal plane (P3) of 10.0° to 13.0°, wherein angles formed by the tenth balancing facet (f46) near the distobuccal cusp apex (C16) relative to the occlusal plane (P1) include an angle in a cross section on the sagittal plane (P2) of 2.5° to 4.5° and an angle in a cross section on the frontal plane (P3) of 27.0° to 33.0°, wherein angles formed by the twenty-fourth protrusive facet (f47) near the central fossa (S3) relative to the occlusal plane (P1) include an angle in a cross section on the sagittal plane (P2) of 10.5° to 18.5° and an angle in a cross section on the frontal plane (P3) of 1.0° to 8.0°, wherein each of the artificial tooth for the mandibular second molar (T14) on the left side and the artificial tooth for the mandibular second molar (T14) on the right side has three facets which include a twenty-fifth protrusive facet (f48), a fourteenth retrusive facet (f49), and an eleventh balancing facet (f50), around a mesiobuccal cusp apex (C17), has three facets which include a twenty-sixth protrusive facet (f51), a fifteenth retrusive facet (f52), and a twelfth balancing facet (f53), around a distobuccal cusp apex (C18), and has one facet which includes a twenty-seventh protrusive facet (f54), near a central fossa (S4), wherein angles formed by the twenty-fifth protrusive facet (f48) near the mesiobuccal cusp apex (C17) relative to the occlusal plane (P1) include an angle in a cross section on the sagittal plane (P2) of 26.0° to 30.0° and an angle in a cross section on the frontal plane (P3) of 10.0° to 13.0°, wherein angles formed by the fourteenth retrusive facet (f49) near the mesiobuccal cusp apex (C17) relative to the occlusal plane (P1) include an angle in a cross section on the sagittal plane (P2) of 14.0° to 16.0° and an angle in a cross section on the frontal plane (P3) of 15.0° to 17.5°, wherein angles formed by the eleventh balancing facet (f50) near the mesiobuccal cusp apex (C17) relative to the occlusal plane (P1) include an angle in a cross section on the sagittal plane (P2) of 2.5° to 3.5° and an angle in a cross section on the frontal plane (P3) of 34.0° to 38.0°, wherein angles formed by the twenty-sixth protrusive facet (f51) near the distobuccal cusp apex (C18) relative to the occlusal plane (P1) include an angle in a cross section on the sagittal plane (P2) of 17.0° to 21.0° and an angle in a cross section on the frontal plane (P3) of 4.5° to 6.5°, wherein angles formed by the fifteenth retrusive facet (f52) near the distobuccal cusp apex (C18) relative to the occlusal plane (P1) include an angle in a cross section on the sagittal plane (P2) of 19.0° to 22.0° and an angle in a cross section on the frontal plane (P3) of 13.0° to 14.5°, wherein angles formed by the twelfth balancing facet (f53) near the distobuccal cusp apex (C18) relative to the occlusal plane (P1) include an angle in a cross section on the sagittal plane (P2) of 1.0° to 3.0° and an angle in a cross section on the frontal plane (P3) of 34.0° to 38.0°, wherein angles formed by the twenty-seventh protrusive facet (f54) near the central fossa (S4) relative to the occlusal plane (P1) include an angle in a cross section on the sagittal plane (P2) of 15.5° to 23.0° and an angle in a cross section on the frontal plane (P3) of 5.5° to 12.0°, wherein the artificial teeth set is configured such that, in the intercuspal state, the first protrusive facet (f1) of the artificial tooth for the maxillary central incisor (T1) makes partial contact with the fourteenth protrusive facet (f27) of the artificial tooth for the mandibular lateral incisor (T9), wherein the second protrusive facet (f2) of the artificial tooth for the maxillary central incisor (T1) makes partial contact with the thirteenth protrusive facet (f26) of the artificial tooth for the mandibular central incisor (T8), wherein the third protrusive facet (f3) of the artificial tooth for the maxillary lateral incisor (T2) makes partial contact with the sixteenth protrusive facet (f29) of the artificial tooth for the mandibular canine (T10), wherein the fourth protrusive facet (f4) of the artificial tooth for the maxillary lateral incisor (T2) makes partial contact with the fifteenth protrusive facet (f28) of the artificial tooth for the mandibular lateral incisor (T9), wherein the fifth protrusive facet (f5) of the artificial tooth for the maxillary canine (T3) makes partial contact with the seventeenth protrusive facet (f31) of the artificial tooth for the mandibular first premolar (T11), wherein the first retrusive facet (f6) of the artificial tooth for the maxillary canine (T3) makes partial contact with the ninth retrusive facet (f30) of the artificial tooth for the mandibular canine (T10), wherein the sixth protrusive facet (f7) of the artificial tooth for the maxillary first premolar (T4) makes partial contact with the nineteenth protrusive facet (f35) of the artificial tooth for the mandibular second premolar (T12), wherein the second retrusive facet (f8) of the artificial tooth for the maxillary first premolar (T4) makes partial contact with the tenth retrusive facet (f32) of the artificial tooth for the mandibular first premolar (T11), wherein the first balancing facet (f9) of the artificial tooth for the maxillary first premolar (T4) makes partial contact with the sixth balancing facet (f33) of the artificial tooth for the mandibular first premolar (T11), wherein the seventh protrusive facet (f10) of the artificial tooth for the maxillary second premolar (T5) makes partial contact with the twenty-first protrusive facet (f39) of the artificial tooth for the mandibular first molar (T13), wherein the third retrusive facet (f11) of the artificial tooth for the maxillary second premolar (T5) makes partial contact with the eleventh retrusive facet (f36) of the artificial tooth for the mandibular second premolar (T12), wherein the second balancing facet (f12) of the artificial tooth for the maxillary second premolar (T5) makes partial contact with the seventh balancing facet (f37) of the artificial tooth for the mandibular second premolar (T12), wherein the eighth protrusive facet (f13) of the artificial tooth for the maxillary first molar (T6) makes partial contact with the twenty-second protrusive facet (f42) of the artificial tooth for the mandibular first molar (T13), wherein the fourth retrusive facet (f14) of the artificial tooth for the maxillary first molar (T6) makes partial contact with the twelfth retrusive facet (f40) of the artificial tooth for the mandibular first molar (T13), wherein the ninth protrusive facet (f15) of the artificial tooth for the maxillary first molar (T6) makes partial contact with the twenty-third protrusive facet (f45) of the artificial tooth for the mandibular first molar (T13), wherein the fifth retrusive facet (f16) of the artificial tooth for the maxillary first molar (T6) makes partial contact with the thirteenth retrusive facet (f43) of the artificial tooth for the mandibular first molar (T13), wherein the third balancing facet (f17) of the artificial tooth for the maxillary first molar (T6) makes partial contact with the ninth balancing facet (f44) of the artificial tooth for the mandibular first molar (T13), wherein the tenth protrusive facet (f18) of the artificial tooth for the maxillary first molar (T6) makes partial contact with the twenty-fourth protrusive facet (f47) of the artificial tooth for the mandibular first molar (T13), wherein the eleventh protrusive facet (f21) of the artificial tooth for the maxillary second molar (T7) makes partial contact with the twenty-sixth protrusive facet (f51) of the artificial tooth for the mandibular second molar (T14), wherein the seventh retrusive facet (f22) of the artificial tooth for the maxillary second molar (T7) makes partial contact with the fourteenth retrusive facet (f49) of the artificial tooth for the mandibular second molar (T14), wherein the eighth retrusive facet (f23) of the artificial tooth for the maxillary second molar (T7) makes partial contact with the fifteenth retrusive facet (f52) of the artificial tooth for the mandibular second molar (T14), wherein the fifth balancing facet (f24) of the artificial tooth for the maxillary second molar (T7) makes partial contact with the twelfth balancing facet (f53) of the artificial tooth for the mandibular second molar (T14), wherein the twelfth protrusive facet (f25) of the artificial tooth for the maxillary second molar (T7) makes partial contact with the twenty-seventh protrusive facet (f54) of the artificial tooth for the mandibular second molar (T14), wherein the artificial teeth set is configured such that, when in use, the mandibular coupled artificial teeth (5) move in a lateral direction with respect to the maxillary coupled artificial teeth (6), on a working side which is a side of a moving direction of the mandibular coupled artificial teeth (5), the fourth protrusive facet (f4) of the artificial tooth for the maxillary lateral incisor (T2) partially glides on the fifteenth protrusive facet (f28) of the artificial tooth for the mandibular lateral incisor (T9), wherein the first retrusive facet (f6) of the artificial tooth for the maxillary canine (T3) partially glides on the ninth retrusive facet (f30) of the artificial tooth for the mandibular canine (T10), wherein the second retrusive facet (f8) of the artificial tooth for the maxillary first premolar (T4) partially glides on the tenth retrusive facet (f32) of the artificial tooth for the mandibular first premolar (T11), wherein the third retrusive facet (f11) of the artificial tooth for the maxillary second premolar (T5) partially glides on the eleventh retrusive facet (f36) of the artificial tooth for the mandibular second premolar (T12), wherein the fourth retrusive facet (f14) of the artificial tooth for the maxillary first molar (T6) partially glides on the twelfth retrusive facet (f40) of the artificial tooth for the mandibular first molar (T13), wherein the fifth retrusive facet (f16) of the artificial tooth for the maxillary first molar (T6) partially glides on the thirteenth retrusive facet (f43) of the artificial tooth for the mandibular first molar (T13), wherein the tenth protrusive facet (f18) of the artificial tooth for the maxillary first molar (T6) partially glides on the twenty-fourth protrusive facet (f47) of the artificial tooth for the mandibular first molar (T13), wherein the seventh retrusive facet (f22) of the artificial tooth for the maxillary second molar (T7) partially glides on the fourteenth retrusive facet (f49) of the artificial tooth for the mandibular second molar (T14), wherein the eighth retrusive facet (f23) of the artificial tooth for the maxillary second molar (T7) partially glides on the fifteenth retrusive facet (f52) of the artificial tooth for the mandibular second molar (T14), wherein the twelfth protrusive facet (f25) of the artificial tooth for the maxillary second molar (T7) partially glides on the twenty-seventh protrusive facet (f54) of the artificial tooth for the mandibular second molar (T14), wherein at the same time, on a balancing side which is a side opposite to the working side, the first balancing facet (f9) of the artificial tooth for the maxillary first premolar (T4) partially glides on the sixth balancing facet (f33) of the artificial tooth for the mandibular first premolar (T11), wherein the second balancing facet (f12) of the artificial tooth for the maxillary second premolar (T5) partially glides on the seventh balancing facet (f37) of the artificial tooth for the mandibular second premolar (T12) and the eighth balancing facet (f41) of the artificial tooth for the mandibular first molar (T13), wherein the third balancing facet (f17) of the artificial tooth for the maxillary first molar (T6) partially glides on the ninth balancing facet (f44) of the artificial tooth for the mandibular first molar (T13), wherein the fourth balancing facet (f20) of the artificial tooth for the maxillary first molar (T6) partially glides on the tenth balancing facet (f46) of the artificial tooth for the mandibular first molar (T13) and the eleventh balancing facet (f50) of the artificial tooth for the mandibular second molar (T14), wherein the fifth balancing facet (f24) of the artificial tooth for the maxillary second molar (T7) partially glides on the twelfth balancing facet (f53) of the artificial tooth for the mandibular second molar (T14), wherein the artificial teeth set is configured such that, when in use, the mandibular coupled artificial teeth (5) move in a protrusive direction with respect to the maxillary coupled artificial teeth (6), the first protrusive facet (f1) of the artificial tooth for the maxillary central incisor (T1) partially glides on the fourteenth protrusive facet (f27) of the artificial tooth for the mandibular lateral incisor (T9), wherein the second protrusive facet (f2) of the artificial tooth for the maxillary central incisor (T1) partially glides on the thirteenth protrusive facet (f26) of the artificial tooth for the mandibular central incisor (T8), wherein the third protrusive facet (f3) of the artificial tooth for the maxillary lateral incisor (T2) partially glides on the sixteenth protrusive facet (f29) of the artificial tooth for the mandibular canine (T10), wherein the fifth protrusive facet (f5) of the artificial tooth for the maxillary canine (T3) partially glides on the seventeenth protrusive facet (f31) of the artificial tooth for the mandibular first premolar (T11), wherein the sixth protrusive facet (f7) of the artificial tooth for the maxillary first premolar (T4) partially glides on the nineteenth protrusive facet (f35) of the artificial tooth for the mandibular second premolar (T12), wherein the seventh protrusive facet (f10) of the artificial tooth for the maxillary second premolar (T5) partially glides on the twenty-first protrusive facet (f39) of the artificial tooth for the mandibular first molar (T13), wherein the eighth protrusive facet (f13) of the artificial tooth for the maxillary first molar (T6) partially glides on the twenty-second protrusive facet (f42) of the artificial tooth for the mandibular first molar (T13), wherein the ninth protrusive facet (f15) of the artificial tooth for the maxillary first molar (T6) partially glides on the twenty-third protrusive facet (f45) of the artificial tooth for the mandibular first molar (T13) and the twenty-fifth protrusive facet (f48) of the artificial tooth for the mandibular second molar (T14), wherein the tenth protrusive facet (f18) of the artificial tooth for the maxillary first molar (T6) partially glides on the twenty-fourth protrusive facet (f47) of the artificial tooth for the mandibular first molar (T13), wherein the eleventh protrusive facet (f21) of the artificial tooth for the maxillary second molar (T7) partially glides on the twenty-sixth protrusive facet (f51) of the artificial tooth for the mandibular second molar (T14), and wherein the twelfth protrusive facet (f25) of the artificial tooth for the maxillary second molar (T7) partially glides on the twenty-seventh protrusive facet (f54) of the artificial tooth for the mandibular second molar (T14).

* * * * *